(12) United States Patent
Eckert et al.

(10) Patent No.: US 9,097,938 B2
(45) Date of Patent: Aug. 4, 2015

(54) PHOTOALIGNING MATERIAL

(75) Inventors: Jean-Francois Eckert, Kientzville (FR); Satish Palika, Zofingen (CH); Andreas Schuster, Freiburg (DE)

(73) Assignee: ROLIC AG, Zug (CH)

( * ) Notice: Subject to any disclaimer, the term of this patent is extended or adjusted under 35 U.S.C. 154(b) by 117 days.

(21) Appl. No.: 13/642,055

(22) PCT Filed: Apr. 19, 2011

(86) PCT No.: PCT/EP2011/056202
§ 371 (c)(1),
(2), (4) Date: Oct. 18, 2012

(87) PCT Pub. No.: WO2011/131649
PCT Pub. Date: Oct. 27, 2011

(65) Prior Publication Data
US 2013/0035446 A1    Feb. 7, 2013

(30) Foreign Application Priority Data

Apr. 23, 2010  (EP) .................................. 10004329

(51) Int. Cl.
*C08G 69/26*  (2006.01)
*G02F 1/1337*  (2006.01)

(52) U.S. Cl.
CPC .... *G02F 1/133711* (2013.01); *G02F 1/133788* (2013.01)

(58) Field of Classification Search
CPC .................... G02F 1/133788; G02F 1/133723; G02F 1/133711; C07C 65/28; C07D 207/24; C07F 7/1836; C08G 69/26

USPC ........... 427/162, 508, 553; 525/418; 528/330, 528/353

See application file for complete search history.

(56) References Cited

U.S. PATENT DOCUMENTS

| | | | |
|---|---|---|---|
| 6,340,506 B1 | 1/2002 | Buchecker et al. | |
| 2008/0293888 A1 | 11/2008 | Bachels et al. | |
| 2009/0290109 A1 | 11/2009 | Lee et al. | |
| 2009/0302273 A1 | 12/2009 | Tanaka | |
| 2012/0076952 A1 | 3/2012 | Bachels et al. | |
| 2012/0316317 A1* | 12/2012 | Eckert et al. .................. | 528/354 |

FOREIGN PATENT DOCUMENTS

| | | |
|---|---|---|
| DE | 1 078 120 B | 9/1958 |
| GB | 872355 A | 7/1961 |
| JP | 58-109479 A | 6/1983 |
| JP | 59-190945 A | 10/1984 |
| JP | 6-13740 A | 1/1994 |
| JP | 4458299 B2 | 4/2010 |
| JP | 2010-285499 A | 12/2010 |
| JP | 2013-519744 A | 5/2013 |
| WO | 99/15576 A1 | 4/1999 |
| WO | 2007/071091 A1 | 6/2007 |

* cited by examiner

*Primary Examiner* — Gregory Listvoyb
(74) *Attorney, Agent, or Firm* — Sughrue Mion, PLLC

(57) ABSTRACT

The present invention relates to polymer, homo- or copolymer or oligomer for the photoalignment of liquid crystals comprising a main chain and a side chain, wherein the side chain comprises a difluoromethylene group, compositions thereof, and its use for optical and electro optical devices, especially liquid crystal devices (LCDs).

4 Claims, No Drawings

PHOTOALIGNING MATERIAL

CROSS REFERENCE TO RELATED APPLICATIONS

This application is a National Stage of International Application No. PCT/EP2011/056202, filed on Apr. 19, 2011, which claims priority from European Patent Application No. 10004329.8, filed on Apr. 23, 2010, the contents of all of which are incorporated herein by reference in their entirety.

The present invention relates to polymer, homo- or copolymer or oligomer for the photoalignment of liquid crystals comprising a main chain and a side chain, wherein the side chain comprises a difluoromethylen group, compositions thereof, and its use for optical and electro optical devices, especially liquid crystal devices (LCDs).

There is an ever-growing demand to develop new photoaligning materials for optical and electro-optical applications.

Nowadays there is an increasing demand for green technology for the consumer and in large scale manufacturing processes. Especially, in display industries there is a constant need to increase the production efficiency by reduction of power consumption and time durations during different process steps. The consumer on the other hand wants to have access to low energy consuming displays without any technical disadvantage in any property of the display.

In the present invention new photo-aligning material was found which gives access to an economic manufacturing process and low energy consuming LCDs without decreasing the required technical properties.

Accordingly, in the present invention a polymer, homo- or copolymer or oligomer was found comprising a main chain and a side chain, wherein the side chain comprises a group of formula (I)

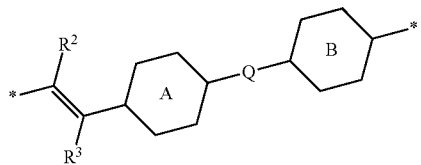

wherein
Q represents —OCF$_2$—, —CF$_2$—O—, —CF$_2$S—, —SCF$_2$—, —CF$_2$NH— or —NH—CF$_2$—, preferably —OCF$_2$— or —CF$_2$—O—, more preferably —OCF$_2$—,
A and B independently from each other represent an unsubstituted or substituted carbocyclic or heterocyclic aromatic or alicyclic group selected from a monocyclic ring of five or six atoms, two adjacent monocyclic rings of five or six atoms, a bicyclic ring system of eight, nine or ten atoms, or a tricyclic ring system of thirteen or fourteen atoms.

Preferably A represents an unsubstituted or substituted carbocyclic or heterocyclic aromatic group selected from a monocyclic ring of five or six atoms, two adjacent monocyclic rings of five or six atoms, a bicyclic ring system of eight, nine or ten atoms, or a tricyclic ring system of thirteen or fourteen atoms; and B represents an unsubstituted or substituted carbocyclic or heterocyclic aromatic or alicyclic group selected from a monocyclic ring of five or six atoms, two adjacent monocyclic rings of five or six atoms, a bicyclic ring system of eight, nine or ten atoms, or a tricyclic ring system of thirteen or fourteen atoms;

$R^2$ and $R^3$ are independently from each other hydrogen, halogen or nitrile; unsubstituted or with halogen substituted $C_1$-$C_{12}$alkyl, in which one or more C-atom, CH— or CH$_2$— group may be replaced by a linking group; preferably $R^2$ and $R^3$ are independently from each other hydrogen, nitrile or fluorine, and more preferably $R^2$ and $R^3$ are hydrogen and/or nitrile.

Substituents of the aromatic or alicyclic groups are for example a straight-chain or branched $C_1$-$C_{16}$alkyl group, which is unsubstituted or substituted by fluorine, di-($C_1$-$C_{16}$alkyl)amino, $C_1$-$C_{15}$alkyloxy, nitro, nitrile and/or chlorine; and wherein one or more C-atom, CH— or CH$_2$— group may independently from each other be replaced by a linking group; halogen or nitrile. Preferred substituents are $C_1$-$C_6$alkyl group, especially methyl or ethyl, $C_1$-$C_6$alkoxy group, especially methoxy or ethoxy, chlorine, fluorine, or nitrile, more preferably methoxy, chlorine, fluorine, or CN and most preferably methoxy, chlorine or fluorine. Further, if the aromatic group is substituted, then it is preferably substituted once or twice.

Substituents of B are preferably halogen, $C_1$-$C_{16}$alkoxy, $C_1$-$C_{16}$alkyl, nitro or nitrile, preferably methoxy, fluorine, chlorine or nitrile, and more preferably fluorine.

DEFINITIONS

In the context of the present invention halogen represents fluorine, chlorine, bromine, or iodine and preferably fluorine or chlorine and more preferably fluorine.

Preferred $C_1$-$C_{30}$alkyl is preferably $C_1$-$C_{16}$alkyl, more preferably $C_1$-$C_{12}$alkyl, most preferred $C_1$-$C_6$alkyl such as methyl, ethyl, propyl, isopropyl, butyl, sec.-butyl, tert.-butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicsyl, uneicosyl, docosyl, tricosyl or triacontyl; more preferred $C_1$-$C_6$alkyl is for example methyl, ethyl, propyl, butyl, pentyl or hexyl.

Preferred di-($C_1$-$C_{16}$alkyl)amino or $C_1$-$C_{16}$alkyloxy has for the alkyl term the same preferences and meanings as given above.

Preferred $C_1$-$C_{24}$alkylen is methylen, ethylen, propylen, isopropylen, butylen, sec.-butylen, tert.-butylen, pentylen, hexylen, heptylen, octylen, nonylen, decylen, undecylen, dodecylen, tridecylen, tetradecylen, pentadecylen or hexadecylen; more preferred $C_1$-$C_{16}$alkylen is methylen, ethylen, propylen, butylen, pentylen, hexylen.

DEFINITION OF TERMS USED IN THE PRESENT INVENTION

The term "bridging group" as used in the context of the present invention is preferably selected from —O—, —CO—, —CH(OH)—, —CH$_2$(CO)—, —OCH$_2$—, —CH$_2$O—, —O—CH$_2$—O—, —COO—, —OCO—, —OCF$_2$—, —CF$_2$O—, —CON($C_1$-$C_{16}$alkyl)-, —($C_1$-$C_{16}$alkyl)NCO—, —CONH—, —NHCO—, —HNOCO—, —OCONH—, —NHCONH—, —OCOO—, —CO—S—, —S—CO—, —CSS, —SOO—, —OSO—, —SOS—, —SO—, —CH$_2$(SO)—, —SO$_2$—, —CH═CH—, —C≡C—, —CH═CH—COO—, —OCO—CH═CH—, —CH═N—, —C(CH$_3$)═N—, —N═N—, or a single bond; or a cyclic, straight-chain or branched, substituted or unsubstituted $C_1$-$C_{24}$alkylen, wherein one or more C-atom, CH- or CH$_2$-group may independently from each other be replaced by a linking group.

Preferably, the bridging group is —O—, —CO—, —COO—, —OCO—, —OCOO—, —OCF$_2$—, —CF$_2$O—, —CON(CH$_3$)—, —(CH$_3$)NCO—, —CONH—, —NHCO—, —CO—S—, —S—CO—, —CSS—, —SOO—, —OSO—, —CH$_2$(SO$_2$)—, —CH$_2$—OH$_2$—, —OCH$_2$—, —CH$_2$O—, —CH=CH—, —C≡C—, —CH=CH—COO—, —OCO—CH=CH—, or a single bond.

More preferably bridging group is —COO—, —OCO—, —OCOO—, —OCF$_2$—, —CF$_2$O—, —CON(CH$_3$)—, —(CH$_3$)NCO—, —CONH—, —NHCO—, —CO—S—, —S—CO—, —CS—S—, —SOO—, —OSO—, especially —COO—, —OCO—, —OCF$_2$—, —CF$_2$O—, —CON(CH$_3$)—, —(CH$_3$)NCO—, —CONH—, —NHCO— or a single bond. Most preferred bridging group is a single bond, —COO— or —OCO—.

The term "linking group", as used in the context of the present invention is preferably be selected from a single bond, —S—, —S(CS)—, —(CS)S—, —CO—S—, —S—CO—, —O—, —CO, —CO—O—, —O—CO—,

—NR$^2$—, —NR$^2$—CO—, —CO—NR$^2$—, —NR$^2$—CO—O—, —O—CO—NR$^2$—, —NR$^2$—CO—NR$^2$—, —CH=CH—, —C≡C—, —O—CO—O—, —Si(CH$_3$)$_2$—O—Si(CH$_3$)$_2$— and unsubstituted or substituted cyclohexylen and unsubstituted or substituted phenylene and wherein:

R$^2$ represents a hydrogen atom or C$_1$-C$_6$alkyl; especially hydrogen or methyl; with the proviso that oxygen atoms of linking groups are not directly linked to each other; preferred is a single bond, —O—, —O(CO), —S—, —(CO)O— or

—NR$^2$—.

The "carbocyclic or heterocyclic aromatic group" and "aromatic group" as used in the context of the present invention represents five, six, ten or 14 ring atoms, e.g. furan, benzene or phenylene, pyridine, triazine, pyrimidine, biphenylene, naphthalene, phenanthrene, triphenylene, tetraline which are uninterrupted or interrupted by at least a single heteroatom and/or at least a single bridging group; preferred are benzene, phenylene, naphthalene, biphenylene, phenanthrene, or triphenylen and more preferred are benzene, phenylene and biphenylene, especially phenylene.

The term "phenylene", as used in the context of the present invention, preferably denotes a 1,2-, 1,3- or 1,4-phenylene group, which is optionally substituted. It is preferred that the phenylene group is either a 1,3- or a 1,4-phenylene group. 1,4-phenylene groups are especially preferred.

The "alicyclic group" represents for example ring systems, with 3 to 40 carbon atoms, preferably C$_{17}$-C$_{40}$ carbon atoms as for example cyclopropane, cyclobutane, cyclopentane, cyclopentene, cyclohexane, cyclohexene, cyclohexadiene, decaline, tetrahydrofuran, dioxane, pyrrolidine, piperidine or a steroidal skeleton such as cholesterol, which are uninterrupted or interrupted by at least a single heteroatom and/or at least a single bridging group; and preferred are cyclohexane or a steroidal skeleton.

Further, preferred is a polymer, homo- or copolymer or oligomer, wherein the side chain comprises a group of formula (II)

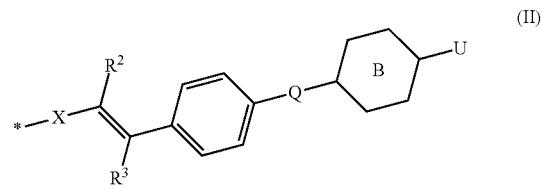

wherein

Q represents —OCF$_2$—, —CF$_2$—O—, —CF$_2$S—, —SCF$_2$—, —CF$_2$NH— or —NH—CF$_2$—, preferably —OCF$_2$— or —CF$_2$—O—, more preferably —OCF$_2$—, B has the meanings and preferences as described above, U represents hydrogen or a straight-chain or branched, unsubstituted or at least once, with halogen, nitrile, ether, ester, siloxane, amide or amine substituted C$_1$-C$_{16}$alkyl group, especially C$_1$-C$_{12}$alkyl group, more especially C$_1$-C$_6$alkyl group, wherein one or more C-atom, CH— or CH$_2$-group is independently from each other not replaced or replaced by a linking group within the above given meaning and preferences; especially a C-atom, CH— or CH$_2$— group is replaced by —NH—, —NCH$_3$—, —NH—CO—, —CO—NH—, —NH—CO—O—, —O—CO—NH—, —NH—CONH—, —NCH$_3$—, NCH$_3$—CO—, —CO—NCH$_3$—, —NCH$_3$—CO—O—, —O—CO—NCH$_3$—, —NCH$_3$—CONCH$_3$—, —O—, —CO, —CO—O—, —O—CO—, —CH=CH—, —C≡C—, —O—CO—O—, and unsubstituted or substituted cyclohexylen and unsubstituted or substituted phenylene;

preferably U is hydrogen; or unsubstituted, or with halogen, nitrile, ether, ester, amide or amine; preferably with fluorine or nitrile especially with 1, 2, 3, 4, 5, 6, 7, 8, 9 or 10, more especially with 1, 2, 3, 4, 5, 6 or 7, and most especially by 1, 2, 3 or 5 fluorine; substituted Q$^1$-(C$_1$-C$_6$alkylen), wherein one or more C-atom, CH- or CH$_2$-group is independently from each other not replaced or replaced by a linking group within the above given meaning and preferences; especially a C-atom, CH— or CH$_2$— group is replaced by —NH—, —NCH$_3$—, —NH—CO—, —CO—NH—, —NH—CO—O—, —O—CO—NH—, —NH—CONH—, —NCH$_3$—, NCH$_3$—CO—, —CO—NCH$_3$—, —NCH$_3$—CO—O—, —O—CO—NCH$_3$—, —NCH$_3$—CONCH$_3$—, —O—, —CO, —CO—O—, —O—CO—, —CH=CH—, —C≡C—, —O—CO—O—, or unsubstituted or substituted cyclohexylen and unsubstituted or substituted phenylene; and wherein Q$^1$ represents a single bond or —NH—, —N(CH$_3$)—, —NH—CO—, —CO—NH—, —NH—CO—O—, —O—CO—NH—, —NH—CONH—, —CON(CH$_3$)—, —(CH$_3$)NCO—, —O—, —CO—, —COO—, —OCO—, —OCF$_2$—, —CF$_2$—O—, —CF$_2$S—, —SCF$_2$—, —CF$_2$NH—, —NHCF$_2$—, —S—, —CS—, —SCS—, —SCO—, —CH=CH—, —C≡C— or —O—CO—O—; preferably Q$^1$ is —O—, —CO—, —COO—, —OCO— or a single bond more preferably —O— or a single bond;

preferably the fluorine substituents are in the terminal position of the alkyl group, at the opposite side of the linkage to ring B, more preferably the alkyl group is represented or has as terminal group a fluorine alkyl residue of formula —CF$_3$, —CF$_2$H, —CH$_2$F, —CF$_2$CF$_3$, —CF$_2$CHF$_2$, —CF$_2$CH$_2$F, —CFHCF$_3$, —CFHCHF$_2$, —CFHCH$_2$F, —CF$_2$CH$_3$, —CFHCHF$_2$, —(CF$_2$)$_2$CF$_3$, —(CF$_2$)$_2$CHF$_2$, —(CF$_2$)$_2$CH$_2$F, —(CF$_2$)$_2$CH$_3$, —(CF$_2$)$_3$CHF$_2$, —(CF$_2$)$_3$CH$_2$F, —(CF$_2$)$_3$CF$_3$, —CF(CF$_3$)$_2$ or —CF$_2$(CHF)CF$_3$, and most preferably of formula —CF$_2$H, —CF$_2$H, —CH$_2$F, —CF$_3$, —CF$_2$CF$_3$, —CF$_2$CHF$_2$; and especially most preferably of formula —CF$_3$, —CH$_2$F, —CF$_2$CF$_3$, especially —CF$_3$;

more preferably U is hydrogen, —CF$_3$, —CF$_2$H, —CH$_2$F, -Q$^1$-(C$_1$-C$_6$alkylen)-CF$_3$, -Q$^1$-(C$_1$-C$_6$ alkylen)-CF$_2$H, -Q$^1$-(C$_1$-C$_6$ alkylen)-CH$_2$F, -Q$^1$-(C$_1$-C$_6$ alkylen)-CF$_2$CF$_3$, -Q$^1$-(C$_1$-C$_6$ alkylen)-CF$_2$CHF$_2$, -Q$^1$-(C$_1$-C$_6$ alkylen)-CF$_2$CH$_2$F, -Q$^1$-(C$_1$-C$_6$ alkylen)-CFHCF$_3$, -Q$^1$-(C$_1$-C$_6$ alkylen)-CFHCHF$_2$, -Q$^1$-(C$_1$-C$_6$ alkylen)-CFHCH$_2$F, -Q$^1$-(C$_1$-C$_6$alkylen)-CF$_2$CH$_3$, -Q$^1$-(C$_1$-C$_6$ alkylen)-CFHCHF$_2$, -Q$^1$-(C$_1$-C$_6$ alkylen)-(CF$_2$)$_2$CF$_3$, -Q$^1$-(C$_1$-C$_6$ alkylen)-(CF$_2$)$_2$CHF$_2$, -Q$^1$-(C$_1$-C$_6$alkylen)-(CF$_2$)$_2$CH$_2$F, -Q$^1$-(C$_1$-C$_6$alkylen)-(CF$_2$)$_2$CH$_3$, -Q$^1$-(C$_1$-C$_6$alkylen)-(CF$_2$)$_3$CHF$_2$, -Q$^1$-(C$_1$-C$_6$alkylen)-(CF$_2$)$_3$CH$_2$F, -Q$^1$-(C$_1$-C$_6$alkylen)-(CF$_2$)$_3$CF$_3$, -Q$^1$-(C$_1$-C$_6$alkylen)-CF(CF$_3$)$_2$, -Q$^1$-(C$_1$-C$_6$alkylen)-CF$_2$(CHF)CF$_3$, wherein one or more C-atom, CH— or CH$_2$—, group is independently from each other not replaced or replaced by a linking group within the above given meaning and preferences; especially a C-atom, CH— or CH$_2$—, group is replaced by —NH—, —NCH$_3$—, —NH—CO—, —CO—NH—, —NH—CO—O—, —O—CO—NH—, —NH—CONH—, —NCH$_3$—, —NCH$_3$—CO—, —CO—NCH$_3$—, —NCH$_3$—CO—O—, —O—CO—NCH$_3$—, —NCH$_3$—CONCH$_3$—, —O—, —CO, —CO—O—, —O—CO—, —CH═CH—, —C≡C—, —O—CO—O—, and unsubstituted or substituted cyclohexylen and unsubstituted or substituted phenylene;

wherein -Q$^1$- has the meaning and preferences given above, R$^2$ and R$^3$ independently from each represent hydrogen, fluorine, chlorine, nitrile, unsubstituted or with fluorine substituted C$_1$-C$_{12}$alkyl, in which one or more C-atom, CH— or CH$_2$-group may be replaced by a linking group; preferably nitrile or F; preferably R$^2$ and R$^3$ are independently from each other represents hydrogen or nitrile, preferably hydrogen;

X is a bivalent aromatic group, such as phenylene, especially 1,4-phenylene; or X is —CH$_2$—, —CO—, —CS—, —O(CO)—, —(CO)O—, —NH(CO)—, —(CO)NH—, —OCF$_2$—, —SCF$_2$—, —NH—CF$_2$—, ((C$_1$-C$_6$alkyl)-N) CO—, preferably ((CH$_3$)N)CO—, or —S(CS)—, —O(CS), —S(CO) preferably —O(CO)—.

The main chain of the polymer, homo- or copolymer or oligomer of the present invention is not particularly limited.

Preferred main chain is polyamic acid, polyimide, polyamic acid ester, polyester, polyamide, polysiloxane, cellulose, polyacetal, polyurea, polyurethane, polystyrene, poly (styrene-phenyl-maleimide), polyacrylate, poly(meth)acrylate, polymaleimide, polyhydroxyalkylenether, polyhydroxyether, polyhydroxyetheramine, polyaminoalkylenether and derivatives or a mixture thereof.

A polyamic acid, polyimide, polyamic acid ester, polystyrene derivative and poly(styrenephenylmaleimide)-derivative are preferred, polyamic acid ester, polyamic acid and polyimide are more preferred, and polyamic acid and polyimide are particularly preferred.

Further, the present invention relates to a monomer comprising a group of formula (I), preferably a group of formula (II), as described above and within the above given preferences; and a polymerisable group.

In the context of the present invention the wording "polymerisable group" is not particularly limited and represents preferably amine, acrylate, methacrylate, 2-chloroacrylate, 2-phenylacrylate, acrylamide, methacrylamide, 2-chloroacrylamide, 2-phenyl-acrylamide, N—(C$_1$-C$_6$)alkyl substituted acrylamide-, N—(C$_1$-C$_6$)alkyl substituted methacrylamide, N—(C$_1$-C$_6$)alkyl substituted 2-chloroacrylamide, N—(C$_1$-C$_6$)alkyl substituted 2-phenylacrylamide, vinyl ether, vinyl ester, styrene, vinyl, carboxylic acid, carboxylic halogenid, carbonyl, siloxane, hydroxy, halogenid, or a mixture thereof. Preferred polymerisable group is amine, especially diamines, vinyl, acrylate or methacrylate, more especially diamines.

The monomer used in the present invention is not particularly limited, and represents for example a group of formula (IV)

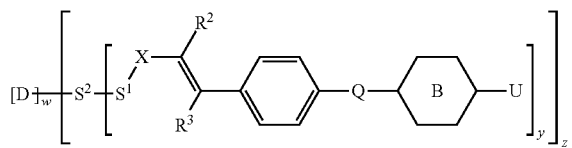

wherein
Q represents —OCF$_2$—, —CF$_2$—O—, —CF$_2$S—, —SCF$_2$—, —CF$_2$NH— or —NH—CF$_2$—, preferably —OCF$_2$— or —CF$_2$—O—, more preferably —OCF$_2$—, B represents an unsubstituted or substituted benzene or phenylene, pyridine, triazine, pyrimidine, biphenylene, naphthalene, phenanthrene, triphenylene, tetraline, preferably phenylene, or an alicyclic group selected from cyclopropane, cyclobutane, cyclopentane, cyclopentene, cyclohexane, cyclohexene, cyclohexadiene, decaline, tetrahydrofuran, dioxane, pyrrolidine, piperidine and a steroidal skeleton, preferably cyclohexane or a steroidal skeleton; more preferably B is phenylene or a cyclohexane group R$^2$ and R$^3$ are hydrogen and/or nitrile, X is a bivalent aromatic group, such as phenylene, especially 1,4-phenylene; or X is —CH$_2$—, —CO—, —CS—, —O(CO)—, —(CO)O—, —NH(CO)—, —(CO)NH—, —OCF$_2$—, ((C$_1$-C$_6$alkyl)-N)CO—, preferably ((CH$_3$)N) CO—, or —S(CS)—, —O(CS), —S(CO) preferably —O(CO)—;

U is hydrogen, —CF$_3$, —CF$_2$H, —CH$_2$F, -Q$^1$-(C$_1$-C$_6$alkylen)-CF$_3$, -Q$^1$-(C$_1$-C$_6$ alkylen)-CF$_2$H, -Q$^1$-(C$_1$-C$_6$ alkylen)-CH$_2$F, -Q$^1$-(C$_1$-C$_6$ alkylen)-CF$_2$CF$_3$, -Q$^1$-(C$_1$-C$_6$ alkylen)-CF$_2$CHF$_2$, -Q$^1$-(C$_1$-C$_6$ alkylen)-CF$_2$CH$_2$F, -Q$^1$-(C$_1$-C$_6$ alkylen)-CFHCF$_3$, -Q$^1$-(C$_1$-C$_6$ alkylen)-CFHCHF$_2$, -Q$^1$-(C$_1$-C$_6$alkylen)-CF$_2$CH$_3$, -Q$^1$-(C$_1$-C$_6$ alkylen)-CFHCHF$_2$, -Q$^1$-(C$_1$-C$_6$ alkylen)-(CF$_2$)$_2$CF$_3$, -Q$^1$-(C$_1$-C$_6$ alkylen)-(CF$_2$)$_2$CHF$_2$, -Q$^1$-(C$_1$-C$_6$alkylen)-(CF$_2$)$_2$CH$_2$F, -Q$^1$-(C$_1$-C$_6$alkylen)-(CF$_2$)$_2$CH$_3$, -Q$^1$-(C$_1$-C$_6$alkylen)-(CF$_2$)$_3$CHF$_2$, -Q$^1$-(C$_1$-C$_6$alkylen)-(CF$_2$)$_3$CH$_2$F, -Q$^1$-(C$_1$-C$_6$alkylen)-(CF$_2$)$_3$CF$_3$, -Q$^1$-(C$_1$-C$_6$alkylen)-CF(CF$_3$)$_2$, -Q$^1$-(C$_1$-C$_6$alkylen)-CF$_2$(CHF)CF$_3$; wherein one or more C-atom, CH— or CH$_2$—, group is independently from each other not replaced or replaced by a linking group within the above given meaning and preferences; especially a C-atom, CH— or CH$_2$—, group is replaced by —NH—, —NCH$_3$—, —NH—CO—, —CO—NH—, —NH—CO—O—, —O—CO—NH—, —NH—CONH—, —NCH$_3$—, NCH$_3$—CO—, —CO—NCH$_3$—, —NCH$_3$—CO—O—, —O—CO—NCH$_3$—, —NCH$_3$—CONCH$_3$—, —O—, —CO, —CO—O—, —O—CO—, —CH=CH—, —C≡C—, —O—CO—O—, and unsubstituted or substituted cyclohexylen and unsubstituted or substituted phenylene;
wherein
$Q^1$ represents a single bond or —NH—, —N(CH$_3$)—, —NH—CO—, —CO—NH—, —NH—CO—O—, —O—CO—NH—, —NH—CONH—, —CON(CH$_3$)—, —(CH$_3$)NCO—, —O—, —CO—, —COO—, —OCO—, —OCF$_2$—, —CF$_2$—O—, —CF$_2$S—, —SCF$_2$—, —CF$_2$NH—, —NHCF$_2$—, —S—, —CS—, —SCS—, —SCO—, —CH=CH—, —C≡C— or —O—CO—O—; preferably $Q^1$ is —O—, —CO—, —COO—, —OCO— or a single bond more preferably —O— or a single bond;
D represents an unsubstituted or substituted aliphatic, aromatic or alicyclic polymerisable group, preferably a diamine group having from 1 to 40 carbon atoms,
y and z are each independently from each other 1, 2, 3 or 4, preferably 1 or 2;
w is 1, 2, 3, 4 and preferably 1 or 2,
$S^1$ and $S^2$ each independently from each other represents a single bond or a spacer unit, which is a cyclic, straight-chain or branched, substituted or unsubstituted $C_1$-$C_{24}$alkylen, in which one or more, preferably non-adjacent, C-atom, CH— or CH$_2$—, group may be replaced by a linking group, and/or a non-aromatic, aromatic, unsubstituted or substituted carbocyclic or heterocyclic group of formula (V):

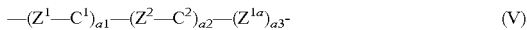
 (V)

wherein:
$C^1$, $C^2$ each independently represents a alicyclic or aromatic, optionally substituted carbocyclic or heterocyclic group, preferably connected to each other via the bridging groups $Z^1$ and $Z^2$ and/or $Z^{1a}$, preferably $C^1$ and $C^2$ are connected at the opposite positions via the bridging groups $Z^1$ and $Z^2$ and/or $Z^{1a}$, so that groups $S^1$ and/or $S^2$ have a long molecular axis, and
$Z^1$, $Z^2$, $Z^{1a}$ each independently represents a bridging group within the above given meanings and preferences, and
$a_1$, $a_2$, $a_3$ each independently represents an integer from 0 to 3, such that $a_1+a_2+a_3 \leq 6$, preferably $a_3$ is 0 and $a_1+a_2 \leq 4$,
preferably $S^1$ and $S^2$ each independently from each other represents a single bond or a spacer unit, which is a straight-chain or branched, substituted, or unsubstituted $C_1$-$C_{24}$alkylen, preferably $C_1$-$C_{12}$alkylen, more preferably $C_1$-$C_6$alkylen, in which one or more, preferably non-adjacent, C-atom, CH— or CH$_2$—, group may be replaced by a linking group, preferably replaced by is a single bond, —O—, —O(CO), —S—, —(CO)O— or

—NR$^2$—, and wherein the substituent is preferably at least one $C_1$-$C_6$alkyl, preferably methyl;
more preferably
$S^1$ is straight-chain or branched $C_1$-$C_6$alkylen, —O—, —CH$_2$—, —S— and preferably —O—,
$S^2$ represents a single bond or a spacer unit, which is a straight-chain or branched, substituted or unsubstituted $C_1$-$C_{24}$alkylen, in which one or more, preferably non-adjacent, C-atom, CH— or CH$_2$—, group may be replaced by a linking group, and, preferably replaced by is a single bond, —O—, —O(CO), —S—, —(CO)O— or

—NR$^2$—, and wherein the substituent is preferably at least one $C_1$-$C_6$alkyl, preferably methyl.
In a preferred embodiment of the present invention,
D represents unsubstituted or substituted aliphatic, aromatic or alicyclic diamine group having from 1 to 40 carbon atoms,
D is preferably selected from formula (VI):

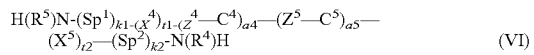
 (VI)

wherein:
$R^4$, $R^5$ each independently from each other represents a hydrogen atom or $C_1$-$C_6$alkyl;
$Sp^1$, $Sp^2$ each independently from each other represents an unsubstituted or substituted straight-chain or branched $C_1$-$C_{24}$alkylene, in which one or more —CH$_2$-group may independently from each other be replaced by a linking group, and
$k^1$, $k^2$ each independently is an integer having a value of 0 or 1; and
$X^4$, $X^5$ each independently represents —O—, —S—, —NH—, —N(CH$_3$)—, —CH(OH)—, —CO—, —CH$_2$(O)—, —SO—, —CH$_2$(SO)—, —SO$_2$—, —CH$_2$(SO$_2$)—, —COO—, —OCO—, —OCO—O—, —S—CO—, —CO—S—, —SOO—, —OSO—, —SOS—, —CH$_2$—CH$_2$—, —OCH$_2$—, —CH$_2$O—, —CH=CH—, or —C≡C— or a single bond; and
$t^1$, $t^2$ each independently is an integer having a value of 0 or 1; and
$C^4$, $C^5$ each independently represents a non-aromatic, aromatic, substituted or unsubstituted carbocyclic or heterocyclic group, which may have a side chain T, and
$Z^4$ and $Z^5$ represent independently from each other a single bond or substituted or unsubstituted straight-chain or branched $C_1$-$C_{24}$alkylene group, in which one or more C-atom, CH— or CH$_2$-group may independently from each other be replaced by a non-aromatic, aromatic, unsubstituted or substituted carbocyclic or heterocyclic group; and/or a heteroatom and/or by a —O—, —CO—, —COO—, —OCO—, —OCF$_2$—, —CF$_2$O—, —CON(CH$_3$)—, —(CH$_3$)NCO—, —CONH—, —NHCO—, —CO—S—, —S—CO—, —CS—S—, —SOO—, —OSO—, —CH$_2$(SO$_2$)—, CH$_2$—OH$_2$—, —OCH$_2$—, —CH$_2$O—, —CH=CH—, —C≡C—, —CH=CH—COO—, —OCO—CH=CH—; preferably, $Z^5$ represents an unsubstituted or substituted straight-chain or branched $C_1$-$C_{14}$alkylene group, $C_1$-$C_6$alkylene in which one or more, preferably non-adjacent, —C-atom, CH— or CH$_2$-group may be replaced by an oxygen or nitrogen atom and/or one or more carbon-carbon single bond is replaced by a carbon-carbon double or a carbon-carbon triple bond; and
$a_4$, $a_5$ are independently integers from 0 to 3, such that $a_4+a_5 \leq 4$, and wherein
D is at least once linked to at least one spacer group $S^2$ and or $S^1$; and/or linked via at least one $Sp^1$, $Sp^2$, $C^4$, $C^5$ and/or $Z^4$; $Z^5$ and wherein at least one of $k^1$, $k^2$, $a^4$ and $a^5$ is not equal to zero.

More preferably, D is selected from formula (VI), wherein:
$C^4$, $C^5$ independently from each other are selected from a compound of group $G^2$,
wherein group $G^2$ denotes:

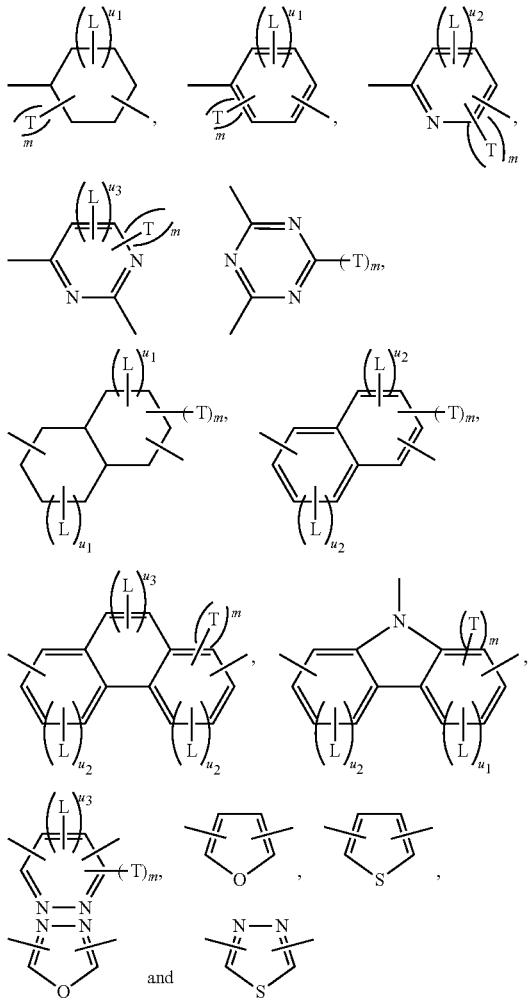

wherein
"-" denotes the connecting bonds of $C^4$ and $C^5$ to the adjacent groups of compound of formula (VI) as described above; and
L is —CH$_3$, —COCH$_3$, —OCH$_3$, nitro, nitrile, halogen, CH$_2$=CH—, CH$_2$=C(CH$_3$)—, CH$_2$=CH—(CO)O—, CH$_2$=CH—O—, —NR$^5$R$^6$, CH$_2$=C(CH$_3$)—(CO)O—, CH$_2$=C(CH$_3$)—O—, wherein:
  $R^5$, $R^6$ each independently from each other represents a hydrogen atom or $C_1$-$C_6$alkyl;
T represents a substituted or unsubstituted straight-chain or branched $C_1$-$C_{24}$alkylene group, in which one or more C-atom, CH— or CH$_2$-group may independently from each other be replaced by a non-aromatic, aromatic, unsubstituted or substituted carbocyclic or heterocyclic group, or a heteroatom and/or by a bridging group;
m is an integer from 0 to 2; preferably 1 or 0; and more preferably 0;
$u_1$ is an integer from 0 to 4, with the proviso that m+$u_1$ is ≤4; and
$u_2$ is an integer from 0 to 3; with the proviso that m+$u_2$ is ≤3; and
$u_3$ is an integer from 0 to 2; with the proviso that m+$u_3$ is ≤2.

The diamine D of the present invention is especially more preferably selected from radicals of the following structure, $D^1$, which is represented by substituted or unsubstituted o-phenylenediamine, p-phenylene-diamine, m-phenylenediamine, biphenyldiamine, aminophenylen-$Z^4$-phenylenamino, wherein $Z^4$ has the same meaning and preferences as given above, especially 4-(4-aminobenzyl)phenylamine, 4-[2-(4-aminophenyl)ethyl]phenyl-amine; naphthylenediamine, benzidine, diaminofluorene, 3,4-diaminobenzoic acid, 3,4-diaminobenzyl alcohol dihydrochloride, 2,4-diaminobenzoic acid, L-(+)-threo-2-amino-1-(4-aminophenyl)-1,3-propanediol, p-aminobenzoic acid, [3,5-3h]-4-amino-2-methoxybenzoic acid, L-(+)-threo-2-(N,N-dimethylamino)-1-(4-aminophenyl)-1,3-propanediol, 2,7-diaminofluorene, 4,4'-diaminooctafluorobiphenyl, 3,3'-diaminobenzidine, 2,7-diamino-9-fluorenone, 3,5,3',5'-tetrabromo-biphenyl-4,4'-diamine, 2,2'-dichloro[1,1'-biphenyl]-4,4'-diamine, 3,9-diamino-1,1'-dimethyl-5,7-dihydro-dibenzo(a,c)cyclohepten-6-one, dibenzo(1,2)dithiine-3,8-diamine, 3,3'-diaminobenzophenone, 3,3'-diaminodiphenylmethane, 4,4-bis-(3-amino-4-hydroxyphenyl)-valeric acid, 2,2-bis(3-amino-4-hydroxyphenyl)-hexafluoropropane, 2,2-bis(3-amino-4-methylphenyl)-hexafluoropropane, tetrabromo methylenedianiline, 2,7-diamino-9-fluorenone, 2,2-bis(3-aminophenyl)hexafluoropropane, bis-(3-amino-4-chlorophenyl)-methanone, bis-(3-amino-4-dimethyl-amino-phenyl)-methanone, 3-[3-amino-5-(trifluoromethyl)benzyl]-5-(trifluoromethyl)aniline, 1,5-diamino-naphthalene, benzidine-3,3'-dicarboxylic acid, 4,4'-diamino-1,1'-binaphthyl, 4,4'-diaminodiphenyl-3,3'-diglycolic acid, dihydroethidium, o-dianisidine, 2,2'-dichloro-5,5'-dimethoxybenzidine, 3-methoxybenzidine, 3,3'-dichlorobenzidine (diphenyl-d$_6$), 2,2'-bis(trifluoromethyl)benzidine, 3,3'-bis (trifluoromethyl)benzidine, 3,3'-dichloro-benzidine-d6, tetramethylbenzidine, di-(aminophenyl)alkylen, and
from amino compounds listed below, which do not carry two amino groups and are taken as derivatives with at least one additional amino group:
aniline, 4-amino-2,3,5,6-tetrafluorobenzoic acid, 4-amino-3,5-diiodobenzoic acid, 4-amino-3-methylbenzoic acid, 4-amino-2-chlorobenzoic acid, 4-aminosalicylic acid, 4-aminobenzoic acid, 4-aminophthalic acid, 1-(4-aminophenyl)ethanol, 4-aminobenzyl alcohol, 4-amino-3-methoxybenzoic acid, 4-aminophenyl ethyl carbinol, 4-amino-3-nitrobenzoic acid, 4-amino-3,5-dinitrobenzoic acid, 4-amino-3,5-dichlorobenzoic acid, 4-amino-3-hydroxybenzoic acid, 4-aminobenzyl alcohol hydrochloride, 4-aminobenzoic acid hydrochloride, pararosaniline base, 4-amino-5-chloro-2-methoxybenzoic acid, 4-(hexafluoro-2-hydroxyisopropyl)aniline, piperazine-p-amino benzoate, 4-amino-3,5-dibromobenzoic acid, isonicotinic acid hydrazide p-aminosalicylate salt, 4-amino-3,5-diiodosalicylic acid, 4-amino-2-methoxybenzoic acid, 2-[2-(4-aminophenyl)-2-hydroxy-1-(hydroxymethyl)ethyl]isoindoline-1,3-dione, 4-amino-2-nitrobenzoic acid, ethyl 2-(4-aminophenyl)-3,3,3-trifluoro-2-hydroxypropanoate, ethyl 2-(4-amino-3-methylphenyl)-3,3,3-trifluoro-2-hydroxypropanoate, ethyl 2-(4-amino-3-methoxyphenyl)-3,3,3-trifluoro-2-hydroxypropanoate, 4-aminon-aphthalene-1,8-dicarboxylic acid, 4-amino-3-chloro-5-methylbenzoic acid, 4-amino-2,6-dimethylbenzoic acid, 4-amino-3-fluorobenzoic acid, 4-amino-5-bromo-2-methoxybenzenecarboxylic acid, 3,3'-tolidine-5-sulfonic acid,
or their derivatives, again with the proviso that compounds listed which do not carry two amino groups are taken as derivatives with at least one additional amino group.

The diamine groups D are commercial available or accessible by known methods. The second amino group is accessible for example by substitution reaction.

D is further especially more preferably selected from the group of the following compounds:

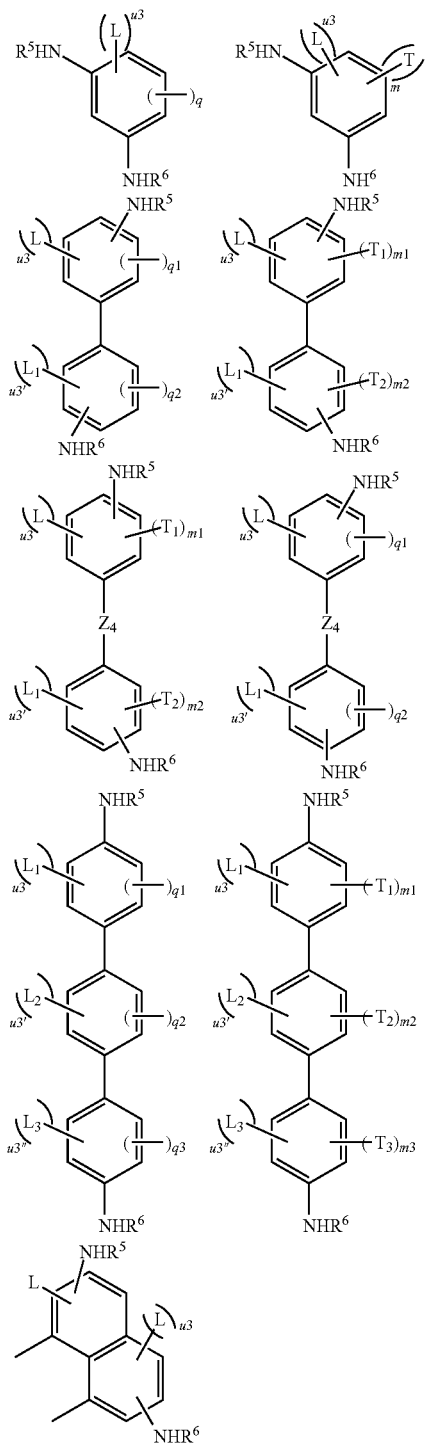

wherein

L, $L_1$, $L_2$ and $L_3$ are independently from each other —$CH_3$, —$COCH_3$, —$OCH_3$, nitro, nitrile, halogen, $CH_2$=CH—, $CH_2$=C($CH_3$)—, $CH_2$=CH—(CO)O—, $CH_2$=CH—O—, —$NR^5R^6$, $CH_2$=C($CH_3$)—(CO)O— or $CH_2$=C($CH_3$)—O—, T, $T_1$, $T_2$ and $T_3$ are independently from each other a substituted or unsubstituted straight-chain or branched $C_1$-$C_{24}$alkylene group, in which one or more C-atom, CH— or $CH_2$—, group may independently from each other be replaced by a non-aromatic, aromatic, unsubstituted or substituted carbocyclic or heterocyclic group, and/or a heteroatom and/or by a linking group;

"-" is a single bond, q is an integer of 1 or 2; and q1, q2 and q3 are independently from each other an integer from 0 to 2; preferably 1 or 2;

m is an integer of 1 or 2;

m1, m2 and m3 are independently from each other an integer from 0 to 2; preferably 1 or 2;

$u_3$, $u_3$' and $u_3$" are independently from each other an integer from 0 to 2;

$R^5$, $R^6$ and $Z^4$ are as described above; preferably $Z^4$ is unsubstituted or substituted straight-chain or branched $C_1$-$C_{14}$alkylene group, $C_1$-$C_6$alkylene in which one or more, preferably non-adjacent, —C-atom, CH— or $CH_2$—, group may be replaced by an oxygen or nitrogen atom; more preferred $Z^4$ is methylen, ethylen, propylen, 2,2-dimethyl-propylen, butylen, pentylen, hexylen, $_2$(—O—$C_1$-$C_6$alkylen)methylen or $_2$(—(CO)O—$C_1$-$C_6$alkylen)methylen or the mono- or bi-radicals thereof, and wherein D is at least once linked to at least one group $S^1$ or $S^2$ via a single bond "-";

or via a side chain T, $T_1$, $T_2$ or $T_3$; or via group $Z^4$;

with the proviso that u3+q, or u3+m is ≤4;

u3+q1 and/or u3'+q2 or/and u3+m1, or/and u3'+m2, or/and u3"+q3, or/and u3"+m3 is 4;

q1+q2, and m1+m2; and q1+q2+q3, and m1+m2+m3 is 1.

Most preferred are diamine compounds according to the invention, wherein D is a selected from the group of the following compounds:

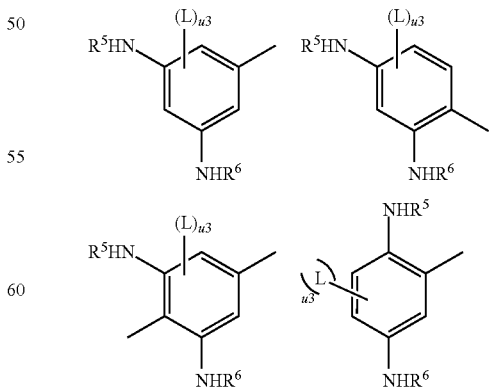

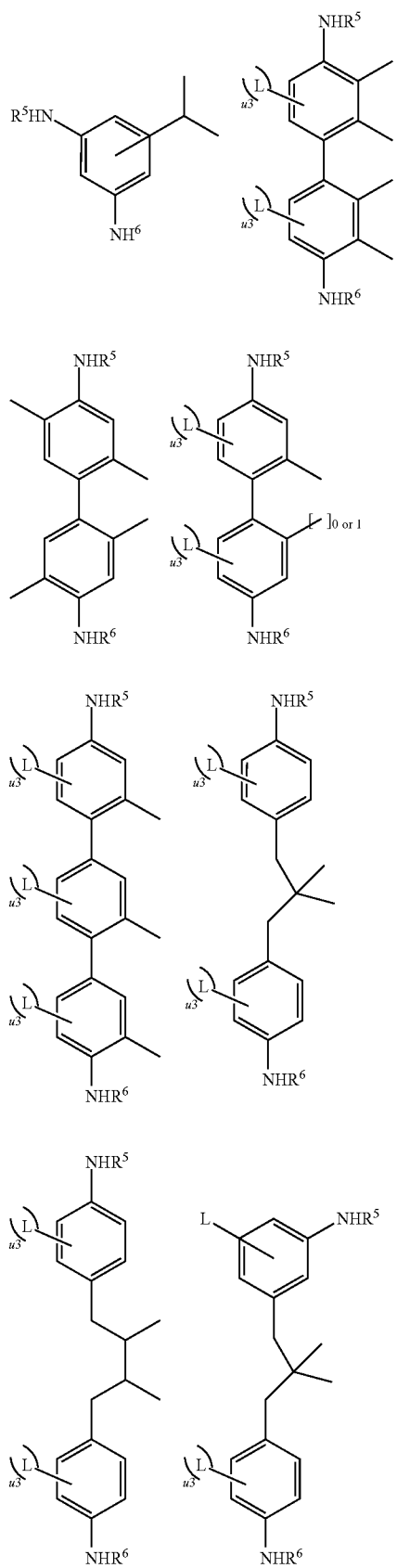
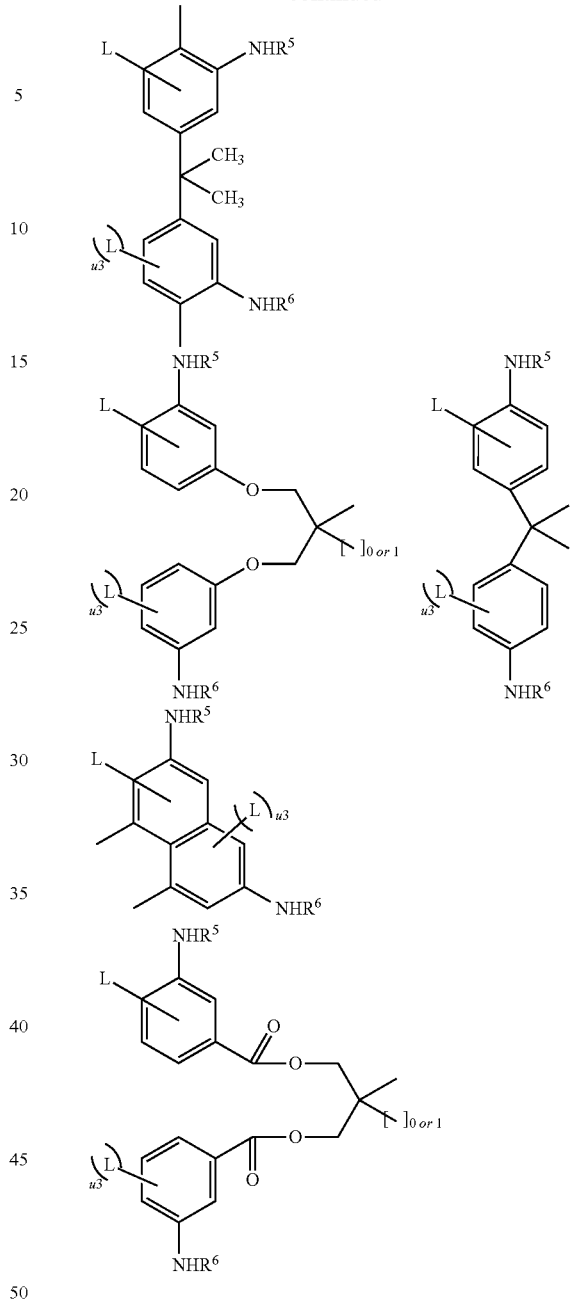

"-" denotes the linking(s) of D to $S^1$ or $S^2$ and represents a single bond; and L is —$CH_3$, —$COCH_3$, —$OCH_3$, nitro, nitrile, halogen, $CH_2$=CH—, $CH_2$=C($CH_3$)—, $CH_2$=CH—(CO)O—, $CH_2$=CH—O—, —$NR^5R^6$, $CH_2$=C($CH_3$)—(CO)O— or $CH_2$=C($CH_3$)—O—, wherein:

$R^5$, $R^6$ each independently from each other represents a hydrogen atom or $C_1$-$C_6$alkyl;

$u_3$ is an integer from 0 to 2.

Additionally, preferred diamine D of the present invention relate to diamines of formulae (VII) to (XV), comprising a group of formula (VII):

$$H_2N\text{-alkylen-}NH_2 \qquad (VII),$$

wherein alkylen is at least once linked to the side chain of formula (I),

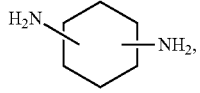 (VIII)

wherein cyclohexylen group is at least once linked to the side chain of formula (I),

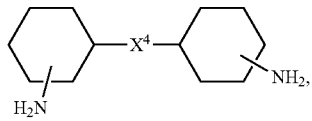 (IX)

wherein $X^4$ or/and cyclohexylen is at least once linked to the side chain of formula (I),

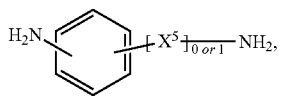 (X)

wherein $X^5$ or/and at phenylene is at least once linked to the side chain of formula (I),
wherein $X^5$ is $C_1$-$C_{30}$alkyl,

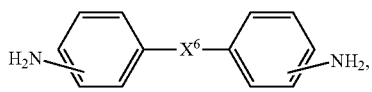 (XI)

wherein $X^6$ or/and phenylene is at least once linked to the side chain of formula (I),

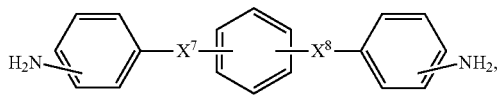 (XII)

wherein $X^7$, $X^8$ or/and phenylene is at least once linked to the side chain of formula (I),

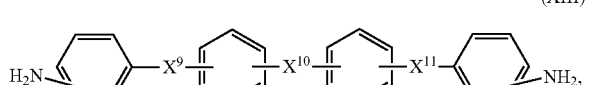 (XIII)

wherein $X^9$, $X^{10}$, $X^{11}$ or/and phenylene is at least once linked to the side chain of formula (I), and
wherein $X^4$, $X^6$, $X^7$, $X^8$, $X^9$, $X^{10}$ and $X^{11}$ are independently from each other a bridging group or a single bond; or diamines of formulae (XIV) selected from the group of compounds given below:

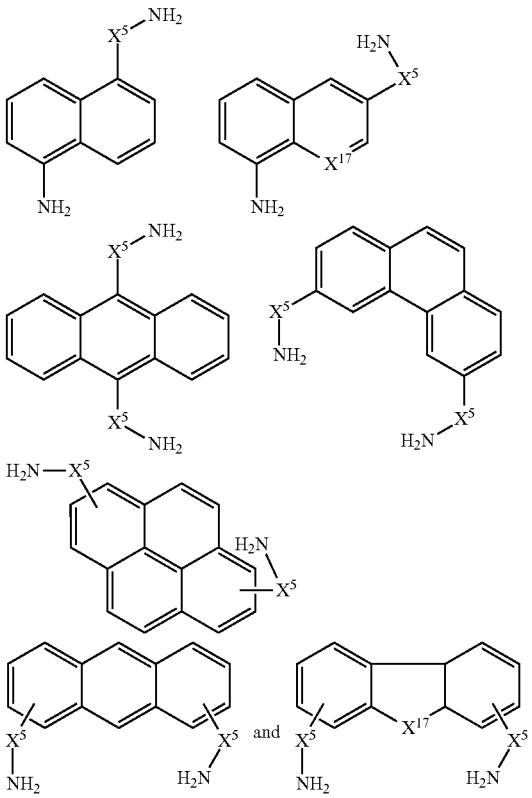

wherein $X^5$ has the meaning given above and $X^{17}$ is $CH_2$, O, NH; and which are linked at the aryl group to the side chain (I),
and (XV)

(XV)

wherein
$R^9$, $R^{10}$, $R^{11}$ have independently from each other the above-described meaning, and $R^9$ and $R^{10}$ are $C_1$-$C_{30}$alkyl, and preferably methyl and $R^{11}$ is 2-methylheptane and n is 0, if y is 1 and y is 0 if n is 1, and y1 is a single or a double bond, and $X^{18}$ is carbonyl or a single bond or NH,
wherein $X^{17}$ is $CH_2$, O, NH, and which are linked at the aryl group to the side chain (I).

The term "alkylen" has the meaning of $(C_1$-$C_{12})$alkylene, which is branched, straight chain, substituted, unsubstituted, uninterrupted or interrupted by a linking group as defined above, and an alicyclic group, such as cyclohexylen or a $C_{17}$-$C_{40}$ alicyclic group, within the meaning and preferences as described above; or —Si($R^3$)$_2$— or —O—Si($R^3$)$_2$—, wherein $R^3$ has the meaning as given above.

Further, preferred in the present invention is diamine D (XV), wherein $X^{12}$ is a substituted or unsubstituted aliphatic, alicyclic group, preferably

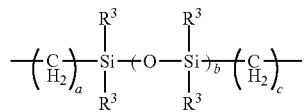

wherein $R^3$ has the same meaning and preferences as given above and a and c are independently from each other 1, 2 or 3, and c is an integer from 1 to 20; such as

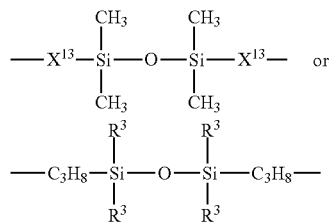

wherein $X^{13}$ is methylen, ethylen, propylene or butylen, and $R^3$ has the same meaning and is preferably methyl, ethyl or propyl.

Preferably, the diamine D (VIII) is on of formula (VIII-1)

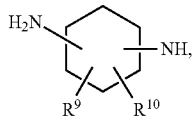

(VIII-1)

wherein $R^9$ and $R^{10}$ are independently from each other hydrogen, halogen, hydroxyl, a carbocyclic or heterocyclic non-aromatic group or $C_1$-$C_{30}$alkyl, which is branched, straight chain, substituted, unsubstituted, uninterrupted or interrupted as described above and preferably interrupted by a linking group, and more preferably by a carbocyclic or heterocyclic non-aromatic group, such as cyclohexylen or a $C_{17}$-$C_{40}$ alicyclic group.

Preferably, the diamine D (IX) is of formula (IX-1)

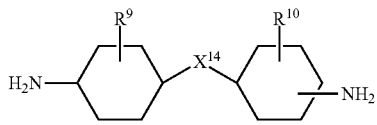

(IX-1)

wherein
$X^{14}$ is a bridging group or a single bond and preferably —COO—, —CONH—; a single bond, —O—, —S—, methylen, ethylen, propylene, $R^9$ and $R^{10}$ are independently from each other hydrogen, halogen, hydroxyl, a carbocyclic or heterocyclic non-aromatic group or $C_1$-$C_{30}$alkyl;
preferably $X^{14}$ is a single bond, or, with $CF_3$, $OCF_3$, F, substituted or unsubstituted methylen, ethylen, propylene, butylen or pentylen and $R^9$ and $R^{10}$ are halogen or substituted or unsubstituted methylen, ethylen, propylene.

Preferably, the diamine D (X) is of formula (X-1)

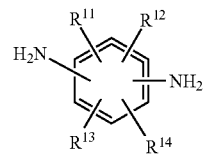

(X-1)

wherein $R^{11}$, $R^{12}$, $R^{13}$ and $R^{14}$ are independently from each other hydrogen, halogen, hydroxyl, a carbocyclic or heterocyclic non-aromatic group or $C_1$-$C_{30}$alkyl. Preferably $C_1$-$C_{30}$alkyl is methyl, ethyl, propyl, butyl, pentyl or hexyl, 1,1'-cyclohexyl, 4-($C_1$-$C_{30}$ alkyl)-cyclohexyl, 3,4''-bis[4'-($C_1$-$C_{30}$alkyl)-1,1'-bi(cyclohexyl)-4-yl], 1,1'-bi(cyclohexyl)-4-yl, 2-pyridine, pyrrolidine-2,5-dione, which is unsubstituted or substituted by $CF_3$, $OCF_3$, F, benzyl, pentyl, benzoic acid ester, 4-(phenoxycarbonyl), carboxylic acid, —$SO_3H$, —$PO_3H$, —$OR^{15}$, wherein $R^{15}$ is $C_1$-$C_{30}$ alkyl, preferably —$C_{12}H_{25}$; unsubstituted or substituted benzyl, preferably, the two $NH_2$ groups of (X-1) are in meta or para position of the phenylene ring; further preferred structures of (X-1) are:

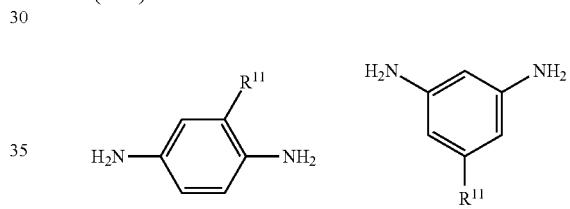

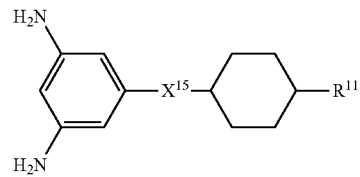

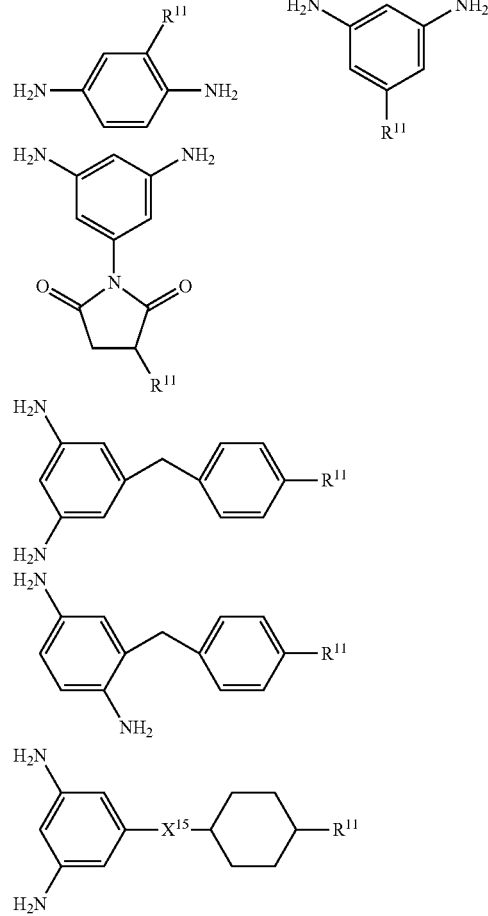

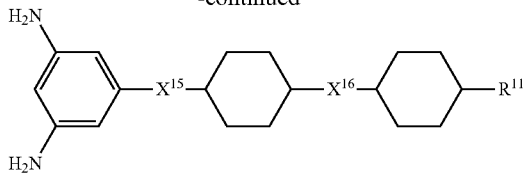

wherein $R^{11}$ has the meaning and preferences as given above, $X^{15}$ and $X^{16}$ are independently from each other a single bond or $C_1$-$C_{30}$alkyl, preferably $C_1$-$C_6$ alkyl, —COO— and —CONH—; —COO($C_1$-$C_6$alkylene)-, —CONH($C_1$-$C_6$alkylene)-.

Further preferred diamine compounds (X) are 1-hexa-decanoxy-2,4-diaminobenzene, 1-octadecanoxy-2,4-diaminobenzene, hexadecanoxy(3,5-diaminonbenzoyl), octadecanoxy(3,5-diaminonbenzoyl).

Preferably, the diamine D (XI) is of formula (XI-1)

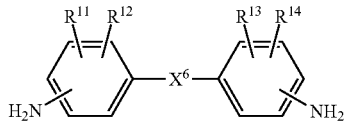 (XI-1)

wherein $X^6$ has the meaning and preferences as given above, and is preferably for example —O—, —S— or substituted or unsubstituted $C_1$-$C_6$alkylen, —O—($CH_2CH_2O)_n$—; —O—($C_1$-$C_{12}$alkyl)$_n$-O—, —S—($C_1$-$C_{12}$alkyl)$_n$—S—, triazine, 1,3,5-triazinane-2,4,6-trione, 1,1'-cyclohexylene, $NR^5((C_1$-$C_6$alkyl)$_n NR^6)$, -(piperidine)$_{n1}$-($C_1$-$C_6$alkyl)$_n$-(piperidine)$_n$, wherein $_n$ is an integer from 1 to 6, and $_{n1}$ are an integer from 0 to 6,
wherein $R^{11}$, $R^{12}$, $R^{13}$ and $R^{14}$ have independently from each other the meaning and preferences as given above.

Further preferred diamine D (XI-1) is:

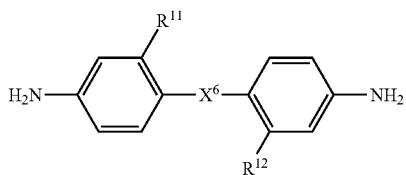

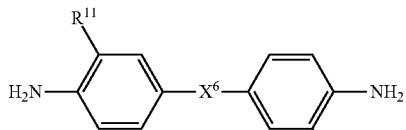

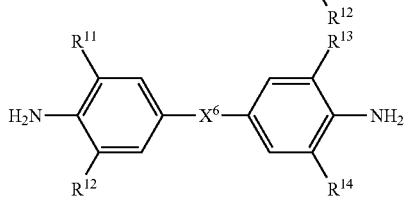

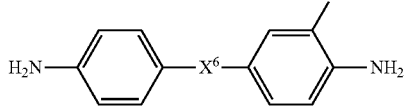

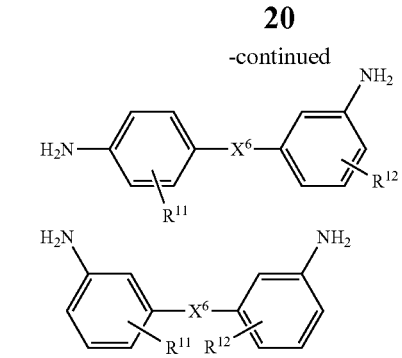

wherein $R^{11}$ and $R^{12}$ are independently from each other have the same meaning as given above, and which are preferably hydrogen, $C_1$-$C_6$alkyl, hydroxy, or 4-($C_1$-$C_{30}$alkyl)-cyclohexyl or 3,4"-bis[4'-($C_1$-$C_{30}$ alkyl)-1,1'-bi(cyclohexyl)-4-yl].

More preferred are diamine D (XI) given below:

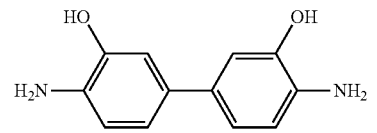

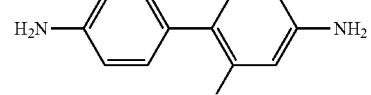

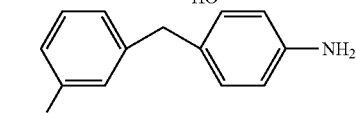

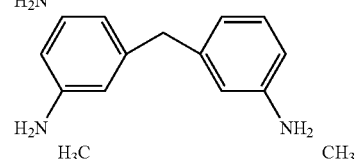

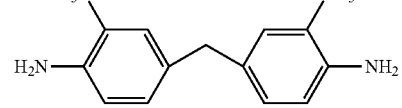

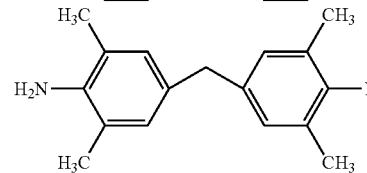

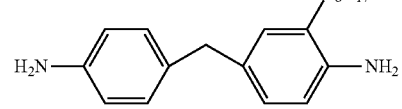

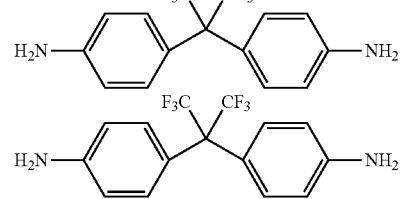

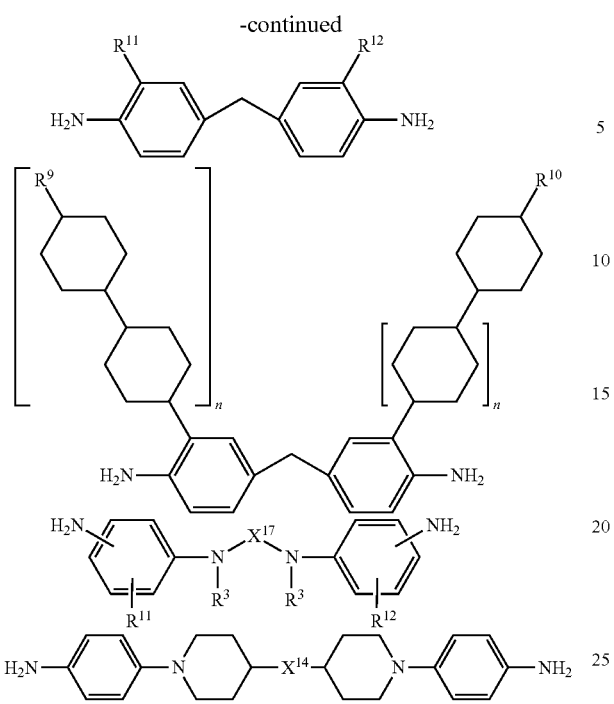

wherein n is independently from each other 0 or 1 and $R^3$, $R^{11}$, $R^{11}$, $X^{14}$ and $X^{17}$ have the same meanings and preferences as given above, and further more preferred are diamine compounds (XI) 4,4'-diaminodiphenyl, 4,4'-diaminodiphenyl-3,3'-dimethoxy, 4,4'-diaminodiphenyl-3,3'-dimethyl, 4,4'-diaminodiphenyl-3,3'-dihydroxy, 4,4'-diamino-diphenylmethane, 4,4'-diaminodiphenylsulfide, 4,4'-diamino-diphenylsulfone, 4,4'-diaminodiphenylcarbonyl, 4,4'-diaminodiphenyl oxomethylene, 4,4'-diaminodiphenyl-bis(trifluoromethyl)-methylene, 4,4'-diaminodiphenyl-bis(trifluoromethyl)methylene-3,3'-dimethoxy or 4,4'-diaminodiphenylbis(trifluoromethyl)methylene-3,3'-dihydroxy, 4,4'-diaminodiphenyl ether, 4,4'-(p-phenyleneiso-propylidene)bisaniline, 2,2-bis[4-(4-aminophenoxy)phenyl]-hexafluoro-propane, 2,2'-bis[4-4-amino-2-trifluoro-methyl-phenoxy-)phenyl]hexafluoropropane, 4,4'-diamino-2,2'-bis/trifluoromethyl)-biphenyl, 4,4'-bis[4-amino-2-trifluoromethyl)phenoxy]-octafluorobiphenyl.

Preferably, the diamine D (XII) and (XII) are diamines, wherein $X^7$ and $X^8$, $X^9$ and $X^{10}$ or $X^{11}$ are a single bond or $C_1$-$C_{30}$alkyl.

Preferably, $X^7$ and $X^8$, $X^9$ and $X^{10}$ or $X^{11}$ are independently from each other a single bond, —O-alkoxy-, such as —O-methylen-, methylen-O—; $C_1$-$C_{12}$alkylen such as methylene, ethylen, propylene, butylen, pentylen or hexylen, substituted or unsubstituted 1,1'-cyclohexylene, —SO—, —S—, —SO$_2$—, —O—, —N($R^{25}$)—, —C(CH$_3$)$_2$—, —C(CF$_3$)$_2$—, 1,1'-cyclohexyl, substituted or unsubstituted 4-(C$_1$-C$_{30}$ alkyl)-cyclohexyl, substituted or unsubstituted 3,4''-bis[4'-(C$_1$-C$_{30}$alkyl)-1,1'-bi(cyclohexyl)-4-yl], 1,1'-bi(cyclohexyl)-4-yl, wherein $R^{11}$ and $R^{12}$ are independently from each other preferably hydrogen, methyl, ethyl, propyl, butyl, pentyl or hexyl; preferably $X^{10}$ is —SO—, —SO$_2$—, —O—, —N(CH$_3$)—, —C(CH$_3$)$_2$—, —C(CF$_3$)$_2$—, 1,1'-cyclohexyl, 4-(C$_1$-C$_{30}$ alkyl)-cyclohexyl, 3,4''-bis[4'-(C$_1$-C$_{30}$ alkyl)-1,1'-bi(cyclohexyl)-4-yl] or 1,1'-bi(cyclohexyl)-4-yl, and wherein $X^9$ and $X^{11}$ are identical and are methylene, ethylen, propylene, butylen, pentylen, hexylen or —O—;

wherein n is an integer from 0 to 3, preferably, 0 or 1; and if n is 0 than $X^9$ and $X^{11}$ are identical and are methylene, ethylene, propylene, butylene, pentylene, hexylene, —O—; —S—, —C(CH$_3$)$_2$—, —C(CF$_3$)$_2$—.

Further preferred diamine D of (XII) is:

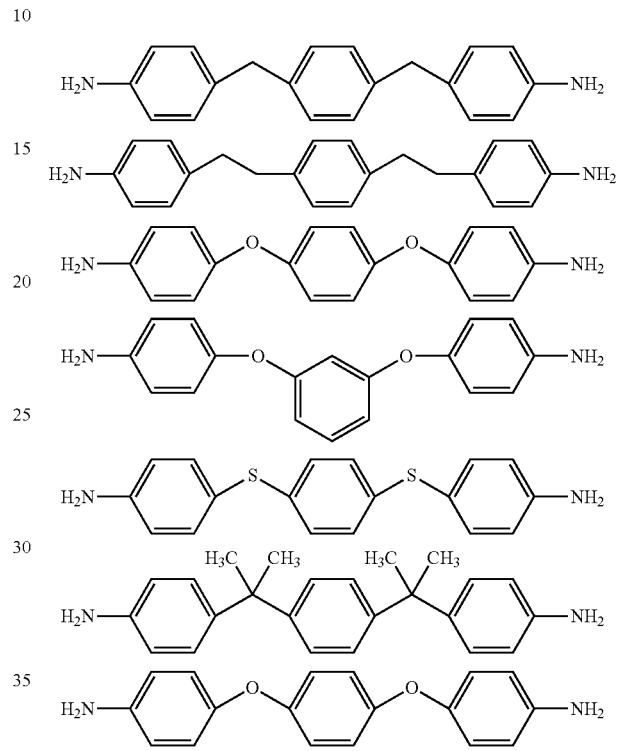

Further preferred diamine D of (XIII) are:

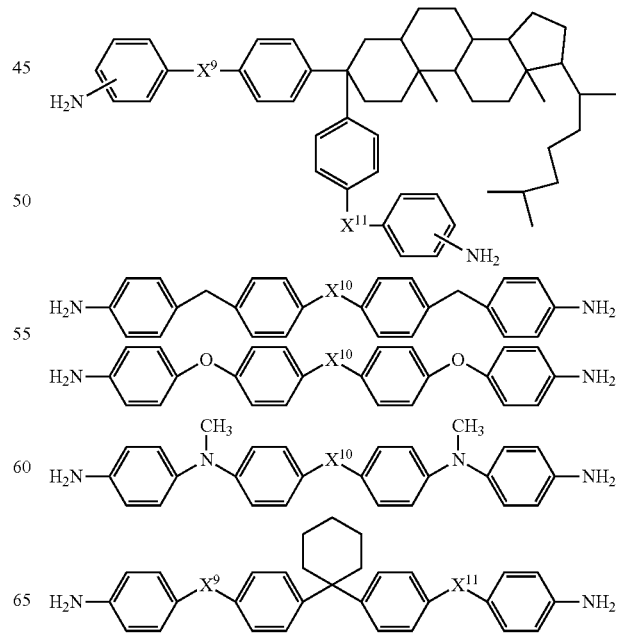

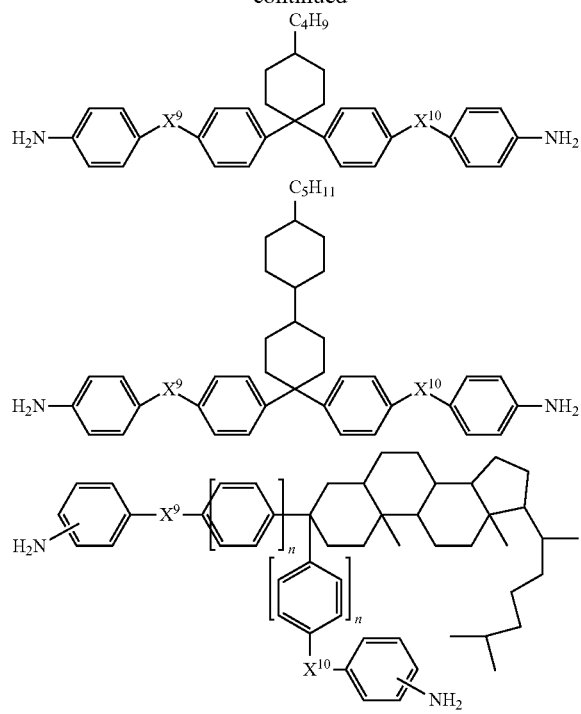

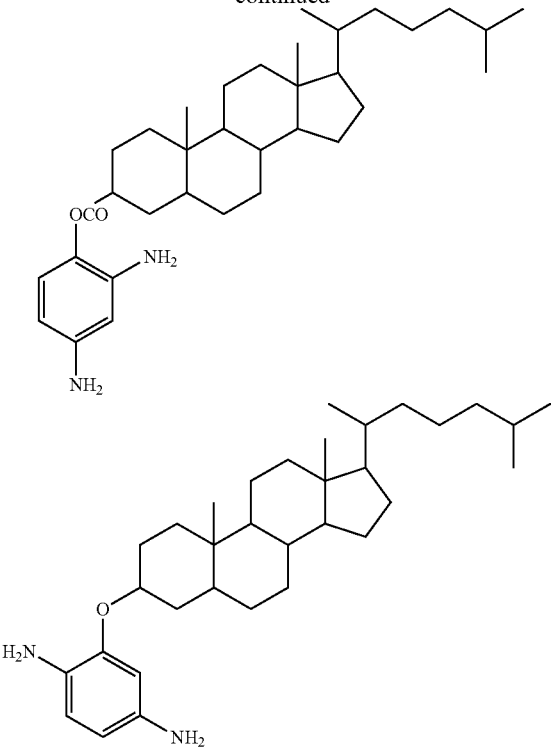

wherein n is 0 or 1, and wherein $X^7$ and $X^8$, $X^9$ and $X^{10}$ or $X^{11}$ have the above given meanings and preferences.

Preferably the diamine D (XIV) is 1,5-diaminonaphthalene, 2,7-diaminofluorene.

Preferably the diamine D (XV) is a compound as given below:

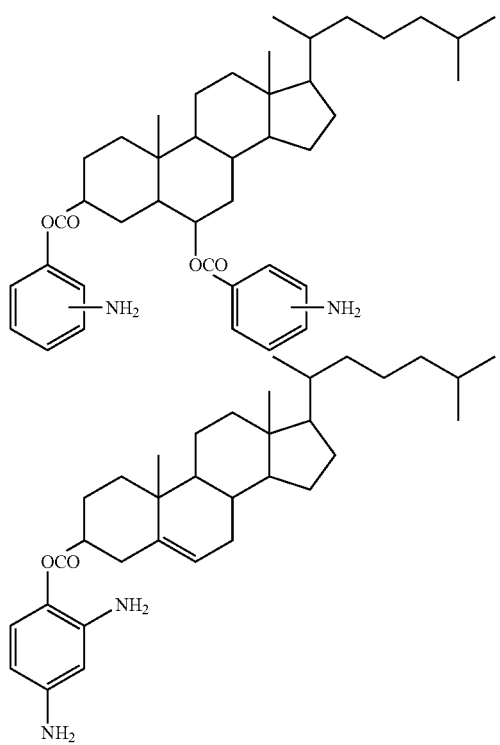

and further, 1-cholesteryl-oxy-2,4-diamino-benzene, 1-cholestanyloxy-2,4-diaminobenzene, cholesteryloxy(3,5-diamino-benzoyl), cholestan-yloxy(3,5-diaminobenzoyl).

Further, enclosed by reference are diamines as described in EP-A-1,818,354 on page 10, lines 48 to 58 and on page 11, lines 1 to 19.

Especially most preferred is a monomer of formula (XVI)

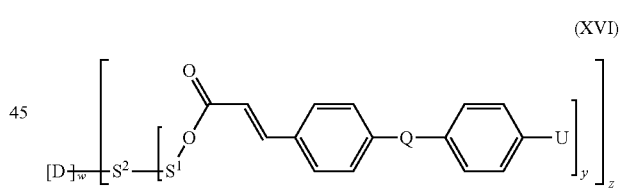

wherein

Q represents —$OCF_2$—, —$CF_2$—O—, —$CF_2S$—, —$SCF_2$—, —$CF_2NH$— or —$NH$—$CF_2$—, preferably —$OCF_2$— or —$CF_2$—O—, more preferably —$OCF_2$—, D represents an unsubstituted or substituted aromatic polymerisable group, preferably a diamine group, more preferably

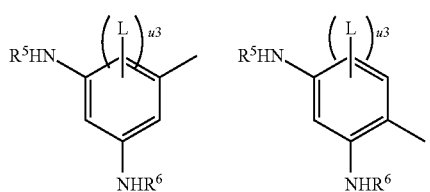

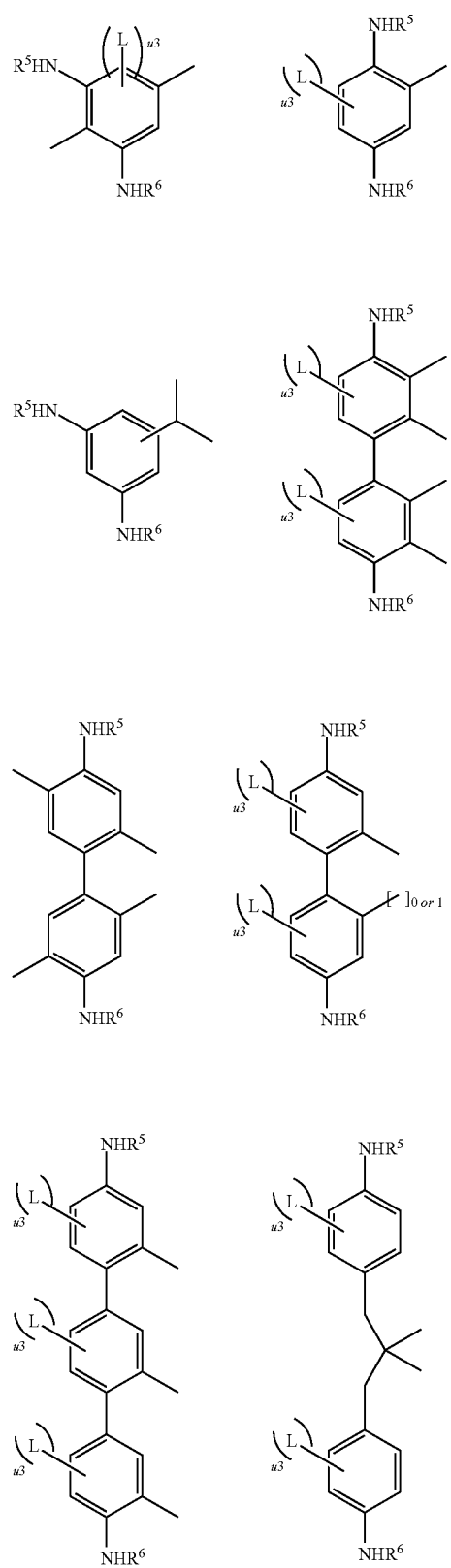
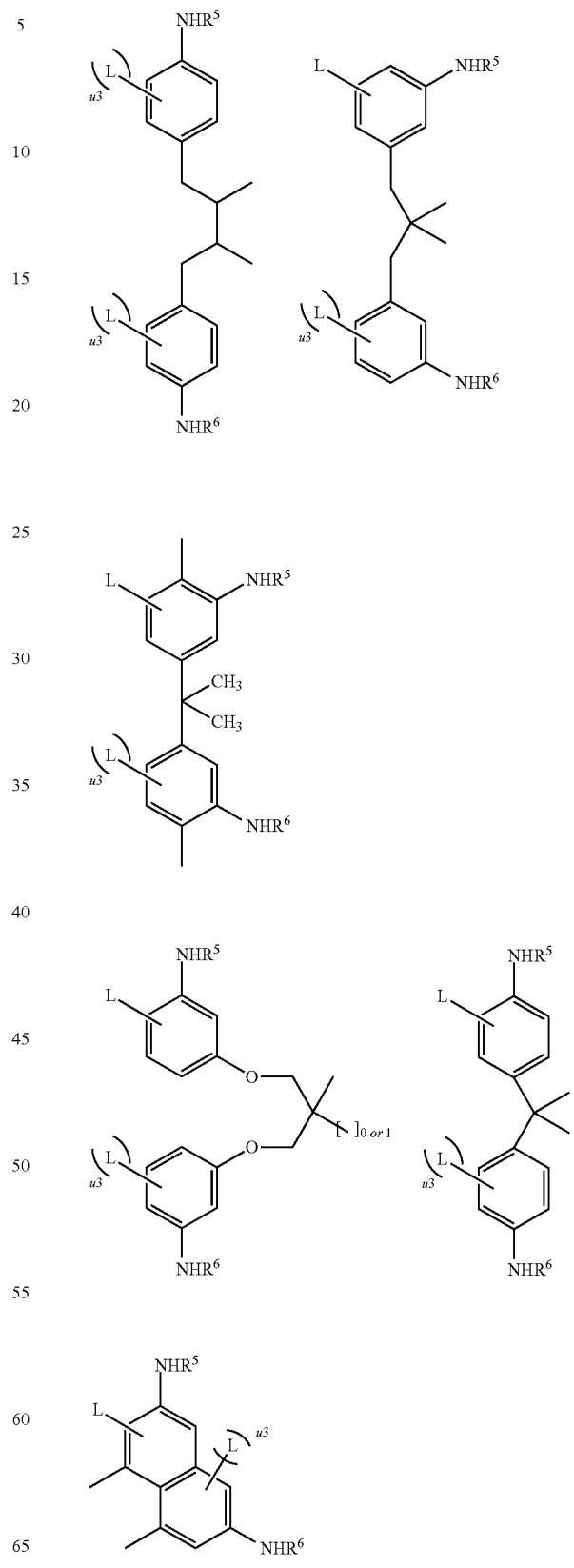

-continued

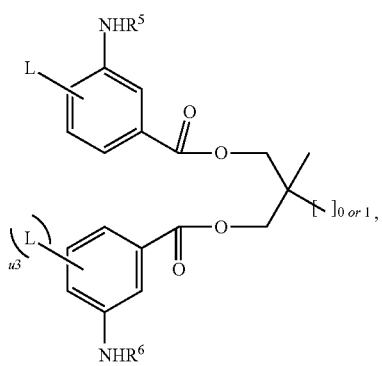

most preferably

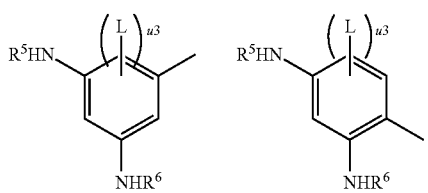

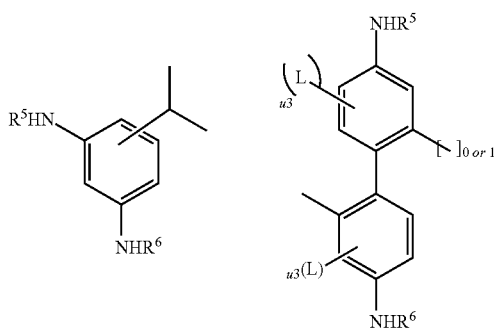

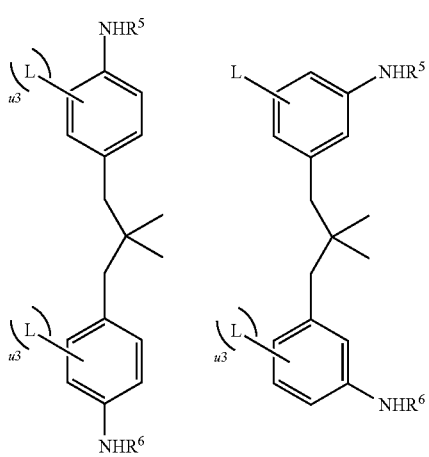

-continued

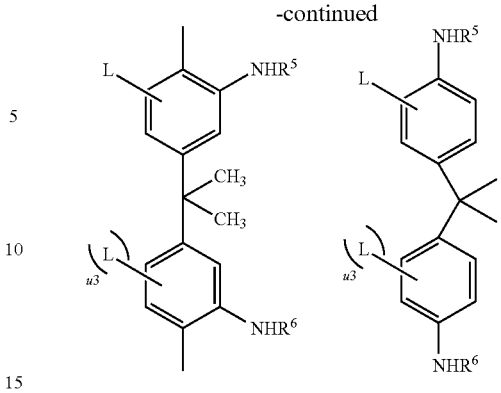

w is 1, 2, 3, and
y and z are each independently from each other 1 or 2;
$S^1$ and $S^2$ represent each independently from each other a single bond or a spacer unit, which is a straight-chain or branched, substituted or unsubstituted $C_1$-$C_{12}$alkylen, in which one or more, preferably non-adjacent, C-atom, CH— or CH$_2$—, group may be replaced by a linking group, preferably replaced by a single bond or at least one —O—, —O(CO), —S—, —(CO)O— or

—NR$^2$—, and wherein the substituent is preferably at least one $C_1$-$C_6$alkyl, more preferably methyl, and
preferably $S^1$ is substituted or unsubstituted, straight-chain or branched $C_1$-$C_6$alkylen in which one or more, preferably non-adjacent, C-atom, CH— or CH$_2$—, group may be replaced by a single bond or at least one —O—, —O(CO), —S—, —(CO)O— or

—NR$^2$—;
$R^1$ represents halogen, $C_1$-$C_{16}$alkoxy, $C_1$-$C_{16}$alkyl, nitro or nitrile, preferably methoxy, chlorine, fluorine or nitrile, and more preferably fluorine,
$R^{1'}$ and $R^{1''}$ have independently from each other the meaning of hydrogen, fluorine, $C_1$-$C_6$alkoxy, nitrile and/or chlorine; preferably hydrogen methoxy, fluorine or chlorine and more preferably hydrogen or fluorine; and
Z and U have the above given meanings and preferences.
More especially most preferred is a monomer of formula (XVII)

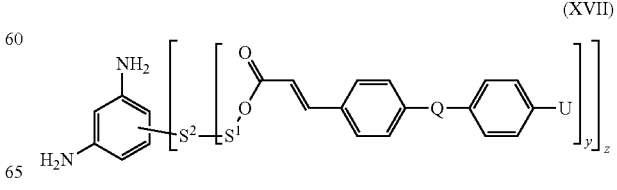

wherein

Q represents —OCF$_2$—, —CF$_2$—O—, —CF$_2$S—, —SCF$_2$—, —CF$_2$NH— or —NH—CF$_2$—, preferably —OCF$_2$— or —CF$_2$—O—, more preferably —OCF$_2$—, and y, z, S$^1$, S$^2$ and U have the above given meanings and preferences; or (XVIII)

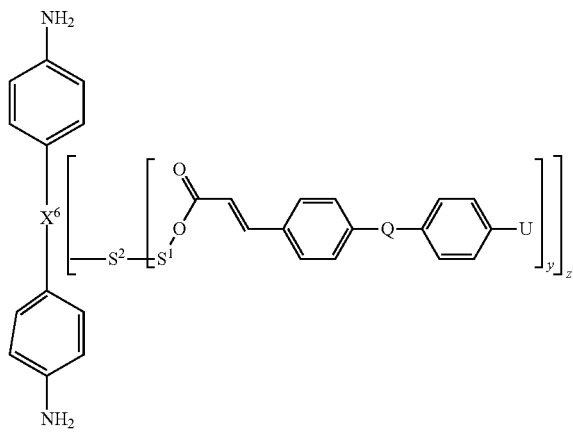

wherein Q, U, S$^1$, S$^2$, y and z have the meanings and preferences as given above and wherein X$^6$ is preferably a single bond or straight-chain or branched, substituted or unsubstituted C$_1$-C$_6$alkylen, preferably propylene, butylen, wherein propylene is linked twice in 2,2-position and butylen is linked in the 2- and 3-position; or (XIX)

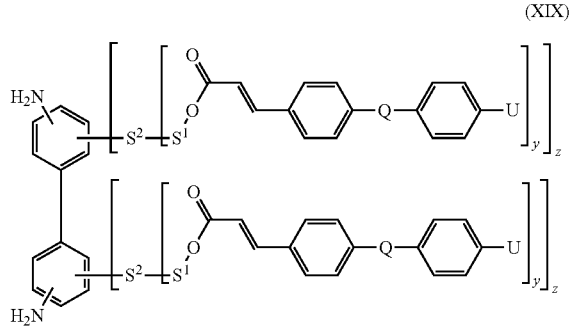

wherein Q, U, S$^1$, S$^2$, y and z have the meanings and preferences as given above and wherein the amino groups are preferably in para position of the biphenyl binding;

Further, most preferred is a monomer comprising a group of formulae (XX) or (XXI)

(XX)

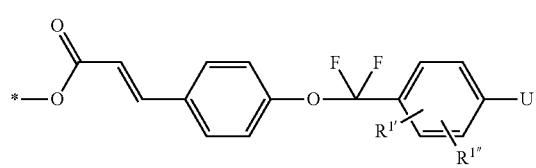

(XXI)

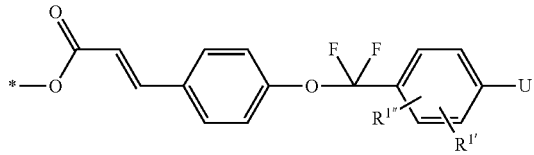

wherein

U and X have the above described meanings and preferences, R$^1$, R$^{1'}$ are independently from each other hydrogen, halogen, C$_1$-C$_{16}$alkoxy, C$_1$-C$_{16}$alkyl, nitro or nitrile, preferably hydrogen, methoxy, fluorine, chlorine or nitrile, and more preferably hydrogen or fluorine.

The present invention also relates to a method for the preparation of the polymer, homo- or copolymer or oligomer, wherein said method comprises polymerising monomer(s) of the invention as described above and with their preferences given above.

Polyamic Acid, Polyimide, Polyamic Acid Ester

The polymer polymer, homo- or copolymer or oligomer, such as polyamic acid, polyamic acid ester and polyimide and mixtures thereof, may be prepared in line with known methods, such as those described in Plast. Eng. 36 (1996), (Polyimides, fundamentals and applications), Marcel Dekker, Inc. and in WO WO2007/071091, on page 64 second paragraph to page 68, line 29.

In a preferred embodiment, the present invention relates to a method for the preparation of polyamic acid by polycondensing at least one tetracarboxylic dianhydride with at least one monomer of formulae (XVI), (XVII), (XVIII), (XIX), or a monomer having a group of formulae (I), (II), (XX) or (XXI).

Further the present invention relates to a method for the preparation of polyimide by
a) by polycondensing at least one tetracarboxylic dianhydride with at least one monomer of formulae (XVI), (XVII), (XVIII), (XIX), or a monomer having a group of formulae (I), (II), (XX) or (XXI), and
b) dehydrating and ring-closure of the above polyamic acid prepared in step a).

Further, the present invention preferably relates to a method, wherein a poly-condensation reaction for the preparation of the polyamic acids is carried out in solution in organic solvents, such as ester, ether, alcohol, amide, lactone, unpolare aprotic solvents, such as toluol, or mixtures thereof. Preferred are a polar aprotic organic solvent, preferably selected from γ-butyrolactone, N,N-dimethylacetamide, N-methylpyrrolidone or N,N-dimethylformamide.

Preferably, the present invention relates a method, wherein subsequent to the poly-condensation cyclisation with removal of water is carried out thermally under formation of a polyimide.

More preferably, the present invention relates a method, wherein imidisation is carried out prior or after the application of the polymer, copolymer or oligomer to a support.

In the context of the present invention the term "polyimide" has the meaning of partially or completely imidisated polyamic acid or polyamic ester. In analogy, the term "imidisation" has in the context of the present invention the meaning of partially or complete imidisation.

Examples of material that may be used for the dehydration are for example acetic anhydride, trifluoroacetic anhydride or propionic anhydride. Examples of material that may be used for the ring-closure catalyst may include for example trimethylamine, pyridine or collidine. A polyamic acid ester is obtained by reacting for example the above polyamic acid with an organic halide, alcohol or phenol.

In addition, the present invention relates to polymer, homo- or copolymer, or oligomer as described above, which are obtainable by the methods described above and the preferred methods given above; or which comprises monomers as described above, which are polymerised, and preferably those of formula (IV), especially more preferred monomers of formula (XVI), especially most preferred monomers of formulae (XVII), (XVIII) or (XIX), and further most preferred monomers having a group of formulae (I), (II), (XX) or (XXI), which are polymerised.

Preferably, the polymer, homo- or copolymer or oligomer of the present invention is represented by polyamic acid, polyimide, polyamic acid ester, and is preferably obtained by the methods described above and the preferred methods given above.

The tetracarboxylic dianhydride used in the present invention is not particularly limited, and represents for examples a compound of formula (XXIII)

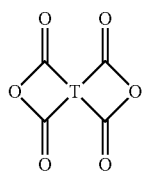

(XXVI)

wherein:
T represents a tetravalent organic radical.

The tetravalent organic radical T is preferably derived from an aliphatic, alicyclic or aromatic tetracarboxylic acid dianhydride.

Preferred examples of aliphatic or alicyclic tetracarboxylic acid dianhydrides are: 1,1,4,4-butanetetracarboxylic acid dianhydride, ethylenemaleic acid dianhydride, 1,2,3,4-cyclobutanetetracarboxylic acid dianhydride,1,2,3,4-cyclopentanetetracarboxylic acid dianhydride; 2,3,5-tricarboxycyclopentylacetic acid dianhydride (with the term "2,3,5-tricarboxycyclopentylacetic acid dianhydride" all isomers of this compound are incorporated especially the exo and/or endo body), 2,3,5-tricarboxycyclopentylacetic-1,2:3,4-dianhydride is accessible for example by processes as described in JP59-190945, JP60-13740 and JP58-109479, respectively DE 1078120 and JP58-109479, or GB 872,355, and JP04458299, which processes are herewith incorporated by reference; tetrahydro-4,8-methanofuro[3,4-d]oxepine-1,3,5,7-tetrone, 3-(carboxymethyl)-1,2,4-cyclopentanetricarboxylic acid 1,4:2,3-dianhydride, hexahydrofuro[3',4':4,5]cyclopenta[1,2-c]pyran-1,3,4,6-tetrone, 3,5,6-tricarboxynorbornylacetic acid dianhydride, 2,3,4,5-tetrahydrofurantetracarboxylic acid dianhydride,rel-[1S,5R,61R]-3-oxabicyclo[3.2.1]octane-2,4-dione-6-spiro-3'-(tetrahydrofuran2',5'-dione), 4-(2,5-dioxotetrahydrofuran-3-yl)tetrahydronaphthalene-1,2-dicarboxylicacid dianhydride, 5-(2,5-dioxotetrahydrofuran-3-yl)-3-methyl-3-cyclohexene-1,2-dicarboxylic-acid dianhydride, bicyclo[2.2.2]oct-7-ene-2,3,5,6-tetracarboxylic acid dianhydride, bicyclo[2.2.2]octane-2,3,5,6-tetracarboxylic acid dianhydride, 1,8-dimethylbicyclo[2.2.2]oct-7-ene-2,3,5,6-tetracarboxylic acid dianhydride, pyromellitic acid dianhydride,3,3',4,4'-benzophenonetetracarboxylic acid dianhydride, 4,4'-oxydiphthalic acid dianhydride, 3,3',4,4'-diphenylsulfonetetracarboxylic acid dianhydride, 1,4,5,8-naphthalenetetracarboxylic acid dianhydride,2,3,6,7-naphthalenetetracarboxylic acid dianhydride, 3,3',4,4'-dimethyldiphenylsilanetetracarboxylic acid dianhydride, 3,3',4,4'-tetraphenylsilanetetracarboxylic acid dianhydride, 1,2,3,4-furantetracarboxylic acid dianhydride, 4,4'-bis(3,4-dicarboxyphenoxy)diphenyl sulfide dianhydride, 4,4'-bis(3,4-dicarboxyphenoxy)-diphenyl sulfone dianhydride, 4,4'-bis(3,4-dicarboxyphenoxy)-diphenylpropane dianhydride, 3,3',4,4'-biphenyltetracarboxylic acid dianhydride, ethylene glycol bis(trimellitic acid) dianhydride, 4,4'-(1,4-phenylene)bis(phthalic acid) dianhydride, 4,4'-(1,3-phenylene)bis(phthalic acid) dianhydride, 4,4'-(hexafluoroisopropylidene) diphthalic acid dianhydride, 4-tert-butyl-6-(2,5-dioxotetrahydro-3-furanyl)-2-benzofuran-1,3-dione, 5-(2,5-dioxotetrahydro-3-furanyl)-3a,4,5,9b-tetrahydronaphtho[1,2-c]furan-1,3-dione, 5-(2,5-dioxotetrahydro-3-furanyl)-5-methyl-3a,4,5,9b-tetrahydronaphtho[1,2-c]furan-1,3-dione, 5-(2,5-dioxotetrahydro-3-furanyl)-6-methylhexahydro-2-benzofuran-1,3-dione, 5-(2,5-dioxotetrahydro-3-furanyl)-7-methyl-3a,4,5,7a-tetrahydro-2-benzofuran-1,3-dione, 6-(2,5-dioxotetrahydro-3-furanyl)-4-methylhexahydro-2-benzofuran-1,3-dione, 9-isopropyloctahydro-4,8-ethenofuro[3',4':3,4]cyclobuta[1,2-f][2]benzofuran-1,3,5,7-tetrone, 1,2,5,6-cyclooctanetetracarboxylic acid dianhydride, octahydro-4,8-ethenofuro[3',4':3,4]cyclobuta[1,2-f][2]benzofuran-1,3,5,7-tetrone, octahydrofuro[3',4':3,4]cyclobuta[1,2-t][2]benzofuran-1,3,5,7-tetrone, tetrahydro-3,3'-bifuran-2,2',5,5'-tetrone, 4,4'-oxydi(1,4-phenylene)bis(phthalic acid) dianhydride, and 4,4'-methylenedi(1,4-phenylene)bis(phthalic acid) dianhydride.

Preferred examples of aromatic tetracarboxylic acid dianhydrides are:
pyromellitic acid dianhydride,
3,3',4,4'-benzophenonetetracarboxylic acid dianhydride,
4,4'-oxydiphthalic acid dianhydride,
3,3',4,4'-diphenylsulfonetetracarboxylic acid dianhydride,
1,4,5,8-naphthalenetetracarboxylic acid dianhydride,
2,3,6,7-naphthalenetetracarboxylic acid dianhydride,
3,3',4,4'-dimethyldiphenylsilanetetracarboxylic acid dianhydride,
3,3',4,4'-tetraphenylsilanetetracarboxylic acid dianhydride,
1,2,3,4-furantetracarboxylic acid dianhydride,
4,4'-bis(3,4-dicarboxyphenoxy)diphenyl sulfide dianhydride,
4,4'-bis(3,4-dicarboxyphenoxy)diphenyl sulfone dianhydride,
4,4'-bis(3,4-dicarboxyphenoxy)diphenylpropane dianhydride,
3,3',4,4'-biphenyltetracarboxylic acid dianhydride, ethylene glycol bis(trimellitic acid) dianhydride,
4,4'-(1,4-phenylene)bis(phthalic acid) dianhydride,
4,4'-(1,3-phenylene)bis(phthalic acid) dianhydride,
4,4'-(hexafluoroisopropylidene)diphthalic acid dianhydride,
4,4'-oxydi(1,4-phenylene)bis(phthalic acid) dianhydride,
4,4'-methylenedi(1,4-phenylene)bis(phthalic acid) dianhydride,
4-tert-butyl-6-(2,5-dioxotetrahydro-3-furanyl)-2-benzofuran-1,3-dione, and the like.

More preferably the tetracarboxylic acid dianhydrides used to form the tetravalent organic radical T are selected from:
1,2,3,4-cyclobutanetetracarboxylic acid dianhydride,
1,2,3,4-cyclopentanetetracarboxylic acid dianhydride,
2,3,5-tricarboxycyclopentylacetic acid dianhydride, tetrahydro-4,8-methanofuro[3,4-d]oxepine-1,3,5,7-tetrone, 3-(carboxymethyl)-1,2,4-cyclopentanetricarboxylic acid 1,4:2,3-dianhydride, hexahydrofuro[3',4':4,5]cyclopenta[1,2-c]pyran-1,3,4,6-tetrone,
5-(2,5-dioxotetrahydrofuran-3-yl)-3-methyl-3-cyclohexene-1,2-dicarboxylic acid dianhydride, pyromellitic acid dianhydride,
4-(2,5-dioxotetrahydrofuran-3-yl)tetrahydronaphthalene-1,2-dicarboxylic acid dianhydride,
5-(2,5-dioxotetrahydro-3-furanyl)-5-methyl-3a,4,5,9b-tetrahydronaphtho[1,2-c]furan-1,3-dione,
5-(2,5-dioxotetrahydro-3-furanyl)-3a,4,5,9b-tetrahydronaphtho[1,2-c]furan-1,3-dione,
5-(2,5-dioxotetrahydro-3-furanyl)-7-methyl-3a,4,5,7a-tetrahydro-2-benzofuran-1,3-dione,
4-tert-butyl-6-(2,5-dioxotetrahydro-3-furanyl)-2-benzofuran-1,3-dione,
4,4'-(hexafluorneoisopropylidene)diphthalic acid dianhydride and
bicyclo[2.2.2]oct-7-ene-2,3,5,6-tetracarboxylic acid dianhydride.

A further embodiment of the present invention relates to a composition comprising a polymer, homo- or copolymer, or oligomer as described above and within the above given preferences, or a monomer as described and within the above given preferences.

Preferred is a composition comprising at least one monomer of formulae (XVI), (XVII), (XVIII), (XIX), or preferably a monomer having a group of formulae (I), (II), (XX) or (XXI), and more preferably at least two diamine monomers, as described above and with all given preferences thereof, or preferably at least two diamines, wherein at least one diemaine monomer is linked to the side chain of formula (I) and the other diamine is $D^2$, which has the same meaning and preferences as D or $D^1$ as described in the present invention except that it is not a radical group which is linked to the side chain of formula (I), however is saturated at this potential linking position with hydrogen.

Most preferred are the compositions comprising a monomer of the invention comprising
a) at least two different tetracarboxylic dianhydrides, especially 1,2,3,4-cyclobutane-tetracarboxylic acid dianhydride, and 2,3,5-tricarboxycyclo-pentylacetic acid dianhydride, or/and
b) two different monomers of formulae (IV), (XVI), wherein D is a diamino group, or (XVII), (XVIII), (XIX), or a monomer having a group of formulae (I), (II), (XX) or (XXI) which comprise a polymerisable diamino group; and
c) optionally a further diamine $D^2$, which has the same meaning and preferences as D or $D^1$ as described in the present invention except that it is not a radical group which is linked to the side chain of formula (I), however is saturated at this potential linking position with hydrogen. Preferred further diamine is for example a diamine comprising a steroidal skeleton such as cholesterol, or an alicyclic group within the above given meanings and preferences, or aminophenylen-$Z^4$-phenylenamino, wherein $Z^4$ has the same meaning and preferences as given above, especially 4-(4-aminobenzyl)-phenylamine or 4-[2-(4-aminophenyl)ethyl]phenyl-amine; and
d) optionally organic solvents, and
e) optionally epoxy-, acrylate-, methacrylate-, vinyl-compounds, and
f) optionally additives.

A more preferred composition of the present invention comprises a polymer, homo- or copolymer, or oligomer in addition comprises epoxy-, acrylate-, methacrylate-, vinyl-compounds.

Preferred copolymers comprise polymerised diamino monomers having two different side chains comprising a group of formula (I), or one side chain comprising a group of formula (I) and the other comprising a steroidal skeleton such as cholesterol, or 1, 2, 3, 4, or 5 alicyclic groups which may be interrupted by a bridging group within the above given meanings and preferences; and preferred are cyclohexane or a steroidal skeleton.

The compositions, preferably blends comprising a polymer, homo- or copolymer or oligomer comprising, according to the invention may optionally further include organic solvent. Organic solvent includes, however, is not limited to chlorobenzene, N-methylpyrrolidone, dimethylsulfoxide, dimethylformamide, toluene, chloroform, organic ester, such as acetyl acetic ester or butyl acetic ester; further y-butyrolactone, methyl cellosolve, butyl cellosolve, butyl carbitol, tetrahydrofuran, etc. These solvents can be used alone or in mixtures thereof.

Further, the present invention may comprise additives such as cross-linking agents, such as epoxy-, acrylate-, methacrylate-agents such as for example the photoalignment additives as disclosed in US 2009/0290109; or additives selected from the following group: 4,4'-methylene-bis-(N,N-diglycidylaniline), trimethylolpropane triglycidyl ether, benzene-1,2,4,5-tetracarboxylic acid 1,2,4,5-N,N'-diglycidyldiimide, polyethylene glycol diglycidyl ether and N,N-diglycidylcyclohexylamine.

Preferably, the composition of the invention comprises 0.5% to 99% by weight of a polymer, homo- or copolymer or oligomer as described above, preferably one comprising group (I); and 99.5 to 1% by weight of an organic solvent. Preferably, the composition, preferably blend, comprises 0.5 to 40% by weight and more preferably 0.5 to 10% by weight and most preferably 0.5 to 5% by of a polymer, homo- or copolymer or oligomer as described above, preferably one comprising group (I)

The polymer, homo- or copolymer or oligomer as described above may be used in form of polymer layers, homo- or copolymer layers, or oligomer layers alone or in combination with other polymers homo- or copolymers or oligomers monomers, photo-active polymers, photo-active oligomers and/or photo-active monomers, depending upon the application to which the polymer or oligomer layer is to be added. Therefore it is understood that by varying the composition of the polymer layer, homo- or copolymer layer, or oligomer layer it is possible to control specific and desired properties, such as an induced pre-tilt angle, good surface wetting, a high voltage holding ratio or a specific anchoring energy.

In the context of the present invention polymer layer has the meaning of oligomer, homopolymer or copolymer layer.

Preferably, the invention relates to a polymer layer comprising a polymer according to the present invention in a cross-linked and/or isomerized form.

The present invention also relates to a method for the preparation of polymer layers by using the polymer, homo- or copolymer or oligomer of the present invention.

Preferred is a method for the preparation of polymer layers which comprises treating a polymer according to the invention with aligning light.

The polymer layer is preferably prepared by applying one or more polymers according to the invention to a support and, after imidisation or without imidisation, treating, preferably cross-linking and/or isomerising, the polymer or composition comprising the polymer by irradiation with aligning light.

The treatment with aligning light may be conducted in a single step or in several separate steps. In a preferred embodiment of the invention the treatment with aligning light is conducted in a single step.

In the context of the present invention, aligning light is light of wavelengths, which can initiate photoalignment. Preferably, the wavelengths are in the UV-A, UVB and/or UV/C-range, or in the visible range. It depends on the photoalignment compound, which wavelengths are appropriate. Preferably, the photo-reactive groups are sensitive to visible and/or UV light. A further embodiment of the invention relates to the generating of aligning light by laser light. The instant direction of the aligning light may be normal to the substrate or at any oblique angle.

For generating tilt angles, preferably the aligning light is exposed from oblique angles. More preferably, aligning light is at least partially linearly polarized, elliptically polarized, such as for example circularly polarized, or non-polarized; most preferably at least circularly or partially linearly polarized light, or non-polarized light exposed obliquely. Especially, most preferred aligning light denotes substantially polarised light, especially linearly polarised light; or aligning light denotes non-polarised light, which is applied by an oblique irradiation. In a more preferred embodiment of the invention the polymer, copolymer or oligomer is treated with polarised light, especially linearly polarised light, or by oblique radiation with non-polarised light.

In general, transparent support such as glass or plastic, which are not flexible or flexible substrates, optionally coated with indium tin oxide (ITO) is used. Flexible substrates are used for flexible LCDs.

Further, it is possible to vary the direction of orientation and the tilt angle within the polymer layer by controlling the direction of the irradiation of the aligning light. It is understood that by selectively irradiating specific regions of the polymer layer very specific regions of the layer can be aligned. In this way, layers with a defined tilt angle can be provided. The induced orientation and tilt angle are retained in the polymer layer by the process, especially by the process of crosslinking.

Further preferred methods of the invention relates to
  a method for the preparation of a polymer layer, which are vertically or planar aligned, preferably vertical;
  a method for the preparation of multi-domain vertical alignment of a polymer layer;
  a method for the preparation of a polymer layer with tilted optical axis.

A further embodiment of the present invention relates to a polymer layer, in particular orientation layer, comprising at least one polymer, homo- or copolymer or oligomer as described above or obtained as described above.

It is understood that the polymer layers of the present invention (in form of a polymer gel, a polymer network, a polymer film, etc.) can also be used as orientation layers for liquid crystals. A further preferred embodiment of the invention relates to an orientation layer comprising one or more polymers or oligomers according to the invention, preferably in a cross-linked form. Such orientation layers can be used in the manufacture of unstructured or structured optical- or electro-optical elements, preferably in the production of hybrid layer elements.

The present invention the wording optical or electro-optical elements has for example the meaning of multilayer systems, or devices for the preparation of a display waveguide, a security or brand protection element, a bar code, an optical grating, a filter, a retarder, a compensation film, a reflectively polarizing film, an absorptive polarizing film, an anisotropically scattering film compensator and retardation film, a twisted retarder film, a cholesteric liquid crystal film, a guest-host liquid crystal film, a monomer corrugated film, a smectic liquid crystal film, a polarizer, a piezoelectric cell, a thin film exhibiting non linear optical properties, a decorative optical element, a brightness enhancement film, a component for wavelength-band-selective compensation, a component for multi-domain compensation, a component of multiview liquid crystal displays, an achromatic retarder, a polarization state correction/adjustment film, a component of optical or electro-optical sensors, a component of brightness enhancement film, a component for light-based telecommunication devices, a G/H-polarizer with an anisotropic absorber, a reflective circular polarizer, a reflective linear polarizer, a MC (monomer corrugated film), twisted nematic (TN) liquid crystal displays, hybrid aligned nematic (HAN) liquid crystal displays, electrically controlled birefringence (ECB) liquid crystal displays, supertwisted nematic (STN) liquid crystal displays, optically compensated birefringence (OCB) liquid crystal displays, pi-cell liquid crystal displays, in-plane switching (IPS) liquid crystal displays, fringe field switching (FFS) liquid crystal displays; (PSVA) polymer stabilised vertically aligned; (FPA) field-induced photo-reactive alignment; hybrid FPA; vertically aligned (VA), preferably (MVA=multidomain vertical alignment), (PVA) patterned VA; VA-IPS mode liquid crystal displays, or displays using blue phase liquid crystals; all above display types are applied in either transmissive or reflective or transflective mode.

In addition, the present invention relates to a method for the preparation of a polymer, wherein one or more polymers, copolymers or oligomers according to the present invention is applied to a support, preferably from a solution of the polymer or oligomer material and subsequent evaporation of the solvent, and wherein, after any imidisation step which may be necessary, the polymer or oligomer or polymer composition treated with aligning light, and preferably isomerized and/or cross-linked by irradiation with aligning light.

A preferred method of the present invention relates to a method, wherein the direction of orientation and the tilt angle within the polymer layer is varied by controlling the direction of the irradiation with aligning light, and/or wherein by selectively irradiating specific regions of the polymer layer specific regions of the layer are aligned.

The orientation layers are suitably prepared from a solution of the photoalignment material. The polymer solution is applied to a support optionally coated with an electrode [for example a glass plate coated with indium-tin oxide (ITO)] so that homogeneous layers of 0.05 to 50 μm thickness are produced. In this process different coating techniques like spin-coating, meniscus-coating, wire-coating, slot-coating, offset-printing, flexo-printing, gravure-printing may be used. Then, or optionally after a prior imidisation step, the regions to be oriented are irradiated, for example, with a high-pressure mercury vapor lamp, a xenon lamp or a pulsed UV laser, using a polarizer and optionally a mask for creating images of structures.

Further, the present invention relates to the use of a polymer layer according to the present invention, preferably in cross-linked form, as an orientation layer for liquid crystals.

Further, the present invention relates to preferably the use of a polymer layer for the induction of vertical alignment of adjacent liquid crystalline layers, in particular for operating a cell in MVA mode.

The irradiation time is dependent upon the output of the individual lamps and can vary from a few seconds to several hours. The photo-reaction (dimerization, polymerisation, cross-linking) can also be carried out, however, by irradiation of the homogeneous layer using filters that, for example, allow only the radiation suitable for the cross-linking reaction to pass through.

It is understood that the polymer layers of the invention may be used in the production of optical or electro-optical devices having at least one orientation layer as well as unstructured and structured optical elements and multi-layer systems.

The present invention relates to the use of a polymer layer as an orientation layer for liquid crystals. Preferred is the use for the induction of alignment, such as vertical alignment or planar alignment of adjacent liquid crystalline layers.

A further embodiment of the invention relates to an optical or electro-optical device comprising one or more polymers or oligomers according to the present invention in cross-linked form. The electro-optical devices may comprise more than one layer. The layer, or each of the layers may contain one or more regions of different spatial orientation. Preferably, the present invention relates to an optical and electro-optical unstructured or structured constructional element, preferably liquid crystal display cells, multi-layer and hybrid layer elements, comprising at least one polymer layer according to the present invention.

More preferably, the present invention relates to an orientation layer, comprising at least one polymer layer according to the present invention.

The advantages of the present invention could not be foreseen by a skilled person. It has surprisingly been found that with this new class of materials, the process window is very broad. This material is very versatile regarding the process window that it suits the specific manufacturing conditions of different display production lines. Advantageously, there are a lot of possibilities for optimizing and improving electro optical properties, or power consumption by changing the process parameters, exposure energies and incidence angles of irradiation and still gives access to excellent alignment properties.

EXAMPLES

Definitions Used in the Examples
Mass spectroscopy EI=EI (electron-impact)
ES=electron spray
[M+H]=MolecularMass plus proton
$^1$H NMR=$^1$H nuclear magnetic resonance spectroscopy
$^{19}$F NMR=$^{19}$F nuclear magnetic resonance spectroscopy
DMSOd$_6$=dimethylsulfoxide deutererd
300 MHz=300 Megaherz
M$^+$=MolecularMass of the cation
m=multiplett
d=douplet
dd=double douplet
t=triplett
s=sigulett
q=quintett
br=broad
δ=chemical shift
HCl=hydrogen chloride
HCl solution (25%)=volume percent
NaOH=sodium hydroxide
NaOH (30%)=weight percent
NMP=N-methyl-2-pyrrolidone
THF=tetrahydrofuran
TBME=tert. butyl methyl ether
DMF=dimethylformamide
Pd(OAc)$_2$=Palladiumacetate
Pretilt=tilt of liquid crystal
RT=room temperature
Pd/C=palladium/carbon
MLC-6610(Merck KGA)=Licristal®, MLC-6610(Merck KGA), nematic liquid crystal
Accessibility of Starting Materials 4-(4,4,4-trifluorobutoxy)benzoic is prepared according to the process described in WO 2007/071091 A1 pages 76 which is herewith incorporated by reference.

The 2,3,5-tricarboxycyclopentylacetic-1,2:3,4-dianhydride used in these examples comprises ≥99% in exo body content. The said exo body content is defined as ratio (%) of the whole content . 2,3,5-tricarboxycyclopentylacetic-1,2:3,4-dianhydride is accessible by processes as described in JP59-190945, JP60-13740 and JP58-109479, respectively DE 1078120 and JP58-109479, or GB 872,355, and JP04458299, which processes are herewith incorporated by reference.

Example 1

1.1 Preparation of 2-[4-(4,4,4-trifluorobutoxy)phenyl]-5,6-dihydro-4H-1,3-dithiin-1-ium trifluoromethanesulfonate 60 g (242 mmol) of 4-(4,4,4-trifluorobutoxy)benzoic acid, 31.8 ml (314 mmol) of propane-1,3-dithiol and 27.9 ml (314 mmol) of trifluoromethanesulfonic acid are refluxed in 1.6 l of a mixture 1/1 isooctane/toluene for 18 hours. The mixture is cooled down and the product is precipitated by addition of 1.5 l of TBME to yield 108 g of 2-[4-(4,4,4-trifluorobutoxy)phenyl]-5,6-dihydro-4H-1,3-dithiin-1-ium trifluoromethanesulfonate as yellow crystals.

1.2 Preparation 1-bromo-4-{difluoro[4-(4,4,4-trifluorobutoxy)phenyl]methoxy}benzene 77.0 g (164 mmol) of 2-[4-(4,4,4-trifluorobutoxy)phenyl]-5,6-dihydro-4H-1,3-dithiin-1-ium trifluoromethanesulfonate, are solubilised in 750 mL of dichloromethane. The solution is cooled down to −55° C. 42.5 g (245 mmol) of 4-bromophenol and 36.5 ml (262 mmol) of triethylamine dissolved in 300 ml of dichloromethane is added to the previous solution. The solution is cooled down to −70° C. and stirred for 45 minutes. 120 ml (736 mmol) of triethylamine trihydrofluoride are added to the mixture. A solution of 8.43 ml (164 mmol) of bromine in 60 ml of dichloromethane is added at this temperature. The reaction is stirred for one hour. The reaction is quenched by addition of NaHCO$_3$. The organic phase is washed repeatedly with water, dried over sodium sulfate, filtrated and concentrated under reduced pressure. Chromatography of the residue on 400 g silica gel using toluene: ethyl acetate 95:5 as eluent yielded 47 g of 1-bromo-4-{difluoro[4-(4,4,4-trifluorobutoxy)phenyl]methoxy}-benzene.

1.3 Preparation of methyl (2E)-3-(4-{difluoro[4-(4,4,4-trifluorobutoxy)phenyl]methoxy}phenyl)-prop-2-enoate 554 mg (2.469 mmol) of Pd(OAc)$_2$, 2.70 g (7.41 mmol) of dicyclohexyl(2'-methylbuphenyl-2-yl)phosphine, 35 g (82 mmol) of 1-bromo-4-{difluoro[4-(4,4,4-trifluorobutoxy)phenyl]methoxy}-benzene, 17.2 ml (123 mmol) of triethylamine and 14.84 ml (165 mmol) of methyl acrylate are solubilised in 500 ml of DMF and heated to 130° C. After 2 hours, the solution is diluted to room temperature and diluted with 500 ml of TBME. The solution is filtrated over a plug of Hyflo. The organic phase is washed repeatedly with water, dried over sodium sulfate, filtrated and concentrated under reduced pressure. Crystallisation from toluene/heptane mixture yields 26.7 g of methyl (2E)-3-(4-{difluoro[4-(4,4,4-trifluorobutoxy)phenyl]methoxy}phenyl)-prop-2-enoate.

1.4 Preparation of (2E)-3-(4-{difluoro[4-(4,4,4-trifluorobutoxy)phenyl]methoxy}phenyl)prop-2-enoic acid 26 g (60.4 mmol) of methyl (2E)-3-(4-{difluoro[4-(4,4,4-trifluorobutoxy)phenyl]methoxy}-phenyl)prop-2-enoate is dissolved in 400 ml of dioxane. 30 ml of NaOH (30%) diluted in 250 ml of water is added to the solution. The mixture is heated to 55° C. for 2 hours. The mixture is cooled to room temperature and is carefully acidified to pH=2 with a HCl solution (25%) and is stirred for 15 min. The product is filtrated off and dried at room temperature under vacuum for 10 h to give 20 g of (2E)-3-(4-{difluoro[4-(4,4,4-trifluorobutoxy)phenyl]methoxy}-phenyl)prop-2-enoic acid as a colourless powder.

The following acrylic acid are synthesized in an analogous manner to Example 1

(2E)-3-(4-{difluoro[4-(2,2,2-trifluoroethoxy)phenyl] methoxy}phenyl)prop-2-enoic acid ES$^-$=387 [M+H]; $^{19}$F NMR DMSO d6 300 MHz; =−62.94, −73.02

(2E)-3-(4-{difluoro[4-(3,3,3-trifluoropropoxy)phenyl] methoxy}phenyl)prop-2-enoic acid (2E)-3-(4-{difluoro[4-(4,4,4-trifluorobutoxy)phenyl] methoxy}phenyl)prop-2-enoic acid (2E)-3-[4-(difluoro{4-[(5,5,5-trifluoropentyl)oxy] phenyl}methoxy)phenyl]prop-2-enoic acid (2E)-3-[4-(difluoro{4-[(6,6,6-trifluorohexyl)oxy] phenyl}methoxy)phenyl]prop-2-enoic acid (2E)-3-(4-{difluoro[4-(4,4,4-trifluorobutyl)phenyl] methoxy}phenyl)prop-2-enoic acid (2E)-3-(4-{difluoro[4-(5,5,5-trifluoropentyl)phenyl] methoxy}phenyl)prop-2-enoic acid (2E)-3-(4-{difluoro[4-(6,6,6-trifluorohexyl)phenyl] methoxy}phenyl)prop-2-enoic acid (2E)-3-(4-{difluoro[4-(4-fluorobutyl)phenyl] methoxy}phenyl)prop-2-enoic acid (2E)-3-(4-{difluoro[4-(5-fluoropentyl)phenyl] methoxy}phenyl)prop-2-enoic acid (2E)-3-(4-{difluoro[4-(6-fluorohexyl)phenyl] methoxy}phenyl)prop-2-enoic acid (2E)-3-(4-{difluoro[4-(3-fluoropropoxy)phenyl] methoxy}phenyl)prop-2-enoic acid (2E)-3-(4-{difluoro[4-(4-fluorobutoxy)phenyl] methoxy}phenyl)prop-2-enoic acid (2E)-3-[4-(difluoro{4-[(5-fluoropentyl)oxy] phenyl}methoxy)phenyl]prop-2-enoic acid (2E)-3-[4-(difluoro{4-[(6-fluorohexyl)oxy] phenyl}methoxy)phenyl]prop-2-enoic acid (2E)-3-[4-(difluoro{4-[(4,4,5,5,5-pentafluoropentyl)oxy] phenyl}methoxy)phenyl]prop-2-enoic acid (2E)-3-{4-[[4-(allyloxy)phenyl](difluoro)methoxy] phenyl}prop-2-enoic acid (2E)-3-[4-(difluoro{4-[2-(2,2,2-trifluoroethoxy)ethoxy] phenyl}methoxy)phenyl]prop-2-enoic acid (2E)-3-{4-[[4-(3-cyanopropoxy)phenyl](difluoro)methoxy] phenyl}prop-2-enoic acid (2E)-3-{4-[[4-(4-cyanobutoxy)phenyl](difluoro)methoxy] phenyl}prop-2-enoic acid (2E)-3-{4-[[4-(5-cyanopentoxy)phenyl](difluoro)methoxy] phenyl}prop-2-enoic acid (2E)-3-{4-[difluoro(4-{[(2E)-4,4,4-trifluorobut-2-enyl] oxy}phenyl)methoxy]phenyl}prop-2-enoic acid (2E)-3-(4-{difluoro[2-fluoro-4-(4,4,4-trifluorobutoxy)phenyl]methoxy}phenyl)prop-2-enoic acid: ES$^-$ 433 [M−H]; $^{19}$F NMR DMSO d6 300 MHz: =−62.00, −65.38, −112.86;

(2E)-3-{4-[[2,3-difluoro-4-(4,4,4-trifluorobutoxy)phenyl] (difluoro)methoxy]phenyl}prop-2-enoic acid (2E)-3-(4-{difluoro[3-fluoro-4-(4,4,4-trifluorobutoxy)phenyl]methoxy}phenyl)prop-2-enoic acid (2E)-3-(4-{difluoro[3-methoxy-4-(4,4,4-trifluorobutoxy) phenyl]methoxy}phenyl)prop-2-enoic acid (2E)-3-{4-[(4-butoxy-3-methoxyphenyl)(difluoro)methoxy] phenyl}prop-2-enoic acid (2E)-3-{4-[(4-butoxy-3-fluorophenyl)(difluoro)methoxy] phenyl}prop-2-enoic acid (2E)-3-{4-[(4-butoxy-2-fluorophenyl)(difluoro)methoxy] phenyl}prop-2-enoic acid (2E)-3-{4-[[4-(3-cyanopropoxy)-2-fluorophenyl](difluoro) methoxy]phenyl}prop-2-enoic acid (2E)-3-(4-{difluoro[4-(trifluoromethyl)cyclohexyl] methoxy}phenyl)prop-2-enoic acid (2E)-3-(4-{difluoro[4-(3,3,3-trifluoropropyl)cyclohexyl] methoxy}phenyl)prop-2-enoic acid (2E)-3-(4-{difluoro[4-(4,4,4-trifluorobutyl)cyclohexyl] methoxy}phenyl)prop-2-enoic acid (2E)-3-{4-[(4-butoxyphenyl)(difluoro)methoxy] phenyl}prop-2-enoic acid (2E)-3-(4-{difluoro[4-(pentyloxy)phenyl]methoxy}phenyl) prop-2-enoic acid (2E)-3-(4-{difluoro[4-(hexyloxy)phenyl]methoxy}phenyl) prop-2-enoic acid (2E)-3-{4-[(2-ethylcyclohexyl)(difluoro)methoxy] phenyl}prop-2-enoic acid (2E)-3-{4-[(3-propylcyclohexyl)(difluoro)methoxy] phenyl}prop-2-enoic acid (2E)-3-{4-[(4-butylcyclohexyl)(difluoro)methoxy] phenyl}prop-2-enoic acid (2E)-3-{4-[(5-pentylcyclohexyl)(difluoro)methoxy] phenyl}prop-2-enoic acid (2E)-3-{4-[difluoro(4-pentylbicyclo[2.2.2]oct-1-yl)methoxy]phenyl}prop-2-enoic acid (2E)-3-[4-(difluoro{4-[3-(pentamethyldisiloxanyl)propoxy] phenyl}methoxy)phenyl]prop-2-enoic acid Example 2

2.1 Preparation of 2(2,4-dinitrophenyl)ethanol 22.6 g (100 mmol) 2,4-dinitrophenylacetic acid is dissolved in 150 ml tetrahydrofuran and added dropwise in a the course of 2 hours to 300 ml (300 mmol) of a borane-tetrahydrofuran complex 1.0 M solution in tetrahydrofuran. After 3 hours at 25° C., 200 ml water is carefully added. The reaction mixture is then partitioned between ethyl acetate and water; the organic phase is washed repeatedly with water, dried over sodium sulfate, filtered and concentrated by rotary evaporation. Chromatography of the residue on 400 g silica gel using toluene:ethyl acetate 1:1 as eluant and crystallization form ethylacetate:hexane mixture to yield 20.7 g (98%) of 2-(2,4-dinitrophenyl)ethanol as yellowish crystals.

2.2 Preparation of 2-(2,4-dinitrophenyl)ethyl (2E)-3-(4-{difluoro[4-(4,4,4-trifluorobutoxy)phenyl]-methoxy}-phenyl)prop-2-enoate 2.50 g (11.8 mmol) of 2-(2,4-dinitrophenyl)ethanol, 4.91 g (11.8 mmol) of (2E)-3-(4-{difluoro[4-(4,4,4-trifluorobutoxy)phenyl]methoxy}-phenyl)prop-2-enoic acid, 144 mg (1.2 mmol) of 4-dimethylaminopyridine are dissolved in 30 mL of dichloromethane. 2.48 g (13.0 mmol) of N-(3-dimethylaminopropyl)-N'-ethylcarbodiimide hydrochloride (EDC hydrochloride) are added at 0° C. The solution is stirred for 1 h at 0° C. and allowed to stir at room temperature overnight. After 22 hours at room temperature, the reaction mixture is partitioned between dichloromethane and water. The organic phase is washed repeatedly with water, dried over sodium sulfate, filtrated and concentrated under reduced pressure. Chromatography of the residue on 200 g silica gel using toluene: ethyl acetate 95:5 as eluent and crystallization from ethyl acetate:hexane mixture yielded 5.11 g (71%) of 2-(2,4-dinitrophenyl)ethyl (2E)-3-(4-{difluoro[4-(4,4,4-trifluorobutoxy)phenyl]methoxy}phenyl)prop-2-enoate as yellow crystals.

2.3 Preparation of 2-(2,4-diaminophenyl)ethyl (2E)-3-(4-{difluoro[4-(4,4,4-trifluorobutoxy)-phenyl]methoxy}phenyl)prop-2-enoate 5.11 g (8.38 mmol) of 2-(2,4-dinitrophenyl)ethyl (2E)-3-(4-{difluoro[4-(4,4,4-trifluorobutoxy)-phenyl]methoxy}phenyl)prop-2-enoate are dissolved in a mixture of 54 mL of N,N-dimethyl-formamide and 6 mL water. 13.9 g (51.4 mmol) ferric chloride hexahydrate is added. 5.60 g (85.7 mmol) zinc powder is added portion wise within 60 minutes. The mixture is allowed to react for 2 hours. The reaction mixture is partitioned between ethyl acetate and water and filtrated. The organic phase is washed repeatedly with water, dried over sodium sulfate, filtrated and concentrated under reduced pressure. Filtration of the residue on 200 g silica gel using toluene:ethyl acetate 1:3 as eluent and crystallization from ethyl acetate:hexane mixture yielded 3.30 g of 2-(2,4-diaminophenyl)ethyl (2E)-3-(4-{difluoro[4-(4,4,4-trifluorobutoxy)phenyl]methoxy}phenyl)prop-2-enoate as yellow crystals. ES$^+$=551 [M+H]; $^{19}$F NMR CD$_3$CN 300 MHz; δ=−64.46, −67.44

The following diamines are synthesized in an analogous manner to Example 2

2-(2,4-diaminophenyl)ethyl (2E)-3-(4-{difluoro[4-(2,2,2-trifluoroethoxy)phenyl]methoxy}-phenyl)prop-2-enoate
2-(2,4-diaminophenyl)ethyl (2E)-3-(4-{difluoro[4-(3,3,3-trifluoropropoxy)phenyl]methoxy}-phenyl)prop-2-enoate
2-(2,4-diaminophenyl)ethyl (2E)-3-(4-{difluoro[4-(4,4,4-trifluorobutoxy)phenyl]methoxy}-phenyl)prop-2-enoate
2-(2,4-diaminophenyl)ethyl (2E)-3-(4-{difluoro[2-fluoro-4-(4,4,4-trifluorobutoxy)phenyl]-methoxy}phenyl)prop-2-enoate
2-(2,4-diaminophenyl)ethyl (2E)-3-[4-(difluoro{4-[(5,5,5-trifluoropentyl)oxy]phenyl}-methoxy)phenyl]prop-2-enoate
2-(2,4-diaminophenyl)ethyl (2E)-3-[4-(difluoro{4-[(6,6,6-trifluorohexyl)oxy]phenyl}-methoxy)phenyl]prop-2-enoate
2-(2,4-diaminophenyl)ethyl (2E)-3-(4-{difluoro[4-(3,3,3-trifluoropropyl)phenyl]-methoxy}phenyl)prop-2-enoate
2-(2,4-diaminophenyl)ethyl (2E)-3-(4-{difluoro[4-(4,4,4-trifluorobutyl)phenyl]-methoxy}phenyl)prop-2-enoate
2-(2,4-diaminophenyl)ethyl (2E)-3-(4-{difluoro[4-(5,5,5-trifluoropentyl)phenyl]-methoxy}phenyl)prop-2-enoate
2-(2,4-diaminophenyl)ethyl (2E)-3-(4-{difluoro[4-(6,6,6-trifluorohexyl)phenyl]-methoxy}phenyl)prop-2-enoate
2-(2,4-diaminophenyl)ethyl (2E)-3-(4-{difluoro[2-fluoro-4-(4,4,4-trifluorobutoxy)phenyl]-methoxy}phenyl)prop-2-enoate
2-(2,4-diaminophenyl)ethyl (2E)-3-[4-(difluoro{4-[(4,4,5,5,5-pentafluoropentyl)oxy]phenyl}-methoxy)phenyl]prop-2-enoate
2-(2,4-diaminophenyl)ethyl (2E)-3-(4-{difluoro[3-fluoro-4-(4,4,4-trifluorobutoxy)phenyl]-methoxy}phenyl)prop-2-enoate
2-(2,4-diaminophenyl)ethyl (2E)-3-{4-[(4-butoxy-3-methoxyphenyl)(difluoro)-methoxy]phenyl}prop-2-enoate
2-(2,4-diaminophenyl)ethyl (2E)-3-{4-[[2,3-difluoro-4-(4,4,4-trifluorobutoxy)phenyl](difluoro)-methoxy}phenyl]prop-2-enoate
2-(2,4-diaminophenyl)ethyl (2E)-3-(4-{difluoro[3-methoxy-4-(4,4,4-trifluorobutoxy)phenyl]-methoxy}phenyl)prop-2-enoate
2-(2,4-diaminophenyl)ethyl (2E)-3-(4-{difluoro[4-(3-fluoropropoxy)phenyl]-methoxy}phenyl)prop-2-enoate
2-(2,4-diaminophenyl)ethyl (2E)-3-(4-{difluoro[4-(4-fluorobutoxy)phenyl]methoxy}phenyl)prop-2-enoate
2-(2,4-diaminophenyl)ethyl (2E)-3-{4-[[4-(2-cyanoethoxy)phenyl](difluoro)-methoxy]phenyl}prop-2-enoate
2-(2,4-diaminophenyl)ethyl (2E)-3-{4-[[4-(3-cyanopropoxy)phenyl](difluoro)-methoxy]phenyl}prop-2-enoate
2-(2,4-diaminophenyl)ethyl (2E)-3-{4-[[4-(4-cyanobutoxy)phenyl](difluoro)-methoxy]phenyl}prop-2-enoate
2-(2,4-diaminophenyl)ethyl (2E)-3-{4-[{4-[(5-cyanopentyl)oxy]phenyl}(difluoro)-methoxy]phenyl}prop-2-enoate
2-(2,4-diaminophenyl)ethyl (2E)-3-{4-[{4-[(6-cyanohexyl)oxy]phenyl}(difluoro)-methoxy]phenyl}prop-2-enoate
2-(2,4-diaminophenyl)ethyl (2E)-3-[4-(difluoro{4-[2-(2,2,2-trifluoroethoxy)ethoxy]phenyl}-methoxy)phenyl]prop-2-enoate
2-(2,4-diaminophenyl)ethyl (2E)-3-(4-{difluoro[4-(trifluoromethyl)cyclohexyl]-methoxy}phenyl)prop-2-enoate
2-(2,4-diaminophenyl)ethyl (2E)-3-(4-{difluoro[4-(2,2,2-trifluoroethyl)cyclohexyl]-methoxy}phenyl)prop-2-enoate
2-(2,4-diaminophenyl)ethyl (2E)-3-(4-{difluoro[4-(3,3,3-trifluoropropyl)cyclohexyl]-methoxy}phenyl)prop-2-enoate
2-(2,4-diaminophenyl)ethyl (2E)-3-(4-{difluoro[4-(4,4,4-trifluorobutyl)cyclohexyl]-methoxy}phenyl)prop-2-enoate
2-(2,4-diaminophenyl)ethyl (2E)-3-{4-[difluoro(4-pentylbicyclo[2.2.2]oct-1-yl)methoxy]phenyl}prop-2-enoate
2-(2,4-diaminophenyl)ethyl (2E)-3-{4-[difluoro(4-propylcyclohexyl)methoxy]phenyl}prop-2-enoate
2-(2,4-diaminophenyl)ethyl (2E)-3-{4-[(4-butylcyclohexyl)(difluoro)methoxy]phenyl}prop-2-enoate
2-(2,4-diaminophenyl)ethyl (2E)-3-{4-[difluoro(4-pentylcyclohexyl)methoxy]phenyl}prop-2-enoate
2-(2,4-diaminophenyl)ethyl (2E)-3-{4-[difluoro(4-hexylcyclohexyl)methoxy]phenyl}prop-2-enoate
2-(2,4-diaminophenyl)ethyl (2E)-3-[4-(difluoro{4-[3-(pentamethyldisiloxanyl)propoxy]phenyl}-methoxy)phenyl]prop-2-enoate
2-(3,5-diaminophenyl)ethyl (2E)-3-(4-{difluoro[4-(3,3,3-trifluoropropoxy)phenyl]-methoxy}phenyl)prop-2-enoate
2-(3,5-diaminophenyl)ethyl (2E)-3-(4-{difluoro[4-(4,4,4-trifluorobutoxy)phenyl]-methoxy}phenyl)prop-2-enoate
2-(3,5-diaminophenyl)ethyl (2E)-3-[4-(difluoro{4-[(5,5,5-trifluoropentyl)oxy]phenyl}-methoxy)phenyl]prop-2-enoate 2-(3,5-diaminophenyl)ethyl (2E)-3-[4-(difluoro{4-[(6,6,6-trifluorohexyl)oxy]phenyl}-methoxy)phenyl]prop-2-enoate
2-(3,5-diaminophenyl)ethyl (2E)-3-(4-{difluoro[4-(3,3,3-trifluoropropyl)phenyl]-methoxy}phenyl)prop-2-enoate
2-(3,5-diaminophenyl)ethyl (2E)-3-(4-{difluoro[4-(4,4,4-trifluorobutyl)phenyl]-methoxy}phenyl)prop-2-enoate
2-(3,5-diaminophenyl)ethyl (2E)-3-(4-{difluoro[4-(5,5,5-trifluoropentyl)phenyl]-methoxy}phenyl)prop-2-enoate
2-(2,4-diaminophenyl)ethyl (2E)-3-(4-{difluoro[4-(6,6,6-trifluorohexyl)phenyl]-methoxy}phenyl)prop-2-enoate
2-(3,5-diaminophenyl)ethyl (2E)-3-(4-{difluoro[2-fluoro-4-(4,4,4-trifluorobutoxy)phenyl]-methoxy}phenyl)prop-2-enoate
2-(3,5-diaminophenyl)ethyl (2E)-3-[4-(difluoro{4-[(4,4,5,5,5-pentafluoropentyl)oxy]phenyl}-methoxy)phenyl]prop-2-enoate
2-(3,5-diaminophenyl)ethyl (2E)-3-(4-{difluoro[3-fluoro-4-(4,4,4-trifluorobutoxy)phenyl]-methoxy}phenyl)prop-2-enoate
2-(3,5-diaminophenyl)ethyl (2E)-3-{4-[(4-butoxy-3-methoxyphenyl)(difluoro)-methoxy]phenyl}prop-2-enoate
2-(3,5-diaminophenyl)ethyl (2E)-3-{4-[[2,3-difluoro-4-(4,4,4-trifluorobutoxy)phenyl](difluoro)-methoxy]phenyl}prop-2-enoate
2-(3,5-diaminophenyl)ethyl (2E)-3-(4-{difluoro[3-methoxy-4-(4,4,4-trifluorobutoxy)phenyl]-methoxy}phenyl)prop-2-enoate
2-(3,5-diaminophenyl)ethyl (2E)-3-(4-{difluoro[4-(3-fluoropropoxy)phenyl]-methoxy}phenyl)prop-2-enoate
2-(3,5-diaminophenyl)ethyl (2E)-3-(4-{difluoro[4-(4-fluorobutoxy)phenyl]methoxy}phenyl)prop-2-enoate
2-(3,5-diaminophenyl)ethyl (2E)-3-{4-[[4-(2-cyanoethoxy)phenyl](difluoro)-methoxy]phenyl}prop-2-enoate
2-(3,5-diaminophenyl)ethyl (2E)-3-{4-[[4-(3-cyanopropoxy)phenyl](difluoro)-methoxy]phenyl}prop-2-enoate
2-(3,5-diaminophenyl)ethyl (2E)-3-{4-[[4-(4-cyanobutoxy)phenyl](difluoro)-methoxy]phenyl}prop-2-enoate
2-(3,5-diaminophenyl)ethyl (2E)-3-{4-[{4-[(5-cyanopentyl)oxy]phenyl}(difluoro)-methoxy]phenyl}prop-2-enoate
2-(3,5-diaminophenyl)ethyl (2E)-3-{4-[{4-[(6-cyanohexyl)oxy]phenyl}(difluoro)-methoxy]phenyl}prop-2-enoate
2-(3,5-diaminophenyl)ethyl (2E)-3-[4-(difluoro{4-[2-(2,2,2-trifluoroethoxy)ethoxy]phenyl}-methoxy)phenyl]prop-2-enoate
2-(3,5-diaminophenyl)ethyl (2E)-3-[4-(difluoro{4-[2-(2,2,2-trifluoroethoxy)ethoxy]phenyl}-methoxy)phenyl]prop-2-enoate
2-(3,5-diaminophenyl)ethyl (2E)-3-(4-{difluoro[4-(trifluoromethyl)cyclohexyl]-methoxy}phenyl)prop-2-enoate
2-(3,5-diaminophenyl)ethyl (2E)-3-(4-{difluoro[4-(2,2,2-trifluoroethyl)cyclohexyl]-methoxy}phenyl)prop-2-enoate
2-(3,5-diaminophenyl)ethyl (2E)-3-(4-{difluoro[4-(3,3,3-trifluoropropyl)cyclohexyl]-methoxy}phenyl)prop-2-enoate
2-(3,5-diaminophenyl)ethyl (2E)-3-(4-{difluoro[4-(4,4,4-trifluorobutyl)cyclohexyl]-methoxy}phenyl)prop-2-enoate
2-(3,5-diaminophenyl)ethyl (2E)-3-{4-[difluoro(4-pentylbicyclo[2.2.2]oct-1-yl)methoxy]phenyl}prop-2-enoate
2-(3,5-diaminophenyl)ethyl (2E)-3-{4-[difluoro(4-propylcyclohexyl)methoxy]phenyl}prop-2-enoate
2-(3,5-diaminophenyl)ethyl (2E)-3-{4-[(4-butylcyclohexyl)(difluoro)methoxy]phenyl}prop-2-enoate
2-(3,5-diaminophenyl)ethyl (2E)-3-{4-[difluoro(4-pentylcyclohexyl)methoxy]phenyl}prop-2-enoate
3-(2,4-diaminophenyl)propyl (2E)-3-(4-{difluoro[4-(4,4,4-trifluorobutoxy)phenyl]-methoxy}phenyl)prop-2-enoate
3-(2,4-diaminophenyl)propyl (2E)-3-(4-{difluoro[4-(3,3,3-trifluoropropoxy)phenyl]-methoxy}phenyl)prop-2-enoate
3-(2,4-diaminophenyl)propyl (2E)-3-(4-{difluoro[4-(4,4,4-trifluorobutoxy)phenyl]-methoxy}phenyl)prop-2-enoate
3-(2,4-diaminophenyl)propyl (2E)-3-[4-(difluoro{4-[(5,5,5-trifluoropentyl)oxy]phenyl}-methoxy)phenyl]prop-2-enoate
3-(2,4-diaminophenyl)propyl (2E)-3-[4-(difluoro{4-[(6,6,6-trifluorohexyl)oxy]phenyl}-methoxy)phenyl]prop-2-enoate
3-(2,4-diaminophenyl)propyl (2E)-3-(4-{difluoro[4-(3,3,3-trifluoropropyl)phenyl]-methoxy}phenyl)prop-2-enoate
3-(2,4-diaminophenyl)propyl (2E)-3-(4-{difluoro[4-(4,4,4-trifluorobutyl)phenyl]-methoxy}phenyl)prop-2-enoate
3-(2,4-diaminophenyl)propyl (2E)-3-(4-{difluoro[4-(5,5,5-trifluoropentyl)phenyl]-methoxy}phenyl)prop-2-enoate
3-(2,4-diaminophenyl)propyl (2E)-3-(4-{difluoro[4-(6,6,6-trifluorohexyl)phenyl]-methoxy}phenyl)prop-2-enoate
3-(2,4-diaminophenyl)propyl (2E)-3-(4-{difluoro[2-fluoro-4-(4,4,4-trifluorobutoxy)phenyl]-methoxy}phenyl)prop-2-enoate
3-(2,4-diaminophenyl)propyl (2E)-3-[4-(difluoro{4-[(4,4,5,5,5-pentafluoropentyl)oxy]phenyl}-methoxy)phenyl]prop-2-enoate
3-(2,4-diaminophenyl)propyl (2E)-3-(4-{difluoro[3-fluoro-4-(4,4,4-trifluorobutoxy)phenyl]-methoxy}phenyl)prop-2-enoate
3-(2,4-diaminophenyl)propyl (2E)-3-{4-[(4-butoxy-3-methoxyphenyl)(difluoro)-methoxy]phenyl}prop-2-enoate
3-(2,4-diaminophenyl)propyl (2E)-3-{4-[[2,3-difluoro-4-(4,4,4-trifluorobutoxy)phenyl](difluoro)-methoxy]phenyl}prop-2-enoate
3-(2,4-diaminophenyl)propyl (2E)-3-(4-{difluoro[3-methoxy-4-(4,4,4-trifluorobutoxy)phenyl]-methoxy}phenyl)prop-2-enoate
3-(2,4-diaminophenyl)propyl (2E)-3-(4-{difluoro[4-(3-fluoropropoxy)phenyl]-methoxy}phenyl)prop-2-enoate
3-(2,4-diaminophenyl)propyl (2E)-3-(4-{difluoro[4-(4-fluorobutoxy)phenyl]-methoxy}phenyl)prop-2-enoate
3-(2,4-diaminophenyl)propyl (2E)-3-{4-[[4-(2-cyanoethoxy)phenyl](difluoro)-methoxy]phenyl}prop-2-enoate
3-(2,4-diaminophenyl)propyl (2E)-3-{4-[[4-(3-cyanopropoxy)phenyl](difluoro)-methoxy]phenyl}prop-2-enoate
3-(2,4-diaminophenyl)propyl (2E)-3-{4-[[4-(4-cyanobutoxy)phenyl](difluoro)-methoxy]phenyl}prop-2-enoate
3-(2,4-diaminophenyl)propyl (2E)-3-{4-[{4-[(5-cyanopentyl)oxy]phenyl}(difluoro)-methoxy]phenyl}prop-2-enoate
3-(2,4-diaminophenyl)propyl (2E)-3-{4-[{4-[(6-cyanohexyl)oxy]phenyl}(difluoro)-methoxy]phenyl}prop-2-enoate
3-(2,4-diaminophenyl)propyl (2E)-3-[4-(difluoro{4-[2-(2,2,2-trifluoroethoxy)ethoxy]phenyl}-methoxy)phenyl]prop-2-enoate
3-(2,4-diaminophenyl)propyl (2E)-3-[4-(difluoro{4-[2-(2,2,2-trifluoroethoxy)ethoxy]phenyl}-methoxy)phenyl]prop-2-enoate
3-(2,4-diaminophenyl)propyl (2E)-3-(4-{difluoro[4-(trifluoromethyl)cyclohexyl]-methoxy}phenyl)prop-2-enoate
3-(2,4-diaminophenyl)propyl (2E)-3-(4-{difluoro[4-(2,2,2-trifluoroethyl)cyclohexyl]-methoxy}phenyl)prop-2-enoate
3-(2,4-diaminophenyl)propyl (2E)-3-(4-{difluoro[4-(3,3,3-trifluoropropyl)cyclohexyl]-methoxy}phenyl)prop-2-enoate 3-(2,4-diaminophenyl)propyl (2E)-3-(4-{difluoro[4-(4,4,4-trifluorobutyl)cyclohexyl]-methoxy}phenyl)prop-2-enoate 3-(2,4-diaminophenyl)propyl (2E)-3-{4-[difluoro(4-pentylbicyclo[2.2.2]oct-1-yl)methoxy]phenyl}prop-2-enoate 3-(2,4-diaminophenyl)propyl (2E)-3-{4-[difluoro(4-propylcyclohexyl)methoxy]phenyl}prop-2-enoate 3-(2,4-diaminophenyl)propyl (2E)-3-{4-[(4-butylcyclohexyl)(difluoro)methoxy]phenyl}prop-2-enoate 3-(2,4-diaminophenyl)propyl (2E)-3-{4-[difluoro(4-pentylcyclohexyl)methoxy]phenyl}prop-2-enoate 3-(2,4-diaminophenyl)propyl (2E)-3-{4-[difluoro(4-hexylcyclohexyl)methoxy]phenyl}prop-2-enoate 3-(2,4-diaminophenyl)propyl (2E)-3-[4-(difluoro{4-[3-(pentamethyldisiloxanyl)propoxy]phenyl}-methoxy)phenyl]prop-2-enoate 4-(2,4-diaminophenyl)-butyl (2E)-3-(4-{difluoro[4-(4,4,4-trifluorobutoxy)phenyl]-methoxy}phenyl)prop-2-enoate 4-(2,4-diaminophenyl)butyl (2E)-3-(4-{difluoro[4-(4,4,4-trifluorobutoxy)phenyl]-methoxy}phenyl)prop-2-enoate 4-(2,4-diaminophenyl)butyl (2E)-3-(4-{difluoro[4-(3,3,3-trifluoropropoxy)phenyl]-methoxy}phenyl)prop-2-enoate 4-(2,4-diaminophenyl)butyl (2E)-3-(4-{difluoro[4-(4,4,4-trifluorobutoxy)phenyl]-methoxy}phenyl)prop-2-enoate 4-(2,4-diaminophenyl)butyl (2E)-3-[4-(difluoro{4-[(5,5,5-trifluoropentyl)oxy]phenyl}-methoxy)phenyl]prop-2-enoate 4-(2,4-diaminophenyl)butyl (2E)-3-[4-(difluoro{4-[(6,6,6-trifluorohexyl)oxy]phenyl}-methoxy)phenyl]prop-2-enoate 4-(2,4-diaminophenyl)butyl (2E)-3-(4-{difluoro[4-(3,3,3-trifluoropropyl)phenyl]-methoxy}phenyl)prop-2-enoate 4-(2,4-diaminophenyl)butyl (2E)-3-(4-{difluoro[4-(4,4,4-trifluorobutyl)phenyl]-methoxy}phenyl)prop-2-enoate 4-(2,4-diaminophenyl)butyl (2E)-3-(4-{difluoro[4-(5,5,5-trifluoropentyl)phenyl]-methoxy}phenyl)prop-2-enoate 4-(2,4-diaminophenyl)butyl (2E)-3-(4-{difluoro[4-(6,6,6-trifluorohexyl)phenyl]-methoxy}phenyl)prop-2-enoate 4-(2,4-diaminophenyl)butyl (2E)-3-(4-{difluoro[2-fluoro-4-(4,4,4-trifluorobutoxy)phenyl]-methoxy}phenyl)prop-2-enoate 4-(2,4-diaminophenyl)butyl (2E)-3-[4-(difluoro{4-[(4,4,5,5,5-pentafluoropentyl)oxy]phenyl}-methoxy)phenyl]prop-2-enoate 4-(2,4-diaminophenyl)butyl (2E)-3-(4-{difluoro[3-fluoro-4-(4,4,4-trifluorobutoxy)phenyl]-methoxy}phenyl)prop-2-enoate 4-(2,4-diaminophenyl)butyl (2E)-3-{4-[(4-butoxy-3-methoxyphenyl)(difluoro)-methoxy]phenyl}prop-2-enoate 4-(2,4-diaminophenyl)butyl (2E)-3-{4-[[2,3-difluoro-4-(4,4,4-trifluorobutoxy)phenyl](difluoro)-methoxy]phenyl}prop-2-enoate 4-(2,4-diaminophenyl)butyl (2E)-3-(4-{difluoro[3-methoxy-4-(4,4,4-trifluorobutoxy)phenyl]-methoxy}phenyl)prop-2-enoate 4-(2,4-diaminophenyl)butyl (2E)-3-(4-{difluoro[4-(3-fluoropropoxy)phenyl]-methoxy}phenyl)prop-2-enoate 4-(2,4-diaminophenyl)butyl (2E)-3-(4-{difluoro[4-(4-fluorobutoxy)phenyl]methoxy}phenyl)prop-2-enoate 4-(2,4-diaminophenyl)butyl (2E)-3-{4-[[4-(2-cyanoethoxy)phenyl](difluoro)-methoxy]phenyl}prop-2-enoate 4-(2,4-diaminophenyl)butyl (2E)-3-{4-[[4-(3-cyanopropoxy)phenyl](difluoro)-methoxy]phenyl}prop-2-enoate 4-(2,4-diaminophenyl)butyl (2E)-3-{4-[[4-(4-cyanobutoxy)phenyl](difluoro)-methoxy]phenyl}prop-2-enoate 4-(2,4-diaminophenyl)butyl (2E)-3-{4-[{4-[(5-cyanopentyl)oxy]phenyl}(difluoro)-methoxy]phenyl}prop-2-enoate 4-(2,4-diaminophenyl)butyl (2E)-3-{4-[{4-[(6-cyanohexyl)oxy]phenyl}(difluoro)-methoxy]phenyl}prop-2-enoate 4-(2,4-diaminophenyl)butyl (2E)-3-[4-(difluoro{4-[2-(2,2,2-trifluoroethoxy)ethoxy]phenyl}-methoxy)phenyl]prop-2-enoate 4-(2,4-diaminophenyl)butyl (2E)-3-[4-(difluoro{4-[2-(2,2,2-trifluoroethoxy)ethoxy]phenyl}-methoxy)phenyl]prop-2-enoate 4-(2,4-diaminophenyl)butyl (2E)-3-(4-{difluoro[4-(trifluoromethyl)cyclohexyl]-methoxy}phenyl)prop-2-enoate 4-(2,4-diaminophenyl)butyl (2E)-3-(4-{difluoro[4-(2,2,2-trifluoroethyl)cyclohexyl]-methoxy}phenyl)prop-2-enoate 4-(2,4-diaminophenyl)butyl (2E)-3-(4-{difluoro[4-(3,3,3-trifluoropropyl)cyclohexyl]-methoxy}phenyl)prop-2-enoate 4-(2,4-diaminophenyl)butyl (2E)-3-(4-{difluoro[4-(4,4,4-trifluorobutyl)cyclohexyl]-methoxy}phenyl)prop-2-enoate 4-(2,4-diaminophenyl)butyl (2E)-3-{4-[difluoro(4-pentylbicyclo[2.2.2]oct-1-yl)-methoxy-phenyl}prop-2-enoate 4-(2,4-diaminophenyl)butyl (2E)-3-{4-[difluoro(4-propylcyclohexyl)methoxy]phenyl}prop-2-enoate 4-(2,4-diaminophenyl)butyl (2E)-3-{4-[(4-butylcyclohexyl)(difluoro)methoxy]phenyl}prop-2-enoate 4-(2,4-diaminophenyl)butyl (2E)-3-{4-[difluoro(4-pentylcyclohexyl)methoxy]phenyl}prop-2-enoate 4-(2,4-diaminophenyl)butyl (2E)-3-{4-[difluoro(4-hexylcyclohexyl)methoxy]phenyl}prop-2-enoate 4-(2,4-diaminophenyl)butyl (2E)-3-[4-(difluoro{4-[3-(pentamethyldisiloxanyl)propoxy]phenyl}-methoxy)phenyl]prop-2-enoate 5-(2,4-diaminophenyl)pentyl (2E)-3-(4-{difluoro[4-(4,4,4-trifluorobutoxy)phenyl]-methoxy}phenyl)prop-2-enoate 5-(2,4-diaminophenyl)pentyl (2E)-3-(4-{difluoro[4-(4,4,4-trifluorobutoxy)phenyl]-methoxy}phenyl)prop-2-enoate 5-(2,4-diaminophenyl)pentyl (2E)-3-(4-{difluoro[4-(4,4,4-trifluorobutoxy)phenyl]-methoxy}phenyl)prop-2-enoate 5-(2,4-diaminophenyl)pentyl (2E)-3-(4-{difluoro[4-(3,3,3-trifluoropropoxy)phenyl]-methoxy}phenyl)prop-2-enoate 5-(2,4-diaminophenyl)pentyl (2E)-3-(4-{difluoro[4-(4,4,4-trifluorobutoxy)phenyl]-methoxy}phenyl)prop-2-enoate 5-(2,4-diaminophenyl)pentyl (2E)-3-[4-(difluoro{4-[(5,5,5-trifluoropentyl)oxy]phenyl}-methoxy)phenyl]prop-2-enoate 5-(2,4-diaminophenyl)pentyl (2E)-3-[4-(difluoro{4-[(6,6,6-trifluorohexyl)oxy]phenyl}-methoxy)phenyl]prop-2-enoate 5-(2,4-diaminophenyl)pentyl (2E)-3-(4-{difluoro[4-(3,3,3-trifluoropropyl)phenyl]-methoxy}phenyl)prop-2-enoate 5-(2,4-diaminophenyl)pentyl (2E)-3-(4-{difluoro[4-(4,4,4-trifluorobutyl)phenyl]-methoxy}phenyl)prop-2-enoate 5-(2,4-diaminophenyl)pentyl (2E)-3-(4-{difluoro[4-(5,5,5-trifluoropentyl)phenyl]-methoxy}phenyl)prop-2-enoate 5-(2,4-diaminophenyl)pentyl (2E)-3-(4-{difluoro[4-(6,6,6-trifluorohexyl)phenyl]-methoxy}phenyl)prop-2-enoate 5-(2,4-diaminophenyl)pentyl (2E)-3-(4-{difluoro[2-fluoro-4-(4,4,4-trifluorobutoxy)phenyl]-methoxy}phenyl)prop-2-enoate 5-(2,4-diaminophenyl)pentyl (2E)-3-[4-(difluoro{4-[(4,4,5,5,5-pentafluoropentyl)oxy]phenyl}-methoxy)phenyl]prop-2-enoate 5-(2,4-diaminophenyl)pentyl (2E)-3-(4-{difluoro[3-fluoro-4-(4,4,4-trifluorobutoxy)phenyl]-methoxy}phenyl)prop-2-enoate 5-(2,4-diaminophenyl)pentyl (2E)-3-{4-[(4-butoxy-3-methoxyphenyl)(difluoro)-methoxy]phenyl}prop-2-enoate 5-(2,4-diaminophenyl)pentyl (2E)-3-{4-[[2,3-difluoro-4-(4,4,4-trifluorobutoxy)phenyl](difluoro)methoxy]phenyl}prop-2-enoate 5-(2,4-diaminophenyl)pentyl (2E)-3-(4-{difluoro[3-methoxy-4-(4,4,4-trifluorobutoxy)phenyl]-methoxy}phenyl)prop-2-enoate 5-(2,4-diaminophenyl)pentyl (2E)-3-(4-{difluoro[4-(3-fluoropropoxy)phenyl]-methoxy}phenyl)prop-2-enoate 5-(2,4-diaminophenyl)pentyl (2E)-3-(4-{difluoro[4-(4-fluorobutoxy)phenyl]-methoxy}phenyl)prop-2-enoate 5-(2,4-diaminophenyl)pentyl (2E)-3-{4-[[4-(2-cyanoethoxy)phenyl](difluoro)methoxy]-phenyl}prop-2-enoate 5-(2,4-diaminophenyl)pentyl (2E)-3-{4-[[4-(3-cyanopropoxy)phenyl](difluoro)-methoxy]phenyl}prop-2-enoate 5-(2,4-diaminophenyl)pentyl (2E)-3-{4-[[4-(4-cyanobutoxy)phenyl](difluoro)methoxy]-phenyl}prop-2-enoate 5-(2,4-diaminophenyl)pentyl (2E)-3-{4-[{4-[(5-cyanopentyl)oxy]phenyl}(difluoro)methoxy]-phenyl}prop-2-enoate 5-(2,4-diaminophenyl)pentyl (2E)-3-{4-[{4-[(6-cyanohexyl)oxy]phenyl}(difluoro)methoxy]-phenyl}prop-2-enoate 5-(2,4-diaminophenyl)pentyl (2E)-3-[4-(difluoro{4-[2-(2,2,2-trifluoroethoxy)ethoxy]phenyl}-methoxy)phenyl]prop-2-enoate 5-(2,4-diaminophenyl)pentyl (2E)-3-[4-(difluoro{4-[2-(2,2,2-trifluoroethoxy)ethoxy]phenyl}-methoxy)phenyl]prop-2-enoate 5-(2,4-diaminophenyl)pentyl (2E)-3-(4-{difluoro[4-(trifluoromethyl)cyclohexyl]-methoxy}phenyl)prop-2-enoate 5-(2,4-diaminophenyl)pentyl (2E)-3-(4-{difluoro[4-(2,2,2-trifluoroethyl)cyclohexyl]methoxy}-phenyl)prop-2-enoate 5-(2,4-diaminophenyl)pentyl (2E)-3-(4-{difluoro[4-(3,3,3-trifluoropropyl)cyclohexyl]methoxy}-phenyl)prop-2-enoate 5-(2,4-diaminophenyl)pentyl (2E)-3-(4-{difluoro[4-(4,4,4-trifluorobutyl)cyclohexyl]methoxy}-phenyl)prop-2-enoate 5-(2,4-diaminophenyl)pentyl (2E)-3-{4-[difluoro(4-pentylbicyclo[2.2.2]oct-1-yl)methoxy]phenyl}prop-2-enoate 5-(2,4-diaminophenyl)pentyl (2E)-3-{4-[difluoro(4-propylcyclohexyl)methoxy]phenyl}prop-2-enoate 5-(2,4-diaminophenyl)pentyl (2E)-3-{4-[(4-butylcyclohexyl)(difluoro)methoxy]phenyl}prop-2-enoate 5-(2,4-diaminophenyl)pentyl (2E)-3-{4-[difluoro(4-pentylcyclohexyl)methoxy]phenyl}prop-2-enoate 5-(2,4-diaminophenyl)pentyl (2E)-3-{4-[difluoro(4-hexylcyclohexyl)methoxy]phenyl}prop-2-enoate 5-(2,4-diaminophenyl)pentyl (2E)-3-[4-(difluoro{4-[3-(pentamethyldisiloxanyl)propoxy]phenyl}-methoxy)phenyl]prop-2-enoate 10-(2,4-diaminophenyl)decyl (2E)-3-(4-{difluoro[4-(4,4,4-trifluorobutoxy)phenyl]methoxy}-phenyl)prop-2-enoate 10-(2,4-diaminophenyl)decyl (2E)-3-(4-{difluoro[4-(4,4,4-trifluorobutoxy)phenyl]methoxy}-phenyl)prop-2-enoate 10-(2,4-diaminophenyl)decyl (2E)-3-(4-{difluoro[4-(4,4,4-trifluorobutoxy)phenyl]methoxy}-phenyl)prop-2-enoate 10-(2,4-diaminophenyl)decyl (2E)-3-(4-{difluoro[4-(4,4,4-trifluorobutoxy)phenyl]methoxy}-phenyl)prop-2-enoate 10-(2,4-diaminophenyl)decyl (2E)-3-(4-{difluoro[4-(3,3,3-trifluoropropoxy)phenyl]-methoxy}phenyl)prop-2-enoate 10-(2,4-diaminophenyl)decyl (2E)-3-(4-{difluoro[4-(4,4,4-trifluorobutoxy)phenyl]methoxy}-phenyl)prop-2-enoate 10-(2,4-diaminophenyl)decyl (2E)-3-[4-(difluoro{4-[(5,5,5-trifluoropentyl)oxy]phenyl}-methoxy)phenyl]prop-2-enoate 10-(2,4-diaminophenyl)decyl (2E)-3-[4-(difluoro{4-[(6,6,6-trifluorohexyl)oxy]phenyl}-methoxy)phenyl]prop-2-enoate 10-(2,4-diaminophenyl)decyl (2E)-3-(4-{difluoro[4-(3,3,3-trifluoropropyl)phenyl]-methoxy}phenyl)prop-2-enoate 10-(2,4-diaminophenyl)decyl (2E)-3-(4-{difluoro[4-(4,4,4-trifluorobutyl)phenyl]methoxy-}phenyl)prop-2-enoate 10-(2,4-diaminophenyl)decyl (2E)-3-(4-{difluoro[4-(5,5,5-trifluoropentyl)phenyl]methoxy}-phenyl)prop-2-enoate 10-(2,4-diaminophenyl)decyl (2E)-3-(4-{difluoro[4-(6,6,6-trifluorohexyl)phenyl]methoxy}-phenyl)prop-2-enoate 10-(2,4-diaminophenyl)decyl (2E)-3-(4-{difluoro[2-fluoro-4-(4,4,4-trifluorobutoxy)phenyl]-methoxy}phenyl)prop-2-enoate 10-(2,4-diaminophenyl)decyl (2E)-3-[4-(difluoro{4-[(4,4,5,5,5-pentafluoropentyl)oxy]phenyl}-methoxy)phenyl]prop-2-enoate 10-(2,4-diaminophenyl)decyl (2E)-3-(4-{difluoro[3-fluoro-4-(4,4,4-trifluorobutoxy)phenyl]-methoxy}phenyl)prop-2-enoate 10-(2,4-diaminophenyl)decyl (2E)-3-{4-[(4-butoxy-3-methoxyphenyl)(difluoro)-methoxy]phenyl}prop-2-enoate 10-(2,4-diaminophenyl)decyl (2E)-3-{4-[[2,3-difluoro-4-(4,4,4-trifluorobutoxy)phenyl](difluoro)-methoxy]phenyl}prop-2-enoate 10-(2,4-diaminophenyl)decyl (2E)-3-(4-{difluoro[3-methoxy-4-(4,4,4-trifluorobutoxy)phenyl]-methoxy}phenyl)prop-2-enoate 10-(2,4-diaminophenyl)decyl (2E)-3-(4-{difluoro[4-(3-fluoropropoxy)phenyl]-methoxy}phenyl)prop-2-enoate 10-(2,4-diaminophenyl)decyl (2E)-3-(4-{difluoro[4-(4-fluorobutoxy)phenyl]-methoxy}phenyl)prop-2-enoate 10-(2,4-diaminophenyl)decyl (2E)-3-{4-[[4-(2-cyanoethoxy)phenyl](difluoro)-methoxy]phenyl}prop-2-enoate 10-(2,4-diaminophenyl)decyl (2E)-3-{4-[[4-(3-cyanopropoxy)phenyl](difluoro)-methoxy]phenyl}prop-2-enoate 10-(2,4-diaminophenyl)decyl (2E)-3-{4-[[4-(4-cyanobutoxy)phenyl](difluoro)-methoxy]phenyl}prop-2-enoate 10-(2,4-diaminophenyl)decyl (2E)-3-{4-[{4-[(5-cyanopentyl)oxy]phenyl}(difluoro)-methoxy]phenyl}prop-2-enoate 10-(2,4-diaminophenyl)decyl (2E)-3-{4-[{4-[(6-cyanohexyl)oxy]phenyl}(difluoro)-methoxy]phenyl}prop-2-enoate 10-(2,4-diaminophenyl)decyl (2E)-3-[4-(difluoro{4-[2-(2,2,2-trifluoroethoxy)ethoxy]phenyl}-methoxy)phenyl]prop-2-enoate 10-(2,4-diaminophenyl)decyl (2E)-3-[4-(difluoro{4-[2-(2,2,2-trifluoroethoxy)ethoxy]phenyl}-methoxy)phenyl]prop-2-enoate 10-(2,4-diaminophenyl)decyl (2E)-3-(4-{difluoro[4-(trifluoromethyl)cyclohexyl]-methoxy}phenyl)prop-2-enoate 10-(2,4-diaminophenyl)decyl (2E)-3-(4-{difluoro[4-(2,2,2-trifluoroethyl)cyclohexyl]-methoxy}phenyl)prop-2-enoate 10-(2,4-diaminophenyl)decyl (2E)-3-(4-{difluoro[4-(3,3,3-trifluoropropyl)cyclohexyl]-methoxy}phenyl)prop-2-enoate 10-(2,4-diaminophenyl)decyl (2E)-3-(4-{difluoro[4-(4,4,4-trifluorobutyl)cyclohexyl]-methoxy}phenyl)prop-2-enoate 10-(2,4-diaminophenyl)decyl (2E)-3-{4-[difluoro(4-pentylbicyclo[2.2.2]oct-1-yl)methoxy]phenyl}prop-2-enoate 10-(2,4-diaminophenyl)decyl (2E)-3-{4-[difluoro(4-propylcyclohexyl)methoxy]phenyl}prop-2-enoate 10-(2,4-diaminophenyl)decyl (2E)-3-{4-[(4-butylcyclohexyl)(difluoro)methoxy]phenyl}prop-2-enoate 10-(2,4-diaminophenyl)decyl (2E)-3-{4-[difluoro(4-pentyl-cyclohexyl)methoxy]phenyl}prop-2-enoate 10-(2,4-diaminophenyl)decyl (2E)-3-{4-[difluoro(4-hexyl-cyclohexyl)methoxy]phenyl}prop-2-enoate 10-(2,4-diaminophenyl)decyl (2E)-3-[4-(difluoro{4-[3-(pentamethyldisiloxanyl)propoxy]-phenyl}-methoxy)phenyl]prop-2-enoate 2-(2,4-diaminophenoxy)ethyl (2E)-3-(4-{difluoro[4-(4,4,4-trifluorobutoxy)phenyl]methoxy}-phenyl)prop-2-enoate 2-(2,4-diaminophenoxy)ethyl (2E)-3-(4-{difluoro[4-(4,4,4-trifluorobutoxy)phenyl]methoxy}-phenyl)prop-2-enoate 2-(2,4-diaminophenoxy)ethyl (2E)-3-(4-{difluoro[4-(4,4,4-trifluorobutoxy)phenyl]methoxy}-phenyl)prop-2-enoate 2-(2,4-diaminophenoxy)ethyl (2E)-3-(4-{difluoro[4-(3,3,3-trifluoropropoxy)phenyl]methoxy}-phenyl)prop-2-enoate 2-(2,4-diaminophenoxy)ethyl (2E)-3-(4-{difluoro[4-(4,4,4-trifluorobutoxy)phenyl]methoxy}-phenyl)prop-2-enoate 2-(2,4-diaminophenoxy)ethyl (2E)-3-[4-(difluoro{4-[(5,5,5-trifluoropentyl)oxy]phenyl}methoxy)-phenyl]prop-2-enoate 2-(2,4-diaminophenoxy)ethyl (2E)-3-[4-(difluoro{4-[(6,6,6-trifluorohexyl)oxy]phenyl}-methoxy)phenyl]prop-2-enoate 2-(2,4-diaminophenoxy)ethyl (2E)-3-(4-{difluoro[4-(3,3,3-trifluoropropyl)phenyl]-methoxy}phenyl)prop-2-enoate 2-(2,4-diaminophenoxy)ethyl (2E)-3-(4-{difluoro[4-(4,4,4-trifluorobutyl)phenyl]-methoxy}phenyl)prop-2-enoate 2-(2,4-diaminophenoxy)ethyl (2E)-3-(4-{difluoro[4-(5,5,5-trifluoropentyl)-phenyl]methoxy}-phenyl)prop-2-enoate 2-(2,4-diaminophenoxy)ethyl (2E)-3-(4-{difluoro[4-(6,6,6-trifluorohexyl)phenyl]-methoxy}phenyl)prop-2-enoate 2-(2,4-diaminophenoxy)ethyl (2E)-3-(4-{difluoro[2-fluoro-4-(4,4,4-trifluorobutoxy)phenyl]-methoxy}phenyl)prop-2-enoate 2-(2,4-diaminophenoxy)ethyl (2E)-3-[4-(difluoro{4-[(4,4,5,5,5-pentafluoropentyl)oxy]phenyl}-methoxy)phenyl]prop-2-enoate 2-(2,4-diaminophenoxy)ethyl (2E)-3-(4-{difluoro[3-fluoro-4-(4,4,4-trifluorobutoxy)phenyl]-methoxy}phenyl)prop-2-enoate 2-(2,4-diaminophenoxy)ethyl (2E)-3-{4-[(4-butoxy-3-methoxyphenyl)(difluoro)-methoxy]phenyl}prop-2-enoate 2-(2,4-diaminophenoxy)ethyl (2E)-3-{4-[[2,3-difluoro-4-(4,4,4-trifluorobutoxy)phenyl](difluoro)-methoxy]phenyl}prop-2-enoate 2-(2,4-diaminophenoxy)ethyl (2E)-3-(4-{difluoro[3-methoxy-4-(4,4,4-trifluorobutoxy)phenyl]-methoxy}phenyl)prop-2-enoate 2-(2,4-diaminophenoxy)ethyl (2E)-3-(4-{difluoro[4-(3-fluoropropoxy)phenyl]-methoxy}phenyl)prop-2-enoate 2-(2,4-diaminophenoxy)ethyl (2E)-3-(4-{difluoro[4-(4-fluorobutoxy)phenyl]-methoxy}phenyl)prop-2-enoate 2-(2,4-diaminophenoxy)ethyl (2E)-3-{4-[[4-(2-cyanoethoxy)phenyl](difluoro)methoxy]-phenyl}prop-2-enoate 2-(2,4-diaminophenoxy)ethyl (2E)-3-{4-[[4-(3-cyanopropoxy)phenyl](difluoro)methoxy]-phenyl}prop-2-enoate 2-(2,4-diaminophenoxy)ethyl (2E)-3-{4-[[4-(4-cyanobutoxy)phenyl](difluoro)methoxy]-phenyl}prop-2-enoate 2-(2,4-diaminophenoxy)ethyl (2E)-3-{4-[{4-[(5-cyanopentyl)oxy]phenyl}(difluoro)methoxy]-phenyl}prop-2-enoate 2-(2,4-diaminophenoxy)ethyl (2E)-3-{4-[{4-[(6-cyanohexyl)oxy]phenyl}(difluoro)methoxy]-phenyl}prop-2-enoate 2-(2,4-diaminophenoxy)ethyl (2E)-3-[4-(difluoro{4-[2-(2,2,2-trifluoroethoxy)ethoxy]phenyl}-methoxy)phenyl]prop-2-enoate 2-(2,4-diaminophenoxy)ethyl (2E)-3-[4-(difluoro{4-[2-(2,2,2-trifluoroethoxy)ethoxy]phenyl}-methoxy)phenyl]prop-2-enoate 2-(2,4-diaminophenoxy)ethyl (2E)-3-(4-{difluoro[4-(trifluoromethyl)cyclohexyl]methoxy}-phenyl)prop-2-enoate 2-(2,4-diaminophenoxy)ethyl (2E)-3-(4-{difluoro[4-(2,2,2-trifluoroethyl)cyclohexyl]methoxy}-phenyl)prop-2-enoate 2-(2,4-diaminophenoxy)ethyl (2E)-3-(4-{difluoro[4-(3,3,3-trifluoropropyl)cyclohexyl]methoxy}-phenyl)prop-2-enoate 2-(2,4-diaminophenoxy)ethyl (2E)-3-(4-{difluoro[4-(4,4,4-trifluorobutyl)cyclohexyl]methoxy}-phenyl)prop-2-enoate 2-(2,4-diaminophenoxy)ethyl (2E)-3-{4-[difluoro(4-pentyl-bicyclo[2.2.2]oct-1-yl)methoxy]phenyl}prop-2-enoate 2-(2,4-diaminophenoxy)ethyl (2E)-3-{4-[difluoro(4-propyl-cyclohexyl)methoxy]phenyl}prop-2-enoate 2-(2,4-diaminophenoxy)ethyl (2E)-3-{4-[(4-butylcyclohexyl)(difluoro)methoxy]phenyl}prop-2-enoate 2-(2,4-diaminophenoxy)ethyl (2E)-3-{4-[difluoro(4-pentyl-cyclohexyl)methoxy]phenyl}prop-2-enoate 2-(2,4-diaminophenoxy)ethyl (2E)-3-{4-[difluoro(4-hexyl-cyclohexyl)methoxy]phenyl}prop-2-enoate 2-(2,4-diaminophenoxy)ethyl (2E)-3-[4-(difluoro{-[3-(pentamethyldisiloxanyl)propoxy]phenyl}methoxy)phenyl]prop-2-enoate

Example 3

3.1 Preparation of 3,5-dinitrobenzyl (2E)-3-(4-{difluoro[4-(4,4,4-trifluorobutoxy)phenyl]-methoxy}phenyl)prop-2-enoate 2.33 g (11.8 mmol) of 3,5-dinitrobenzylalcohol, 4.91 g (11.8 mmol) of (2E)-3-(4-{difluoro[4-(4,4,4-trifluorobutoxy)phenyl]methoxy}phenyl)prop-2-enoic acid, 144 mg (1.2 mmol) of 4-dimethylaminopyridine are dissolved in 30 mL of dichloromethane. 2.48 g (13.0 mmol) of N-(3-dimethylaminopropyl)-N'-ethylcarbodiimide hydrochloride (EDC hydrochloride) are added at 0° C. The solution is stirred for 1 h at 0° C. and allowed to stir at room temperature overnight. After 22 hours at room temperature, the reaction mixture is partitioned between dichloromethane and water. The organic phase is washed repeatedly with water, dried over sodium sulfate, filtrated and concentrated under reduced pressure. Chromatography of the residue on 200 g silica gel using toluene: ethyl acetate 95:5 as eluent and crystallization from ethyl acetate:hexane mixture yields 6.9 g of 3,5-dinitrobenzyl (2E)-3-(4-{difluoro[4-(4,4,4-trifluorobutoxy)phenyl]methoxy}phenyl)prop-2-enoate as yellow crystals.

3.2 Preparation of 3,5-diaminobenzyl (2E)-3-(4-{difluoro[4-(4,4,4-trifluorobutoxy)phenyl]-methoxy}phenyl)prop-2-enoate 4.99 g (8.38 mmol) of 3,5-dinitrobenzyl (2E)-3-(4-{difluoro[4-(4,4,4-trifluorobutoxy)phenyl]-methoxy}phenyl)prop-2-enoate are dissolved in a mixture of 54 mL of N,N-dimethylformamide and 6 mL water. 13.9 g (51.4 mmol) ferric chloride hexahydrate are added. 5.60 g (85.7 mmol) zinc powder is added portion wise within 60 minutes. The mixture is allowed to react for 2 hours. The reaction mixture is partitioned between ethyl acetate and water and filtrated. The organic phase is washed repeatedly with water, dried over sodium sulfate, filtrated and concentrated under reduced pressure. Filtration of the residue on 200 g silica gel using toluene:

ethyl acetate 1:3 as eluent and crystallization from ethyl acetate:hexane mixture yields 3.15 g of 3,5-diaminobenzyl (2E)-3-(4-{difluoro[4-(4,4,4-trifluorobutoxy)phenyl]-methoxy}phenyl)prop-2-enoate as yellow crystals.

¹H NMR DMSO d₆ 300 MHz:
7.81 (d, 2H), 7.69 (d, 1H), 7.66 (d, 2H), 7.33 (d, 2H), 7.10 (d, 2H), 6.68 (d, 1H), 5.81 (d, 2H), 5.77 (t, 1H), 4.92 (s, 2H), 4.77 (s, 4H), 4.10 (t, 2H), 2.45 (m, 2H), 1.95 (m, 2H)

The following diamines are synthesized in an analogous manner to Example 3

3,5-diaminobenzyl (2E)-3-(4-{difluoro[4-(2,2,2-trifluoroethoxy)phenyl]methoxy}phenyl)prop-2-enoate
3,5-diaminobenzyl (2E)-3-(4-{difluoro[4-(3,3,3-trifluoropropoxy)phenyl]methoxy}phenyl)prop-2-enoate
3,5-diaminobenzyl (2E)-3-(4-{difluoro[4-(4,4,4-trifluorobutoxy)phenyl]methoxy}phenyl)prop-2-enoate
3,5-diaminobenzyl (2E)-3-[4-(difluoro{4-[(5,5,5-trifluoropentyl)oxy]phenyl}methoxy)phenyl]prop-2-enoate
3,5-diaminobenzyl (2E)-3-[4-(difluoro{4-[(6,6,6-trifluorohexyl)oxy]phenyl}methoxy)phenyl]prop-2-enoate
3,5-diaminobenzyl (2E)-3-(4-{difluoro[4-(3,3,3-trifluoropropyl)phenyl]methoxy}phenyl)prop-2-enoate
3,5-diaminobenzyl (2E)-3-(4-{difluoro[4-(4,4,4-trifluorobutyl)phenyl]methoxy}phenyl)prop-2-enoate
3,5-diaminobenzyl (2E)-3-(4-{difluoro[4-(5,5,5-trifluoropentyl)phenyl]methoxy}phenyl)prop-2-enoate
3,5-diaminobenzyl (2E)-3-(4-{difluoro[4-(6,6,6-trifluorohexyl)phenyl]methoxy}phenyl)prop-2-enoate
3,5-diaminobenzyl (2E)-3-(4-{difluoro[2-fluoro-4-(4,4,4-trifluorobutoxy)phenyl]methoxy}-phenyl)-prop-2-enoate
3,5-diaminobenzyl (2E)-3-[4-(difluoro{4-[(4,4,5,5,5-pentafluoropentyl)oxy]phenyl}methoxy)-phenyl]prop-2-enoate
3,5-diaminobenzyl (2E)-3-(4-{difluoro[3-fluoro-4-(4,4,4-trifluorobutoxy)phenyl]methoxy}-phenyl)-prop-2-enoate
3,5-diaminobenzyl (2E)-3-{4-[(4-butoxy-3-methoxyphenyl)(difluoro)methoxy]phenyl}prop-2-enoate
3,5-diaminobenzyl (2E)-3-{4-[[2,3-difluoro-4-(4,4,4-trifluorobutoxy)phenyl]difluoro)methoxy]-phenyl}prop-2-enoate
3,5-diaminobenzyl (2E)-3-(4-{difluoro[3-methoxy-4-(4,4,4-trifluorobutoxy)phenyl]methoxy}-phenyl)-prop-2-enoate
3,5-diaminobenzyl (2E)-3-(4-{difluoro[4-(3-fluoropropoxy)phenyl]methoxy}phenyl)prop-2-enoate
3,5-diaminobenzyl (2E)-3-(4-{difluoro[4-(4-fluorobutoxy)phenyl]methoxy}phenyl)prop-2-enoate
3,5-diaminobenzyl (2E)-3-{4-[[4-(2-cyanoethoxy)phenyl](difluoro)methoxy]phenyl}prop-2-enoate
3,5-diaminobenzyl (2E)-3-{4-[[4-(3-cyanopropoxy)phenyl](difluoro)methoxy]phenyl}prop-2-enoate
3,5-diaminobenzyl (2E)-3-{4-[[4-(4-cyanobutoxy)phenyl](difluoro)methoxy]phenyl}prop-2-enoate
3,5-diaminobenzyl (2E)-3-{4-[{4-[(5-cyanopentyl)oxy]phenyl}(difluoro)methoxy]phenyl}prop-2-enoate
3,5-diaminobenzyl (2E)-3-{4-[{4-[(6-cyanohexyl)oxy]phenyl}(difluoro)methoxy]phenyl}prop-2-enoate
3,5-diaminobenzyl (2E)-3-[4-(difluoro{4-[2-(2,2,2-trifluoroethoxy)ethoxy]phenyl}methoxy)-phenyl]prop-2-enoate
3,5-diaminobenzyl (2E)-3-[4-(difluoro{4-[2-(2,2,2-trifluoroethoxy)ethoxy]phenyl}methoxy)-phenyl]prop-2-enoate
3,5-diaminobenzyl (2E)-3-(4-{difluoro[4-(trifluoromethyl)cyclohexyl]methoxy}phenyl)prop-2-enoate
3,5-diaminobenzyl (2E)-3-(4-{difluoro[4-(2,2,2-trifluoroethyl)cyclohexyl]methoxy}phenyl)prop-2-enoate
3,5-diaminobenzyl (2E)-3-(4-{difluoro[4-(3,3,3-trifluoropropyl)cyclohexyl]methoxy}phenyl)-prop-2-enoate
3,5-diaminobenzyl (2E)-3-(4-{difluoro[4-(4,4,4-trifluorobutyl)cyclohexyl]methoxy}phenyl)prop-2-enoate
3,5-diaminobenzyl (2E)-3-{4-[difluoro(4-pentylbicyclo[2.2.2]oct-1-yl)methoxy]phenyl}prop-2-enoate
3,5-diaminobenzyl (2E)-3-{4-[difluoro(4-propylcyclohexyl)methoxy]phenyl}prop-2-enoate
3,5-diaminobenzyl (2E)-3-{4-[(4-butylcyclohexyl)(difluoro)methoxy]phenyl}prop-2-enoate
3,5-diaminobenzyl (2E)-3-{4-[difluoro(4-pentylcyclohexyl)methoxy]phenyl}prop-2-enoate
3,5-diaminobenzyl (2E)-3-{4-[difluoro(4-hexylcyclohexyl)methoxy]phenyl}prop-2-enoate
3,5-diaminobenzyl (2E)-3-[4-(difluoro{4-[3-(pentamethyldisiloxanyl)propoxy]phenyl}methoxy)-phenyl]prop-2-enoate
2,4-diaminobenzyl (2E)-3-(4-{difluoro[4-(4,4,4-trifluorobutoxy)phenyl]methoxy}phenyl)prop-2-enoate
2,4-diaminobenzyl (2E)-3-(4-{difluoro[4-(4,4,4-trifluorobutoxy)phenyl]methoxy}phenyl)prop-2-enoate
2,4-diaminobenzyl (2E)-3-(4-{difluoro[4-(4,4,4-trifluorobutoxy)phenyl]methoxy}phenyl)prop-2-enoate
2,4-diaminobenzyl (2E)-3-(4-{difluoro[4-(4,4,4-trifluorobutoxy)phenyl]methoxy}phenyl)prop-2-enoate
2,4-diaminobenzyl (2E)-3-(4-{difluoro[4-(3,3,3-trifluoropropoxy)phenyl]methoxy}phenyl)prop-2-enoate
2,4-diaminobenzyl (2E)-3-(4-{difluoro[4-(4,4,4-trifluorobutoxy)phenyl]methoxy}phenyl)prop-2-enoate
2,4-diaminobenzyl (2E)-3-[4-(difluoro{4-[(5,5,5-trifluoropentyl)oxy]phenyl}methoxy)phenyl]-prop-2-enoate
2,4-diaminobenzyl (2E)-3-[4-(difluoro{4-[(6,6,6-trifluorohexyl)oxy]phenyl}methoxy)phenyl]-prop-2-enoate
2,4-diaminobenzyl (2E)-3-(4-{difluoro[4-(3,3,3-trifluoropropyl)phenyl]methoxy}phenyl)prop-2-enoate
2,4-diaminobenzyl (2E)-3-(4-{difluoro[4-(4,4,4-trifluorobutyl)phenyl]methoxy}phenyl)prop-2-enoate
2,4-diaminobenzyl (2E)-3-(4-{difluoro[4-(5,5,5-trifluoropentyl)phenyl]methoxy}phenyl)prop-2-enoate
2,4-diaminobenzyl (2E)-3-(4-{difluoro[4-(6,6,6-trifluorohexyl)phenyl]methoxy}phenyl)prop-2-enoate
2,4-diaminobenzyl (2E)-3-(4-{difluoro[2-fluoro-4-(4,4,4-trifluorobutoxy)phenyl]methoxy}-phenyl)-prop-2-enoate
2,4-diaminobenzyl (2E)-3-[4-(difluoro{4-[(4,4,5,5,5-pentafluoropentyl)oxy]phenyl}methoxy)-phenyl]prop-2-enoate
2,4-diaminobenzyl (2E)-3-(4-{difluoro[3-fluoro-4-(4,4,4-trifluorobutoxy)phenyl]methoxy}-phenyl)prop-2-enoate
2,4-diaminobenzyl (2E)-3-{4-[(4-butoxy-3-methoxyphenyl)(difluoro)methoxy]phenyl}prop-2-enoate
2,4-diaminobenzyl (2E)-3-{4-[[2,3-difluoro-4-(4,4,4-trifluorobutoxy)phenyl](difluoro)methoxy]-phenyl}prop-2-enoate
2,4-diaminobenzyl (2E)-3-(4-{difluoro[3-methoxy-4-(4,4,4-trifluorobutoxy)phenyl]methoxy}-phenyl)-prop-2-enoate
2,4-diaminobenzyl (2E)-3-(4-{difluoro[4-(3-fluoropropoxy)phenyl]methoxy}phenyl)prop-2-enoate
2,4-diaminobenzyl (2E)-3-(4-{difluoro[4-(4-fluorobutoxy)phenyl]methoxy}phenyl)prop-2-enoate
2,4-diaminobenzyl (2E)-3-{4-[[4-(2-cyanoethoxy)phenyl](difluoro)methoxy]phenyl}prop-2-enoate
2,4-diaminobenzyl (2E)-3-{4-[[4-(3-cyanopropoxy)phenyl](difluoro)methoxy]phenyl}prop-2-enoate
2,4-diaminobenzyl (2E)-3-{4-[[4-(4-cyanobutoxy)phenyl](difluoro)methoxy]phenyl}prop-2-enoate
2,4-diaminobenzyl (2E)-3-{4-[{4-[(5-cyanopentyl)oxy]phenyl}(difluoro)methoxy]phenyl}prop-2-enoate 2,4-diaminobenzyl (2E)-3-{4-[{4-[(6-cyanohexyl)oxy]phenyl}(difluoro)methoxy]phenyl}prop-2-enoate 2,4-diaminobenzyl (2E)-3-[4-(difluoro{4-[2-(2,2,2-trifluoroethoxy)ethoxy]phenyl}methoxy)-phenyl]prop-2-enoate 2,4-diaminobenzyl (2E)-3-[4-(difluoro{4-[2-(2,2,2-trifluoroethoxy)ethoxy]phenyl}methoxy)-phenyl]prop-2-enoate 2,4-diaminobenzyl (2E)-3-(4-{difluoro[4-(trifluoromethyl)cyclohexyl]methoxy}phenyl)prop-2-enoate 2,4-diaminobenzyl (2E)-3-(4-{difluoro[4-(2,2,2-trifluoroethyl)cyclohexyl]methoxy}phenyl)prop-2-enoate 2,4-diaminobenzyl (2E)-3-(4-{difluoro[4-(3,3,3-trifluoropropyl)cyclohexyl]methoxy}phenyl)-prop-2-enoate 2,4-diaminobenzyl (2E)-3-(4-{difluoro[4-(4,4,4-trifluorobutyl)cyclohexyl]methoxy}phenyl)prop-2-enoate 2,4-diaminobenzyl (2E)-3-{4-[difluoro(4-pentylbicyclo[2.2.2]oct-1-yl)methoxy]phenyl}prop-2-enoate 2,4-diaminobenzyl (2E)-3-{4-[difluoro(4-propylcyclohexyl)methoxy]phenyl}prop-2-enoate 2,4-diaminobenzyl (2E)-3-{4-[(4-butylcyclohexyl)(difluoro)methoxy]phenyl}prop-2-enoate 2,4-diaminobenzyl (2E)-3-{4-[difluoro(4-pentylcyclohexyl)methoxy]phenyl}prop-2-enoate 2,4-diaminobenzyl (2E)-3-{4-[difluoro(4-hexylcyclohexyl)methoxy]phenyl}prop-2-enoate 2,4-diaminobenzyl (2E)-3-[4-(difluoro{4-[3-(pentamethyldisiloxanyl)propoxy]phenyl}methoxy)-phenyl]prop-2-enoate Example 4

4.1 Preparation of 6-hydroxyhexyl 3,5-dinitrobenzoate 357.70 g (1.686 Mol) of 3,5-dinitrobenzoic acid is suspended in 750 ml of 1-methyl-2-pyrrolidone. The suspension is stirred up to 50° C. 386.36 g (4.599 Mol) of sodium hydrogen carbonate are added and the mixture is heated up to 90° C. 22.50 g (0.150 Mol) of sodium iodide and 204.0 ml (1.533 Mol) of 6-chlorohexanol are added to the reaction mixture which is heated to 100° C. for 1 h. After 1 h of reaction, the reaction is complete and the orange suspension is thrown on 2 l of ice and 1 l of water. The product is filtrated, washed water and dried at 50° C. under vacuum for 24 h to give 425.0 g (91%) of 6-hydroxyhexyl 3,5-dinitrobenzoate as a rose powder.

4.2 Preparation of 6-[((2E)-3-(4-{difluoro[4-(4,4,4-trifluorobutoxy)phenyl]methoxy}phenyl)-prop-2-enoyl)oxy]hexyl 3,5-dinitrobenzoate 3.68 g (11.8 mmol) of 6-hydroxyhexyl 3,5-dinitrobenzoate, 4.91 g (11.8 mmol) of (2E)-3-(4-{difluoro[4-(4,4,4-trifluorobutoxy)phenyl]methoxy}phenyl)prop-2-enoic acid, 144 mg (1.2 mmol) of 4-dimethylaminopyridine are dissolved in 30 mL of dichloromethane. 2.48 g (13.0 mmol) of N-(3-dimethylaminopropyl)-N'-ethylcarbodiimide hydrochloride (EDC hydrochloride) is added at 0° C. The solution is stirred for 1 h at 0° C. and allowed to stir at room temperature overnight. After 22 hours at room temperature, the reaction mixture is partitioned between dichloromethane and water. The organic phase is washed repeatedly with water, dried over sodium sulfate, filtrated and concentrated under reduced pressure. Chromatography of the residue on 200 g silica gel using toluene: ethyl acetate 95:5 as eluent and crystallization from ethyl acetate:hexane mixture yielded 6.85 g of 6-[((2E)-3-(4-{difluoro[4-(4,4,4-trifluorobutoxy)phenyl]methoxy}phenyl)prop-2-enoyl)oxy]hexyl 3,5-dinitrobenzoate as yellow crystals.

4.3 Preparation of 6-[((2E)-3-(4-{difluoro[4-(4,4,4-trifluorobutoxy)phenyl]methoxy}phenyl)-prop-2-enoyl)-oxy]hexyl 3,5-diaminobenzoate 5.95 g (8.38 mmol) of 6-[((2E)-3-(4-{difluoro[4-(4,4,4-trifluorobutoxy)phenyl]methoxy}phenyl)-prop-2-enoyl) oxy]-hexyl 3,5-dinitrobenzoate are dissolved in a mixture of 54 mL of N,N-di-methylformamide and 6 mL water. 13.9 g (51.4 mmol) ferric chloride hexahydrate is added. 5.60 g (85.7 mmol) zinc powder is added portion wise within 60 minutes. The mixture is allowed to react for 2 hours. The reaction mixture is partitioned between ethyl acetate and water and filtrated. The organic phase is washed repeatedly with water, dried over sodium sulfate, filtrated and concentrated under reduced pressure. Filtration of the residue on 200 g silica gel using toluene:ethyl acetate 1:3 as eluent and crystallization from ethyl acetate:hexane mixture yields 4.53 g of 6-[((2E)-3-(4-{difluoro[4-(4,4,4-trifluorobutoxy)-phenyl]-methoxy}-phenyl)-prop-2-enoyl)oxy]hexyl 3,5-diaminobenzoate as yellow crystals.

The following diamines are synthesized in an analogous manner to Example 4

6-[((2E)-3-(4-{difluoro[4-(2,2,2-trifluoroethoxy)phenyl]methoxy}phenyl)prop-2-enoyl)oxy]hexyl 3,5-diaminobenzoate 6-[((2E)-3-(4-{difluoro[4-(3,3,3-trifluoropropoxy)phenyl]methoxy}phenyl)prop-2-enoyl)-oxy]hexyl 3,5-diaminobenzoate 6-[((2E)-3-(4-{difluoro[4-(4,4,4-trifluorobutoxy)phenyl]methoxy}phenyl)prop-2-enoyl)oxy]hexyl 3,5-diaminobenzoate 6-[((2E)-3-[4-(difluoro{4-[(5,5,5-trifluoropentyl)oxy]phenyl}methoxy)phenyl]prop-2-enoyl)-oxy]hexyl 3,5-diaminobenzoate 6-[((2E)-3-[4-(difluoro{4-[(6,6,6-trifluorohexyl)oxy]phenyl}methoxy)phenyl]prop-2-enoyl)-oxy]hexyl 3,5-diaminobenzoate 6-[((2E)-3-(4-{difluoro[4-(3,3,3-trifluoropropyl)phenyl]methoxy}phenyl)prop-2-enoyl)oxy]hexyl 3,5-diaminobenzoate 6-[((2E)-3-(4-{difluoro[4-(4,4,4-trifluorobutyl)phenyl]methoxy}phenyl)prop-2-enoyl)oxy]hexyl 3,5-diaminobenzoate 6-[((2E)-3-(4-{difluoro[4-(5,5,5-trifluoropentyl)phenyl]methoxy}phenyl)prop-2-enoyl)oxy]hexyl 3,5-diaminobenzoate 6-[((2E)-3-(4-{difluoro[4-(6,6,6-trifluorohexyl)phenyl]methoxy}phenyl)prop-2-enoyl)oxy]hexyl 3,5-diaminobenzoate 6-[((2E)-3-(4-{difluoro[2-fluoro-4-(4,4,4-trifluorobutoxy)phenyl]methoxy}phenyl)prop-2-enoyl)-oxy]hexyl 3,5-diaminobenzoate 6-[((2E)-3-[4-(difluoro{4-[(4,4,5,5,5-pentafluoropentyl)oxy]phenyl}methoxy)phenyl]prop-2-enoyl)oxy]hexyl 3,5-diaminobenzoate 6-[((2E)-3-(4-{difluoro[3-fluoro-4-(4,4,4-trifluorobutoxy)phenyl]methoxy}phenyl)prop-2-enoyl)oxy]hexyl 3,5-diaminobenzoate 6-[((2E)-3-{4-[(4-butoxy-3-methoxyphenyl)(difluoro)methoxy]phenyl}prop-2-enoyl)oxy]hexyl 3,5-diaminobenzoate 6-[((2E)-3-{4-[[2,3-difluoro-4-(4,4,4-trifluorobutoxy)phenyl](difluoro)methoxy]phenyl}prop-2-enoyl)oxy]hexyl 3,5-diaminobenzoate 6-[((2E)-3-(4-{difluoro[3-methoxy-4-(4,4,4-trifluorobutoxy)phenyl]methoxy}phenyl)prop-2-enoyl)oxy]hexyl 3,5-diaminobenzoate 6-[((2E)-3-(4-{difluoro[4-(3-fluoropropoxy)phenyl]methoxy}phenyl)prop-2-enoyl)oxy]hexyl 3,5-diaminobenzoate 6-[((2E)-3-(4-{difluoro[4-(4-fluorobutoxy)phenyl]methoxy}phenyl)prop-2-enoyl)oxy]hexyl 3,5-diaminobenzoate 6-[((2E)-3-{4-[[4-(2-cyanoethoxy)phenyl](difluoro)methoxy]phenyl}prop-2-enoyl)oxy]hexyl 3,5-diaminobenzoate 6-[((2E)-3-{4-[[4-(3-cyanopropoxy)phenyl](difluoro)methoxy]phenyl}prop-2-enoyl)oxy]hexyl 3,5-diaminobenzoate 6-[((2E)-3-{4-[[4-(4-cyanobutoxy)phenyl](difluoro)methoxy]phenyl}prop-2-enoyl)oxy]hexyl 3,5-diaminobenzoate 6-[((2E)-3-{4-[{4-[(5-cyanopentyl)oxy]phenyl}(difluoro)methoxy]phenyl}prop-2-enoyl)oxy]hexyl 3,5-diaminobenzoate 6-[((2E)-3-{4-[{4-[(6-cyanohexyl)oxy]phenyl}(difluoro)methoxy]phenyl}prop-2-enoyl)oxy]hexyl 3,5-diaminobenzoate 6-[((2E)-3-[4-(difluoro{4-[2-(2,2,2-trifluoroethoxy)ethoxy]phenyl}methoxy)phenyl]prop-2-enoyl)oxy]hexyl 3,5-diaminobenzoate 6-[((2E)-3-[4-(difluoro{4-[2-(2,2,2-trifluoroethoxy)ethoxy]phenyl}methoxy)phenyl]prop-2-enoyl)oxy]hexyl 3,5-diaminobenzoate 6-[((2E)-3-(4-{difluoro[4-(trifluoromethyl)cyclohexyl]methoxy}phenyl)prop-2-enoyl)oxy]hexyl 3,5-diaminobenzoate 6-[((2E)-3-(4-{difluoro[4-(2,2,2-trifluoroethyl)cyclohexyl]methoxy}phenyl)prop-2-enoyl)oxy]hexyl 3,5-diaminobenzoate 6-[((2E)-3-(4-{difluoro[4-(3,3,3-trifluoropropyl)cyclohexyl]methoxy}phenyl)prop-2-enoyl)oxy]hexyl 3,5-diaminobenzoate 6-[((2E)-3-(4-{difluoro[4-(4,4,4-trifluorobutyl)cyclohexyl]methoxy}phenyl)prop-2-enoyl)oxy]hexyl 3,5-diaminobenzoate 6-[((2E)-3-{4-[difluoro(4-pentylbicyclo[2.2.2]oct-1-yl)methoxy]phenyl}prop-2-enoyl)oxy]hexyl 3,5-diaminobenzoate 6-[((2E)-3-{4-[difluoro(4-propylcyclohexyl)methoxy]phenyl}prop-2-enoyl)oxy]hexyl 3,5-diaminobenzoate 6-[((2E)-3-{4-[(4-butylcyclohexyl)(difluoro)methoxy]phenyl}prop-2-enoyl)oxy]hexyl 3,5-diaminobenzoate 6-[((2E)-3-{4-[difluoro(4-pentylcyclohexyl)methoxy]phenyl}prop-2-enoyl)oxy]hexyl 3,5-diaminobenzoate 6-[((2E)-3-{4-[difluoro(4-hexylcyclohexyl)methoxy]phenyl}prop-2-enoyl)oxy]hexyl 3,5-diaminobenzoate 6-[((2E)-3-[4-(difluoro{4-[3-(pentamethyldisiloxanyl)propoxy]phenyl}methoxy)phenyl]prop-2-enoyl)oxy]hexyl 3,5-diaminobenzoate 3-[((2E)-3-(4-{difluoro[4-(4,4,4-trifluorobutoxy)phenyl]methoxy}phenyl)prop-2-enoyl)oxy]propyl 3,5-diaminobenzoate 3-[((2E)-3-(4-{difluoro[4-(4,4,4-trifluorobutoxy)phenyl]methoxy}phenyl)prop-2-enoyl)oxy]propyl 3,5-diaminobenzoate 3-[((2E)-3-(4-{difluoro[4-(4,4,4-trifluorobutoxy)phenyl]methoxy}phenyl)prop-2-enoyl)oxy]propyl 3,5-diaminobenzoate 3-[((2E)-3-(4-{difluoro[4-(4,4,4-trifluorobutoxy)phenyl]methoxy}phenyl)prop-2-enoyl)oxy]propyl 3,5-diaminobenzoate 3-[((2E)-3-(4-{difluoro[4-(4,4,4-trifluorobutoxy)phenyl]methoxy}phenyl)prop-2-enoyl)oxy]propyl 3,5-diaminobenzoate 3-[((2E)-3-(4-{difluoro[4-(3,3,3-trifluoropropoxy)phenyl]methoxy}phenyl)prop-2-enoyl)oxy]propyl 3,5-diaminobenzoate 3-[((2E)-3-(4-{difluoro[4-(4,4,4-trifluorobutoxy)phenyl]methoxy}phenyl)prop-2-enoyl)oxy]propyl 3,5-diaminobenzoate 3-[((2E)-3-[4-(difluoro{4-[(5,5,5-trifluoropentyl)oxy]phenyl}methoxy)phenyl]prop-2-enoyl)oxy]propyl 3,5-diaminobenzoate 3-[((2E)-3-[4-(difluoro{4-[(6,6,6-trifluorohexyl)oxy]phenyl}methoxy)phenyl]prop-2-enoyl)oxy]propyl 3,5-diaminobenzoate 3-[((2E)-3-(4-{difluoro[4-(3,3,3-trifluoropropyl)phenyl]methoxy}phenyl)prop-2-enoyl)oxy]propyl 3,5-diaminobenzoate 3-[((2E)-3-(4-{difluoro[4-(4,4,4-trifluorobutyl)phenyl]methoxy}phenyl)prop-2-enoyl)oxy]propyl 3,5-diaminobenzoate 3-[((2E)-3-(4-{difluoro[4-(5,5,5-trifluoropentyl)phenyl]methoxy}phenyl)prop-2-enoyl)oxy]propyl 3,5-diaminobenzoate 3-[((2E)-3-(4-{difluoro[4-(6,6,6-trifluorohexyl)phenyl]methoxy}phenyl)prop-2-enoyl)oxy]propyl 3,5-diaminobenzoate 3-[((2E)-3-(4-{difluoro[2-fluoro-4-(4,4,4-trifluorobutoxy)phenyl]methoxy}phenyl)prop-2-enoyl)-oxy]propyl 3,5-diaminobenzoate 3-[((2E)-3-[4-(difluoro{4-[(4,4,5,5,5-pentafluoropentyl)oxy]phenyl}methoxy)phenyl]prop-2-enoyl)-oxy]propyl 3,5-diaminobenzoate 3-[((2E)-3-(4-{difluoro[3-fluoro-4-(4,4,4-trifluorobutoxy)phenyl]methoxy}phenyl)prop-2-enoyl)-oxy]propyl 3,5-diaminobenzoate 3-[((2E)-3-{4-[(4-butoxy-3-methoxyphenyl)(difluoro)methoxy]phenyl}prop-2-enoyl)oxy]propyl 3,5-diaminobenzoate 3-[((2E)-3-{4-[[2,3-difluoro-4-(4,4,4-trifluorobutoxy)phenyl](difluoro)methoxy]phenyl}prop-2-enoyl)oxy]propyl 3,5-diaminobenzoate 3-[((2E)-3-(4-{difluoro[3-methoxy-4-(4,4,4-trifluorobutoxy)phenyl]methoxy}phenyl)prop-2-enoyl)oxy]propyl 3,5-diaminobenzoate 3-[((2E)-3-(4-{difluoro[4-(3-fluoropropoxy)phenyl]methoxy}phenyl)prop-2-enoyl)oxy]propyl 3,5-diaminobenzoate 3-[((2E)-3-(4-{difluoro[4-(4-fluorobutoxy)phenyl]methoxy}phenyl)prop-2-enoyl)oxy]propyl 3,5-diaminobenzoate 3-[((2E)-3-{4-[[4-(2-cyanoethoxy)phenyl](difluoro)methoxy]phenyl}prop-2-enoyl)oxy]propyl 3,5-diaminobenzoate 3-[((2E)-3-{4-[[4-(3-cyanopropoxy)phenyl](difluoro)methoxy]phenyl}prop-2-enoyl)oxy]propyl 3,5-diaminobenzoate 3-[((2E)-3-{4-[[4-(4-cyanobutoxy)phenyl](difluoro)methoxy]phenyl}prop-2-enoyl)oxy]propyl 3,5-diaminobenzoate 3-[((2E)-3-{4-[{4-[(5-cyanopentyl)oxy]phenyl}(difluoro)methoxy]phenyl}prop-2-enoyl)oxy]propyl 3,5-diaminobenzoate 3-[((2E)-3-{4-[{4-[(6-cyanohexyl)oxy]phenyl}(difluoro)methoxy]phenyl}prop-2-enoyl)oxy]propyl 3,5-diaminobenzoate 3-[((2E)-3-[4-(difluoro{4-[2-(2,2,2-trifluoroethoxy)ethoxy]phenyl}methoxy)phenyl]prop-2-enoyl)oxy]propyl 3,5-diaminobenzoate 3-[((2E)-3-[4-(difluoro{4-[2-(2,2,2-trifluoroethoxy)ethoxy]phenyl}methoxy)phenyl]prop-2-enoyl)oxy]propyl 3,5-diaminobenzoate 3-[((2E)-3-(4-{difluoro[4-(trifluoromethyl)cyclohexyl]methoxy}phenyl)prop-2-enoyl)oxy]propyl 3,5-diaminobenzoate 3-[((2E)-3-(4-{difluoro[4-(2,2,2-trifluoroethyl)cyclohexyl]methoxy}phenyl)prop-2-enoyl)oxy]propyl 3,5-diaminobenzoate 3-[((2E)-3-(4-{difluoro[4-(3,3,3-trifluoropropyl)cyclohexyl]methoxy}phenyl)prop-2-enoyl)oxy]propyl 3,5-diaminobenzoate 3-[((2E)-3-(4-{difluoro[4-(4,4,4-trifluorobutyl)cyclohexyl]methoxy}phenyl)prop-2-enoyl)oxy]propyl 3,5-diaminobenzoate 3-[((2E)-3-{4-[difluoro(4-pentylbicyclo[2.2.2]oct-1-yl)methoxy]phenyl}prop-2-enoyl)oxy]propyl 3,5-diaminobenzoate 3-[((2E)-3-{4-[difluoro(4-propylcyclohexyl)methoxy]phenyl}prop-2-enoyl)oxy]propyl 3,5-diaminobenzoate 3-[((2E)-3-{4-[(4-butylcyclohexyl)(difluoro)methoxy]phenyl}prop-2-enoyl)oxy]propyl 3,5-diaminobenzoate 3-[((2E)-3-{4-[difluoro(4-pentylcyclohexyl)methoxy]phenyl}prop-2-enoyl)oxy]propyl 3,5-diaminobenzoate 3-[((2E)-3-{4-[difluoro(4-hexylcyclohexyl)methoxy]phenyl}prop-2-enoyl)oxy]propyl 3,5-diaminobenzoate 3-[((2E)-3-[4-(difluoro{4-[3-(pentamethyldisiloxanyl)propoxy]phenyl}methoxy)phenyl]prop-2-enoyl)oxy]propyl 3,5-diaminobenzoate 4-[((2E)-3-(4-{difluoro[4-(4,4,4-trifluorobutoxy)phenyl]methoxy}phenyl)prop-2-enoyl)oxy]butyl 3,5-diaminobenzoate 4-[((2E)-3-(4-{difluoro[4-(4,4,4-trifluorobutoxy)phenyl]methoxy}phenyl)prop-2-enoyl)oxy]butyl 3,5-diaminobenzoate 4-[((2E)-3-(4-{difluoro[4-(4,4,4-trifluorobutoxy)phenyl]methoxy}phenyl)prop-2-enoyl)oxy]butyl 3,5-diaminobenzoate 4-[((2E)-3-(4-{difluoro[4-(4,4,4-trifluorobutoxy)phenyl]methoxy}phenyl)prop-2-enoyl)oxy]butyl 3,5-diaminobenzoate 4-[((2E)-3-(4-{difluoro[4-(3,3,3-trifluoropropoxy)phenyl]methoxy}phenyl)prop-2-enoyl)oxy]butyl 3,5-diaminobenzoate 4-[((2E)-3-(4-{difluoro[4-(4,4,4-trifluorobutoxy)phenyl]methoxy}phenyl)prop-2-enoyl)oxy]butyl 3,5-diaminobenzoate 4-[((2E)-3-[4-(difluoro{4-[(5,5,5-trifluoropentyl)oxy]phenyl}methoxy)phenyl]prop-2-enoyl)oxy]butyl 3,5-diaminobenzoate 4-[((2E)-3-[4-(difluoro{4-[(6,6,6-trifluorohexyl)oxy]phenyl}methoxy)phenyl]prop-2-enoyl)oxy]butyl 3,5-diaminobenzoate 4-[((2E)-3-(4-{difluoro[4-(3,3,3-trifluoropropyl)phenyl]methoxy}phenyl)prop-2-enoyl)oxy]butyl 3,5-diaminobenzoate 4-[((2E)-3-(4-{difluoro[4-(4,4,4-trifluorobutyl)phenyl]methoxy}phenyl)prop-2-enoyl)oxy]butyl 3,5-diaminobenzoate 4-[((2E)-3-(4-{difluoro[4-(5,5,5-trifluoropentyl)phenyl]methoxy}phenyl)prop-2-enoyl)oxy]butyl 3,5-diaminobenzoate 4-[((2E)-3-(4-{difluoro[4-(6,6,6-trifluorohexyl)phenyl]methoxy}phenyl)prop-2-enoyl)oxy]butyl 3,5-diaminobenzoate 4-[((2E)-3-(4-{difluoro[2-fluoro-4-(4,4,4-trifluorobutoxy)phenyl]methoxy}phenyl)prop-2-enoyl)oxy]butyl 3,5-diaminobenzoate 4-[((2E)-3-[4-(difluoro{4-[(4,4,5,5,5-pentafluoropentyl)oxy]phenyl}methoxy)phenyl]prop-2-enoyl)oxy]butyl 3,5-diaminobenzoate 4-[((2E)-3-(4-{difluoro[3-fluoro-4-(4,4,4-trifluorobutoxy)phenyl]methoxy}phenyl)prop-2-enoyl)oxy]butyl 3,5-diaminobenzoate 4-[((2E)-3-{4-[(4-butoxy-3-methoxyphenyl)(difluoro)methoxy]phenyl}prop-2-enoyl)oxy]butyl 3,5-diaminobenzoate 4-[((2E)-3-{4-[[2,3-difluoro-4-(4,4,4-trifluorobutoxy)phenyl](difluoro)methoxy]phenyl}prop-2-enoyl)oxy]butyl 3,5-diaminobenzoate 4-[((2E)-3-(4-{difluoro[3-methoxy-4-(4,4,4-trifluorobutoxy)phenyl]methoxy}phenyl)prop-2-enoyl)oxy]butyl 3,5-diaminobenzoate 4-[((2E)-3-(4-{difluoro[4-(3-fluoropropoxy)phenyl]methoxy}phenyl)prop-2-enoyl)oxy]butyl 3,5-diaminobenzoate 4-[((2E)-3-(4-{difluoro[4-(4-fluorobutoxy)phenyl]methoxy}phenyl)prop-2-enoyl)oxy]butyl 3,5-diaminobenzoate 4-[((2E)-3-{4-[[4-(2-cyanoethoxy)phenyl](difluoro)methoxy]phenyl}prop-2-enoyl)oxy]butyl 3,5-diaminobenzoate 4-[((2E)-3-{4-[[4-(3-cyanopropoxy)phenyl](difluoro)methoxy]phenyl}prop-2-enoyl)oxy]butyl 3,5-diaminobenzoate 4-[((2E)-3-{4-[[4-(4-cyanobutoxy)phenyl](difluoro)methoxy]phenyl}prop-2-enoyl)oxy]butyl 3,5-diaminobenzoate 4-[((2E)-3-{4-[{4-[(5-cyanopentyl)oxy]phenyl}(difluoro)methoxy]phenyl}prop-2-enoyl)oxy]butyl 3,5-diaminobenzoate 4-[((2E)-3-{4-[{4-[(6-cyanohexyl)oxy]phenyl}(difluoro)methoxy]phenyl}prop-2-enoyl)oxy]butyl 3,5-diaminobenzoate 4-[((2E)-3-[4-(difluoro{4-[2-(2,2,2-trifluoroethoxy)ethoxy]phenyl}methoxy)phenyl]prop-2-enoyl)oxy]butyl 3,5-diaminobenzoate 4-[((2E)-3-[4-(difluoro{4-[2-(2,2,2-trifluoroethoxy)ethoxy]phenyl}methoxy)phenyl]prop-2-enoyl)oxy]butyl 3,5-diaminobenzoate 4-[((2E)-3-(4-{difluoro[4-(trifluoromethyl)cyclohexyl]methoxy}phenyl)prop-2-enoyl)oxy]butyl 3,5-diaminobenzoate 4-[((2E)-3-(4-{difluoro[4-(2,2,2-trifluoroethyl)cyclohexyl]methoxy}phenyl)prop-2-enoyl)oxy]butyl 3,5-diaminobenzoate 4-[((2E)-3-(4-{difluoro[4-(3,3,3-trifluoropropyl)cyclohexyl]methoxy}phenyl)prop-2-enoyl)oxy]butyl 3,5-diaminobenzoate 4-[((2E)-3-(4-{difluoro[4-(4,4,4-trifluorobutyl)cyclohexyl]methoxy}phenyl)prop-2-enoyl)oxy]butyl 3,5-diaminobenzoate 4-[((2E)-3-{4-[difluoro(4-pentylbicyclo[2.2.2]oct-1-yl)methoxy]phenyl}prop-2-enoyl)oxy]butyl 3,5-diaminobenzoate 4-[((2E)-3-{4-[difluoro(4-propylcyclohexyl)methoxy]phenyl}prop-2-enoyl)oxy]butyl 3,5-diaminobenzoate 4-[((2E)-3-{4-[(4-butylcyclohexyl)(difluoro)methoxy]phenyl}prop-2-enoyl)oxy]butyl 3,5-diaminobenzoate 4-[((2E)-3-{4-[difluoro(4-pentylcyclohexyl)methoxy]phenyl}prop-2-enoyl)oxy]butyl 3,5-diaminobenzoate 4-[((2E)-3-{4-[difluoro(4-hexylcyclohexyl)methoxy]phenyl}prop-2-enoyl)oxy]butyl 3,5-diaminobenzoate 4-[((2E)-3-[4-(difluoro{4-[3-(pentamethyldisiloxanyl)propoxy]phenyl}methoxy)phenyl]prop-2-enoyl)oxy]butyl 3,5-diaminobenzoate 2-[((2E)-3-(4-{difluoro[4-(4,4,4-trifluorobutoxy)phenyl]methoxy}phenyl)prop-2-enoyl)oxy]ethyl 3,5-diaminobenzoate 2-[((2E)-3-(4-{difluoro[4-(4,4,4-trifluorobutoxy)phenyl]methoxy}phenyl)prop-2-enoyl)oxy]ethyl 3,5-diaminobenzoate 2-[((2E)-3-(4-{difluoro[4-(4,4,4-trifluorobutoxy)phenyl]methoxy}phenyl)prop-2-enoyl)oxy]ethyl 3,5-diaminobenzoate 2-[((2E)-3-(4-{difluoro[4-(4,4,4-trifluorobutoxy)phenyl]methoxy}phenyl)prop-2-enoyl)oxy]ethyl 3,5-diaminobenzoate 2-[((2E)-3-(4-{difluoro[4-(4,4,4-trifluorobutoxy)phenyl]methoxy}phenyl)prop-2-enoyl)oxy]ethyl 3,5-diaminobenzoate 2-[((2E)-3-(4-{difluoro[4-(3,3,3-trifluoropropoxy)phenyl]methoxy}phenyl)prop-2-enoyl)-oxy]ethyl 3,5-diaminobenzoate 2-[((2E)-3-(4-{difluoro[4-(4,4,4-trifluorobutoxy)phenyl]methoxy}phenyl)prop-2-enoyl)oxy]ethyl 3,5-diaminobenzoate 2-[((2E)-3-[4-(difluoro{4-[(5,5,5-trifluoropentyl)oxy]phenyl}methoxy)phenyl]prop-2-enoyl)-oxy]ethyl 3,5-diaminobenzoate 2-[((2E)-3-[4-(difluoro{4-[(6,6,6-trifluorohexyl)oxy]phenyl}methoxy)phenyl]prop-2-enoyl)-oxy]ethyl 3,5-diaminobenzoate 2-[((2E)-3-(4-{difluoro[4-(3,3,3-trifluoropropyl)phenyl]methoxy}phenyl)prop-2-enoyl)oxy]ethyl 3,5-diaminobenzoate 2-[((2E)-3-(4-{difluoro[4-(4,4,4-trifluorobutyl)phenyl]methoxy}phenyl)prop-2-enoyl)oxy]ethyl 3,5-diaminobenzoate 2-[((2E)-3-(4-{difluoro[4-(5,5,5-trifluoropentyl)phenyl]methoxy}phenyl)prop-2-enoyl)oxy]ethyl 3,5-diaminobenzoate 2-[((2E)-3-(4-{difluoro[4-(6,6,6-trifluorohexyl)phenyl]methoxy}phenyl)prop-2-enoyl)oxy]ethyl 3,5-diaminobenzoate 2-[((2E)-3-(4-{difluoro[2-fluoro-4-(4,4,4-trifluorobutoxy)phenyl]methoxy}phenyl)prop-2-enoyl)-oxy]ethyl 3,5-diaminobenzoate 2-[((2E)-3-[4-(difluoro{4-[(4,4,5,5,5-pentafluoropentyl)oxy]phenyl}methoxy)phenyl]prop-2-enoyl)-oxy]ethyl 3,5-diaminobenzoate 2-[((2E)-3-(4-{difluoro[3-fluoro-4-(4,4,4-trifluorobutoxy)phenyl]methoxy}phenyl)prop-2-enoyl)-oxy]ethyl 3,5-diaminobenzoate 2-[((2E)-3-{4-[(4-butoxy-3-methoxyphenyl)(difluoro)methoxy]phenyl}prop-2-enoyl)oxy]ethyl 3,5-diaminobenzoate 2-[((2E)-3-{4-[[2,3-difluoro-4-(4,4,4-trifluorobutoxy)phenyl](difluoro)methoxy]phenyl}prop-2-enoyl)oxy]ethyl 3,5-diaminobenzoate 2-[((2E)-3-(4-{difluoro[3-methoxy-4-(4,4,4-trifluorobutoxy)phenyl]methoxy}phenyl)prop-2-enoyl)-oxy]ethyl 3,5-diaminobenzoate 2-[((2E)-3-(4-{difluoro[4-(3-fluoropropoxy)phenyl]methoxy}phenyl)prop-2-enoyl)oxy]ethyl 3,5-diaminobenzoate 2-[((2E)-3-(4-{difluoro[4-(4-fluorobutoxy)phenyl]methoxy}phenyl)prop-2-enoyl)oxy]ethyl 3,5-diaminobenzoate 2-[((2E)-3-{4-[[4-(2-cyanoethoxy)phenyl](difluoro)methoxy]phenyl}prop-2-enoyl)oxy]ethyl 3,5-diaminobenzoate 2-[((2E)-3-{4-[[4-(3-cyanopropoxy)phenyl](difluoro)methoxy]phenyl}prop-2-enoyl)oxy]ethyl 3,5-diaminobenzoate 2-[((2E)-3-{4-[[4-(4-cyanobutoxy)phenyl](difluoro)methoxy]phenyl}prop-2-enoyl)oxy]ethyl 3,5-diaminobenzoate 2-[((2E)-3-{4-[{4-[(5-cyanopentyl)oxy]phenyl}(difluoro)methoxy]phenyl}prop-2-enoyl)oxy]ethyl 3,5-diaminobenzoate 2-[((2E)-3-{4-[{4-[(6-cyanohexyl)oxy]phenyl}(difluoro)methoxy]phenyl}prop-2-enoyl)oxy]ethyl 3,5-diaminobenzoate 2-[((2E)-3-[4-(difluoro{4-[2-(2,2,2-trifluoroethoxy)ethoxy]phenyl}methoxy)phenyl]prop-2-enoyl)-oxy]ethyl 3,5-diaminobenzoate 2-[((2E)-3-[4-(difluoro{4-[2-(2,2,2-trifluoroethoxy)ethoxy]phenyl}methoxy)phenyl]prop-2-enoyl)oxy]ethyl 3,5-diaminobenzoate 2-[((2E)-3-(4-{difluoro[4-(trifluoromethyl)cyclohexyl]methoxy}phenyl)prop-2-enoyl)oxy]ethyl 3,5-diaminobenzoate 2-[((2E)-3-(4-{difluoro[4-(2,2,2-trifluoroethyl)cyclohexyl]methoxy}phenyl)prop-2-enoyl)-oxy]ethyl 3,5-diaminobenzoate 2-[((2E)-3-(4-{difluoro[4-(3,3,3-trifluoropropyl)cyclohexyl]methoxy}phenyl)prop-2-enoyl)-oxy]ethyl 3,5-diaminobenzoate 2-[((2E)-3-(4-{difluoro[4-(4,4,4-trifluorobutyl)cyclohexyl]methoxy}phenyl)prop-2-enoyl)-oxy]ethyl 3,5-diaminobenzoate 2-[((2E)-3-{4-[difluoro(4-pentylbicyclo[2.2.2]oct-1-yl)methoxy]phenyl}prop-2-enoyl)oxy]ethyl 3,5-diaminobenzoate 2-[((2E)-3-{4-[difluoro(4-propylcyclohexyl)methoxy]phenyl}prop-2-enoyl)oxy]ethyl 3,5-diaminobenzoate 2-[((2E)-3-{4-[(4-butylcyclohexyl)(difluoro)methoxy]phenyl}prop-2-enoyl)oxy]ethyl 3,5-diaminobenzoate 2-[((2E)-3-{4-[difluoro(4-pentylcyclohexyl)methoxy]phenyl}prop-2-enoyl)oxy]ethyl 3,5-diaminobenzoate 2-[((2E)-3-{4-[difluoro(4-hexylcyclohexyl)methoxy]phenyl}prop-2-enoyl)oxy]ethyl 3,5-diaminobenzoate 2-[((2E)-3-[4-(difluoro{4-[3-(pentamethyldisiloxanyl)propoxy]phenyl}methoxy)phenyl]prop-2-enoyl)oxy]ethyl 3,5-diaminobenzoate Example 5

5.1 Preparation of 2-(2,4-dinitrophenyl)propane-1,3-diol 20 g (106.5 mmol) of 2,4-dinitrotoluene is solubilised in 280 mL of NMP. To the brown solution is added 7.6 g (255.6 mmol) of paraformaldehyde. To the suspension is added 597 mg (5.32 mmol) of potassium tetra butoxide. The resulting solution is stirred overnight at RT. The mixture was poured on 200 mL ice, and neutralized with 2 mL of HCl solution (25%). The reaction mixture is then partitioned between ethyl acetate and water; the organic phase is washed repeatedly with water, dried over sodium sulfate, filtered and concentrated by rotary evaporation. The solution is precipitate at RT by adding 150 mL of heptane. The product is filtrated and dried under vacuum at RT. The product is isolate 16.15 g as a slightly yellow product

5.2 Preparation of 2-(2,4-dinitrophenyl)-3-{[(2E)-3-(4-{difluoro[4-(4,4,4-trifluorobutoxy)phenyl]methoxy}phenyl)prop-2-enoyl]oxy}propyl (2E)-3-(4-{difluoro[4-(4,4,4-trifluorobutoxy)-phenyl]methoxy}phenyl)prop-2-enoate 2.85 g (11.8 mmol) of 2-(2,4-dinitrophenyl)propane-1,3-diol, 9.82 g (23.6 mmol) of (2E)-3-(4-{difluoro[4-(4,4,4-trifluorobutoxy)phenyl]methoxy}phenyl)prop-2-enoic acid, 288 mg (2.4 mmol) of 4-dimethylaminopyridine are dissolved in 30 mL of dichloromethane. 4.96 g (26.0 mmol) of N-(3-dimethylaminopropyl)-N'-ethylcarbodiimide hydrochloride (EDC hydrochloride) are added at 0° C. The solution is stirred for 1 h at 0° C. and allowed to stir at room temperature overnight. After 22 hours at room temperature, the reaction mixture is partitioned between dichloromethane and water. The organic phase is washed repeatedly with water, dried over sodium sulfate, filtrated and concentrated under reduced pressure. Chromatography of the residue on 400 g silica gel using toluene: ethyl acetate 95:5 as eluent and crystallization from ethyl acetate:hexane mixture yields 9.85 g of 2-(2,4-dinitrophenyl)-3-{[(2E)-3-(4-{difluoro[4-(4,4,4-trifluorobutoxy)phenyl]methoxy}phenyl)prop-2-enoyl]oxy}propyl (2E)-3-(4-{difluoro[4-(4,4,4-trifluorobutoxy)phenyl]methoxy}phenyl)prop-2-enoate as yellow crystals.

5.3 Preparation of 2-(2,4-diaminophenyl)-3-{[(2E)-3-(4-{difluoro[4-(4,4,4-trifluorobutoxy)-phenyl]methoxy}phenyl)prop-2-enoyl]oxy}propyl (2E)-3-(4-{difluoro[4-(4,4,4-trifluorobutoxy)-phenyl]methoxy}phenyl)prop-2-enoate 8.70 g (8.38 mmol) of 2-(2,4-dinitrophenyl)-3-{[(2E)-3-(4-{difluoro[4-(4,4,4-trifluorobutoxy)phenyl]methoxy}phenyl)prop-2-enoyl]oxy}propyl (2E)-3-(4-{difluoro[4-(4,4,4-trifluorobutoxy)phenyl]methoxy}phenyl)prop-2-enoate is dissolved in a mixture of 54 mL of N,N-dimethylformamide and 6 mL water. 13.9 g (51.4 mmol) ferric chloride hexahydrate are added. 5.60 g (85.7 mmol) zinc powder is added portion wise within 60 minutes. The mixture is allowed to react for 2 hours. The reaction mixture is partitioned between ethyl acetate and water and filtrated. The organic phase is washed repeatedly with water, dried over sodium sulfate, filtrated and concentrated under reduced pressure. Filtration of the residue on 400 g silica gel using toluene: ethyl acetate 1:3 as eluent and crystallization from ethyl acetate:hexane mixture yields 7.32 g of 2-(2,4-diaminophenyl)-3-{[(2E)-3-(4-{difluoro[4-(4,4,4-trifluorobutoxy)phenyl]methoxy}phenyl)prop-2-enoyl]oxy}propyl (2E)-3-(4-{difluoro[4-(4,4,4-trifluorobutoxy)phenyl]methoxy}phenyl)prop-2-enoate as yellow crystals.

The following diamines are synthesized in an analogous manner to Example 5

2-(2,4-diaminophenyl)-3-{[(2E)-3-(4-{difluoro[4-(2,2,2-trifluoroethoxy)phenyl]methoxy}phenyl)-prop-2-enoyl]oxy}propyl (2E)-3-(4-{difluoro[4-(2,2,2-trifluoroethoxy)phenyl]methoxy}phenyl)-prop-2-enoate;

2-(2,4-diaminophenyl)-3-{[(2E)-3-(4-{difluoro[4-(3,3,3-trifluoropropoxy)phenyl]methoxy}-phenyl)-prop-2-enoyl]oxy}propyl (2E)-3-(4-{difluoro[4-(3,3,3-trifluoropropoxy)phenyl]-methoxy}-phenyl)-prop-2-enoate;

2-(2,4-diaminophenyl)-3-{[(2E)-3-(4-{difluoro[4-(4,4,4-trifluorobutoxy)phenyl]methoxy}phenyl]-prop-2-enoyl]oxy}propyl (2E)-3-(4-{difluoro[4-(4,4,4-trifluorobutoxy)phenyl]methoxy}-phenyl)prop-2-enoate;

2-(2,4-diaminophenyl)-3-{[(2E)-3-(4-{difluoro[4-((5,5,5-trifluoropentyl)oxy)phenyl]methoxy}-phenyl)prop-2-enoyl]oxy}propyl (2E)-3-(4-{difluoro[4-((5,5,5-trifluoropentyl)oxy)phenyl]-methoxy}-phenyl)prop-2-enoate;

2-(2,4-diaminophenyl)-3-{[(2E)-3-(4-{difluoro[4-((6,6,6-trifluorohexyl)oxy)phenyl]methoxy}-phenyl)prop-2-enoyl]oxy}propyl (2E)-3-(4-{difluoro[4-((6,6,6-trifluorohexyl)oxy)phenyl]-methoxy}phenyl)prop-2-enoate;

2-(2,4-diaminophenyl)-3-{[(2E)-3-(4-{difluoro[4-(2,2,2-trifluoroethyl)phenyl]methoxy}phenyl)-prop-2-enoyl]oxy}propyl (2E)-3-(4-{difluoro[4-(2,2,2-trifluoroethyl)phenyl]methoxy}-phenyl)-prop-2-enoate;

2-(2,4-diaminophenyl)-3-{[(2E)-3-(4-{difluoro[4-(3,3,3-trifluoropropyl)phenyl]methoxy}phenyl)-prop-2-enoyl]oxy}propyl (2E)-3-(4-{difluoro[4-(3,3,3-trifluoropropyl)phenyl]methoxy}-phenyl)-prop-2-enoate;

2-(2,4-diaminophenyl)-3-{[(2E)-3-(4-{difluoro[4-(4,4,4-trifluorobutyl)phenyl]methoxy}phenyl)-prop-2-enoyl]oxy}propyl (2E)-3-(4-{difluoro[4-(4,4,4-trifluorobutyl)phenyl]methoxy}phenyl)-prop-2-enoate;

2-(2,4-diaminophenyl)-3-{[(2E)-3-(4-{difluoro[4-(5,5,5-trifluoropentyl)phenyl]methoxy}phenyl)-prop-2-enoyl]oxy}propyl (2E)-3-(4-{difluoro[4-(5,5,5-trifluoropentyl)phenyl]methoxy}phenyl)-prop-2-enoate;

2-(2,4-diaminophenyl)-3-{[(2E)-3-(4-{difluoro[4-(6,6,6-trifluorohexyl)phenyl]methoxy}phenyl)-prop-2-enoyl]oxy}propyl (2E)-3-(4-{difluoro[4-(6,6,6-trifluorohexyl)phenyl]methoxy}phenyl)-prop-2-enoate;

2-(2,4-diaminophenyl)-3-{[(2E)-3-(4-{difluoro[4-((4,4,5,5,5-pentafluoropentyl)oxy)phenyl]-methoxy}-phenyl)prop-2-enoyl]oxy}propyl (2E)-3-(4-{difluoro[4-((4,4,5,5,5-pentafluoropentyl)-oxy)phenyl]methoxy}phenyl)prop-2-enoate;

2-(2,4-diaminophenyl)-3-{[(2E)-3-(4-{difluoro[2-fluoro-4-(4,4,4-trifluorobutoxy)phenyl]-methoxy}-phenyl)-prop-2-enoyl]oxy}propyl (2E)-3-(4-{difluoro[2-fluoro-4-(4,4,4-trifluoro-butoxy)-phenyl]methoxy}phenyl)prop-2-enoate;

2-(2,4-diaminophenyl)-3-{[(2E)-3-(4-{difluoro[4-(2,2,2-trifluoroethoxy)phenyl]methoxy}-phenyl)prop-2-enoyl]oxy}propyl (2E)-3-(4-{difluoro[4-(2,2,2-trifluoroethoxy)phenyl]-methoxy}phenyl)prop-2-enoate;

2-(2,4-diaminophenyl)-3-{[(2E)-3-(4-{difluoro[4-(3,3,3-trifluoropropoxy)phenyl]methoxy}-phenyl)prop-2-enoyl]oxy}propyl (2E)-3-(4-{difluoro[4-(3,3,3-trifluoropropoxy)phenyl]-methoxy}phenyl)prop-2-enoate;

2-(2,4-diaminophenyl)-3-{[(2E)-3-(4-{difluoro[4-(4,4,4-trifluorobutoxy)phenyl]methoxy}-phenyl)prop-2-enoyl]oxy}propyl (2E)-3-(4-{difluoro[4-(4,4,4-trifluorobutoxy)phenyl]-methoxy}phenyl)prop-2-enoate;

2-(2,4-diaminophenyl)-3-{[(2E)-3-(4-{difluoro[4-((5,5,5-trifluoropentyl)oxy)phenyl]methoxy}-phenyl)prop-2-enoyl]oxy}propyl (2E)-3-(4-{difluoro[4-((5,5,5-trifluoropentyl)oxy)phenyl]-methoxy}phenyl)prop-2-enoate;

2-(2,4-diaminophenyl)-3-{[(2E)-3-(4-{difluoro[4-((6,6,6-trifluorohexyl)oxy)phenyl]methoxy}-phenyl)prop-2-enoyl]oxy}propyl (2E)-3-(4-{difluoro[4-((6,6,6-trifluorohexyl)oxy)phenyl]-methoxy}phenyl)prop-2-enoate;

2-(2,4-diaminophenyl)-3-{[(2E)-3-(4-{difluoro[4-(2-fluoroethyl)phenyl]methoxy}phenyl)prop-2-enoyl]oxy}propyl (2E)-3-(4-{difluoro[4-(2-fluoroethyl)phenyl]methoxy}phenyl)prop-2-enoate;

2-(2,4-diaminophenyl)-3-{[(2E)-3-(4-{difluoro[4-(3-fluoropropyl)phenyl]methoxy}phenyl)prop-2-enoyl]

oxy}propyl (2E)-3-(4-{difluoro[4-(3-fluoropropyl)phenyl]methoxy}phenyl)prop-2-enoate;

2-(2,4-diaminophenyl)-3-{[(2E)-3-(4-{difluoro[4-(4-fluorobutyl)phenyl]methoxy}phenyl)prop-2-enoyl]oxy}propyl (2E)-3-(4-{difluoro[4-(4-fluorobutyl)phenyl]methoxy}phenyl)prop-2-enoate;

2-(2,4-diaminophenyl)-3-{[(2E)-3-(4-{difluoro[4-(5-fluoropentyl)phenyl]methoxy}phenyl)prop-2-enoyl]oxy}propyl (2E)-3-(4-{difluoro[4-(5-fluoropentyl)phenyl]methoxy}phenyl)prop-2-enoate;

2-(2,4-diaminophenyl)-3-{[(2E)-3-(4-{difluoro[4-(6-fluorohexyl)phenyl]methoxy}phenyl)prop-2-enoyl]oxy}propyl (2E)-3-(4-{difluoro[4-(6-fluorohexyl)phenyl]methoxy}phenyl)prop-2-enoate;

2-(2,4-diaminophenyl)-3-{[(2E)-3-(4-{difluoro[4-(2-fluoroethoxy)phenyl]methoxy}phenyl)prop-2-enoyl]oxy}propyl (2E)-3-(4-{difluoro[4-(2-fluoroethoxy)phenyl]methoxy}phenyl)prop-2-enoate;

2-(2,4-diaminophenyl)-3-{[(2E)-3-(4-{difluoro[4-(3-fluoropropoxy)phenyl]methoxy}phenyl)-prop-2-enoyl]oxy}propyl (2E)-3-(4-{difluoro[4-(3-fluoropropoxy)phenyl]methoxy}phenyl)prop-2-enoate;

2-(2,4-diaminophenyl)-3-{[(2E)-3-(4-{difluoro[4-(4-fluorobutoxy)phenyl]methoxy}phenyl)prop-2-enoyl]oxy}propyl (2E)-3-(4-{difluoro[4-(4-fluorobutoxy)phenyl]methoxy}phenyl)prop-2-enoate;

2-(2,4-diaminophenyl)-3-{[(2E)-3-(4-{difluoro[4-((5-fluoropentyl)oxy)phenyl]methoxy}-phenyl)prop-2-enoyl]oxy}propyl (2E)-3-(4-{difluoro[4-((5-fluoropentyl)oxy)phenyl]-methoxy}phenyl)prop-2-enoate;

2-(2,4-diaminophenyl)-3-{[(2E)-3-(4-{difluoro[4-((6-fluorohexyl)oxy)phenyl]methoxy}phenyl)-prop-2-enoyl]oxy}propyl (2E)-3-(4-{difluoro[4-((6-fluorohexyl)oxy)phenyl]-methoxy}phenyl)-prop-2-enoate;

2-(2,4-diaminophenyl)-3-{[(2E)-3-(4-{difluoro[4-(2-cyanoethoxy)phenyl]methoxy}phenyl)prop-2-enoyl]oxy}propyl (2E)-3-(4-{difluoro[4-(2-cyanoethoxy)phenyl]methoxy}phenyl)prop-2-enoate;

2-(2,4-diaminophenyl)-3-{[(2E)-3-(4-{difluoro[4-(3-cyanopropoxy)phenyl]methoxy}phenyl)-prop-2-enoyl]oxy}propyl (2E)-3-(4-{difluoro[4-(3-cyanopropoxy)phenyl]methoxy}phenyl)prop-2-enoate;

2-(2,4-diaminophenyl)-3-{[(2E)-3-(4-{difluoro[4-(4-cyanobutoxy)phenyl]methoxy}phenyl)prop-2-enoyl]oxy}propyl (2E)-3-(4-{difluoro[4-(4-cyanobutoxy)phenyl]methoxy}phenyl)prop-2-enoate;

2-(2,4-diaminophenyl)-3-{[(2E)-3-{4-[(4-ethylcyclohexyl)(difluoro)methoxy]phenyl}prop-2-enoyl]oxy}propyl (2E)-3-{4-[(4-ethylcyclohexyl)(difluoro)methoxy]phenyl}prop-2-enoate;

2-(2,4-diaminophenyl)-3-{[(2E)-3-{4-[(4-propylcyclohexyl)(difluoro)methoxy]phenyl}prop-2-enoyl]oxy}propyl (2E)-3-{4-[(4-propylcyclohexyl)(difluoro)methoxy]phenyl}prop-2-enoate;

2-(2,4-diaminophenyl)-3-{[(2E)-3-{4-[(4-butylcyclohexyl)(difluoro)methoxy]phenyl}prop-2-enoyl]oxy}propyl (2E)-3-{4-[(4-butylcyclohexyl)(difluoro)methoxy]phenyl}prop-2-enoate;

2-(2,4-diaminophenyl)-3-{[(2E)-3-{4-[(4-pentylcyclohexyl)(difluoro)methoxy]phenyl}prop-2-enoyl]oxy}propyl (2E)-3-{4-[(4-pentylcyclohexyl)(difluoro)methoxy]phenyl}prop-2-enoate;

2-(2,4-diaminophenyl)-3-{[(2E)-3-{4-[(4-hexylcyclohexyl)(difluoro)methoxy]phenyl}prop-2-enoyl]oxy}propyl (2E)-3-{4-[(4-hexylcyclohexyl)(difluoro)methoxy]phenyl}prop-2-enoate;

2-(2,4-diaminophenyl)-3-{[(2E)-3-(4-{difluoro[4-(4,4,4-trifluorobutyl)cyclohexyl]methoxy}-phenyl)prop-2-enoyl]oxy}propyl (2E)-3-(4-{difluoro[4-(4,4,4-trifluorobutyl)cyclohexyl]methoxy}-phenyl)-prop-2-enoate;

Example 6

6.1 Preparation of 4,4'-Dinitro-1,1'-biphenyl-2,2'-dimethanol 3.6 g (10.83 mmol) 4,4'-Dinitro-1,1'-biphenyl-2,2'-dicarboxylic acid is dissolved in 25 ml tetrahydrofuran and added drop wise in a the course of 1 hours to 65 ml (65.02 mmol) of a borane-tetrahydrofuran complex 1.0 M solution in tetrahydrofuran. After 19 hours at 25° C., 50 ml water is carefully added. After 1 h the solution is acidified to pH=1-2 with 10 ml 1N HCl solution and allowed to stirred for 30 min. The reaction mixture is then partitioned between ethyl acetate and water; the organic phase is washed repeatedly with water, dried over sodium sulfate, filtered and concentrated by rotary evaporation. The residue, 4.2 g of 4,4'-Dinitro-1,1'-biphenyl-2,2'-dimethanol as white powder is used without further purification.

6.2 Preparation [4,4'-dinitro-2'-({[(2E)-3-(4-{difluoro[4-(4,4,4-trifluorobutoxy)phenyl]-methoxy}phenyl)prop-2-enoyl]oxy}methyl)-1,1'-biphenyl-2-yl]methyl (2E)-3-(4-{difluoro[4-(4,4,4-trifluorobutoxy)phenyl]methoxy}phenyl)prop-2-enoate 3.59 g (11.8 mmol) of 4,4'-Dinitro-1,1'-biphenyl-2,2'-dimethanol, 9.82 g (23.6 mmol) of (2E)-3-(4-{difluoro[4-(4,4,4-trifluorobutoxy)phenyl]methoxy}phenyl)prop-2-enoic acid, 288 mg (2.4 mmol) of 4-dimethylaminopyridine are dissolved in 30 mL of dichloromethane. 4.96 g (26.0 mmol) of N-(3-dimethylaminopropyl)-N'-ethylcarbodiimide hydrochloride (EDC hydrochloride) are added at 0° C. The solution is stirred for 1 h at 0° C. and allowed to stir at room temperature overnight. After 22 hours at room temperature, the reaction mixture is partitioned between dichloromethane and water. The organic phase is washed repeatedly with water, dried over sodium sulfate, filtrated and concentrated under reduced pressure. Chromatography of the residue on 400 g silica gel using toluene: ethyl acetate 95:5 as eluent and crystallization from ethyl acetate:hexane mixture yielded 10.21 g of [4,4'-dinitro-2'-({[(2E)-3-(4-{difluoro[4-(4,4,4-trifluorobutoxy)phenyl]methoxy}phenyl)prop-2-enoyl]oxy}methyl)-1,1'-biphenyl-2-yl]methyl (2E)-3-(4-{difluoro[4-(4,4,4-trifluorobutoxy)phenyl]methoxy}phenyl)prop-2-enoate as yellow crystals.

6.3 Preparation of [4,4'-diamino-2'-({[(2E)-3-(4-{difluoro[4-(4,4,4-trifluorobutoxy)phenyl]methoxy}phenyl)prop-2-enoyl]oxy}methyl)-1,1'-biphenyl-2-yl]methyl (2E)-3-(4-{difluoro[4-(4,4,4-trifluorobutoxy)phenyl]methoxy}phenyl)prop-2-enoate 9.22 g (8.38 mmol) of [4,4'-dinitro-2'-({[(2E)-3-(4-{difluoro[4-(4,4,4-trifluorobutoxy)phenyl]-methoxy}-phenyl)prop-2-enoyl]oxy}methyl)-1,1'-biphenyl-2-yl]methyl (2E)-3-(4-{difluoro[4-(4,4,4-trifluorobutoxy)phenyl]methoxy}phenyl)prop-2-enoate are dissolved in a mixture of 54 mL of N,N-dimethylformamide and 6 mL water. 13.9 g (51.4 mmol) ferric chloride hexa-hydrate are added. 5.60 g (85.7 mmol) zinc powder is added portion wise within 60 minutes. The mixture is allowed to react for 2 hours. The reaction mixture is partitioned between ethyl acetate and water and filtrated. The organic phase is washed repeatedly with water, dried over sodium sulfate, filtrated and concentrated under reduced pressure. Filtration of the residue on 400 g silica gel using toluene:ethyl acetate 1:3 as eluent and crystallization from ethyl acetate:hexane mixture yields 7.59 g of [4,4'-diamino-2'-({[(2E)-3-(4-{difluoro[4-(4,4,4-trifluorobutoxy)phenyl]methoxy}phenyl)prop-2-enoyl]oxy}methyl)-1,1'-biphenyl-2-yl]methyl (2E)-3-(4-{difluoro[4-(4,4,4-trifluorobutoxy)phenyl]methoxy}phenyl)prop-2-enoate as yellow crystals.

$^1$H NMR DMSO $d_6$ 300 MHz: 7.73 (d, 4H), 7.65 (d, 4H), 7.60 (d, 2H), 7.29 (d, 4H), 7.09 (d, 4H), 6.83 (d, 2H), 6.69 (d, 2H), 6.54 (m, 4H), 5.14 (s, 4H), 4.82 (s, 4H), 4.09 (t, 4H), 2.45 (m, 4H), 1.98 (m, 4H)

The following diamines are synthesized in an analogous manner to Example 6

[4,4'-diamino-2'-({[(2E)-3-(4-{difluoro[4-(2,2,2-trifluoroethoxy)phenyl]methoxy}phenyl)prop-2-enoyl]oxy}methyl)-1,1'-biphenyl-2-yl]methyl (2E)-3-(4-{difluoro[4-(2,2,2-trifluoroethoxy)-phenyl]methoxy}phenyl)prop-2-enoate;

[4,4'-diamino-2'-({[(2E)-3-(4-{difluoro[4-(3,3,3-trifluoropropoxy)phenyl]methoxy}phenyl)prop-2-enoyl]oxy}methyl)-1,1'-biphenyl-2-yl]methyl (2E)-3-(4-{difluoro[4-(3,3,3-trifluoropropoxy)-phenyl]methoxy}phenyl)prop-2-enoate;

[4,4'-diamino-2'-({[(2E)-3-(4-{difluoro[4-(4,4,4-trifluorobutoxy)phenyl]methoxy}phenyl)prop-2-enoyl]oxy}methyl)-1,1'-biphenyl-2-yl]methyl (2E)-3-(4-{difluoro[4-(4,4,4-trifluorobutoxy)-phenyl]-methoxy}phenyl)prop-2-enoate;

[4,4'-diamino-2'-({[(2E)-3-(4-{difluoro[2-fluoro-4-(4,4,4-trifluorobutoxy)phenyl]-methoxy}-phenyl)-prop-2-enoyl]oxy}methyl)-1,1'-biphenyl-2-yl]methyl (2E)-3-(4-{difluoro[2-fluoro-4-(4,4,4-trifluorobutoxy)phenyl]methoxy}phenyl)prop-2-enoate;

[4,4'-diamino-2'-({[(2E)-3-(4-{difluoro[4-((5,5,5-trifluoropentyl)oxy)phenyl]methoxy}phenyl)-prop-2-enoyl]oxy}methyl)-1,1'-biphenyl-2-yl]methyl (2E)-3-(4-{difluoro[4-((5,5,5-trifluoro-pentyl)-oxy)phenyl]methoxy}phenyl)prop-2-enoate;

[4,4'-diamino-2'-({[(2E)-3-(4-{difluoro[4-((6,6,6-trifluorohexyl)oxy)phenyl]methoxy}phenyl)prop-2-enoyl]oxy}methyl)-1,1'-biphenyl-2-yl]methyl (2E)-3-(4-{difluoro[4-((6,6,6-trifluorohexyl)oxy)-phenyl]methoxy}phenyl)prop-2-enoate;

[4,4'-diamino-2'-({[(2E)-3-(4-{difluoro[4-(2,2,2-trifluoroethyl)phenyl]methoxy}phenyl)prop-2-enoyl]oxy}methyl)-1,1'-biphenyl-2-yl]methyl (2E)-3-(4-{difluoro[4-(2,2,2-trifluoroethyl)phenyl]-methoxy}phenyl)prop-2-enoate;

[4,4'-diamino-2'-({[(2E)-3-(4-{difluoro[4-(3,3,3-trifluoropropyl)phenyl]methoxy}phenyl)prop-2-enoyl]oxy}methyl)-1,1'-biphenyl-2-yl]methyl (2E)-3-(4-{difluoro[4-(3,3,3-trifluoropropyl)phenyl]-methoxy}-phenyl)prop-2-enoate;

[4,4'-diamino-2'-({[(2E)-3-(4-{difluoro[4-(4,4,4-trifluorobutyl)phenyl]methoxy}phenyl)prop-2-enoyl]oxy}methyl)-1,1'-biphenyl-2-yl]methyl (2E)-3-(4-{difluoro[4-(4,4,4-trifluorobutyl)-phenyl]methoxy}phenyl)prop-2-enoate;

[4,4'-diamino-2'-({[(2E)-3-(4-{difluoro[4-(5,5,5-trifluoropentyl)phenyl]methoxy}phenyl)prop-2-enoyl]oxy}methyl)-1,1'-biphenyl-2-yl]methyl (2E)-3-(4-{difluoro[4-(5,5,5-trifluoropentyl)-phenyl]methoxy}phenyl)prop-2-enoate;

[4,4'-diamino-2'-({[(2E)-3-(4-{difluoro[4-(6,6,6-trifluorohexyl)phenyl]methoxy}phenyl)prop-2-enoyl]oxy}methyl)-1,1'-biphenyl-2-yl]methyl (2E)-3-(4-{difluoro[4-(6,6,6-trifluorohexyl)-phenyl]methoxy}phenyl)prop-2-enoate;

[4,4'-diamino-2'-({[(2E)-3-(4-{difluoro[4-(2-cyanoethoxy)phenyl]methoxy}phenyl)prop-2-enoyl]oxy}methyl)-1,1'-biphenyl-2-yl]methyl (2E)-3-(4-{difluoro[4-(2-cyanoethoxy)-phenyl]methoxy}phenyl)prop-2-enoate;

[4,4'-diamino-2'-({[(2E)-3-(4-{difluoro[4-(3-cyanopropoxy)phenyl]methoxy}phenyl)prop-2-enoyl]oxy}methyl)-1,1'-biphenyl-2-yl]methyl (2E)-3-(4-{difluoro[4-(3-cyanopropoxy)-phenyl]methoxy}phenyl)prop-2-enoate;

[4,4'-diamino-2'-({[(2E)-3-(4-{difluoro[4-(4-cyanobutoxy)phenyl]methoxy}phenyl)prop-2-enoyl]oxy}methyl)-1,1'-biphenyl-2-yl]methyl (2E)-3-(4-{difluoro[4-(4-cyanobutoxy)phenyl]-methoxy}phenyl)prop-2-enoate;

[4,4'-diamino-2'-({[(2E)-3-(4-{difluoro[4-((4,4,5,5,5-pentafluoropentyl)oxy)-phenyl]-methoxy}phenyl)prop-2-enoyl]oxy}methyl)-1,1'-biphenyl-2-yl]methyl (2E)-3-(4-{difluoro[4-((4,4,5,5,5-pentafluoropentyl)oxy)phenyl]methoxy}phenyl)prop-2-enoate;

[4,4'-diamino-2'-({[(2E)-3-{4-[(4-butylcyclohexyl)(difluoro)methoxy]phenyl}prop-2-enoyl]oxy}methyl)-1,1'-biphenyl-2-yl]methyl (2E)-3-{4-[(4-butylcyclohexyl)(difluoro)-methoxy]phenyl}prop-2-enoate;

[4,4'-diamino-2'-({[(2E)-3-{4-[(5-pentylcyclohexyl)(difluoro)methoxy]phenyl}prop-2-enoyl]oxy}methyl)-1,1'-biphenyl-2-yl]methyl (2E)-3-{4-[(5-pentylcyclohexyl)-(difluoro)methoxy]phenyl}prop-2-enoate;

[4,4'-diamino-2'-({[(2E)-3-{4-[(6-hexylcyclohexyl)(difluoro)methoxy]phenyl}prop-2-enoyl]oxy}methyl)-1,1'-biphenyl-2-yl]methyl (2E)-3-{4-[(6-hexylcyclohexyl)(difluoro)-methoxy]phenyl}prop-2-enoate;

[4,4'-diamino-2'-({[(2E)-3-{4-[(3-propylcyclohexyl)(difluoro)methoxy]phenyl}prop-2-enoyl]oxy}methyl)-1,1'-biphenyl-2-yl]methyl (2E)-3-{4-[(3-propylcyclohexyl)(difluoro)-methoxy]phenyl}prop-2-enoate;

Example 7

7.1 Preparation of
2,2-bis(4-nitrobenzyl)-1,3-propandiol 4.00 g (10.69 mmol) 2,2-bis(4-nitrobenzyl)malonic acid is dissolved in 40 ml tetrahydrofuran and added dropwise in a the course of 2 hours to 64.1 ml (64.1 mmol) of a borane-tetrahydrofuran complex 1.0 M solution in tetrahydrofuran. After 19 hours at 25° C., 50 ml water is carefully added. The reaction mixture is then partitioned between ethyl acetate and water; the organic phase is washed repeatedly with water, dried over sodium sulfate, filtered and concentrated by rotary evaporation. The residue, 3.77 g (97%) of 2,2-bis(4-nitrobenzyl)-1,3-propandiol as white powder is used without further purification.

7.2 Preparation 2,2-bis(4-nitrobenzyl)-3-{[(2E)-3-(4-{difluoro[4-(4,4,4-trifluorobutoxy)phenyl]methoxy}phenyl)prop-2-enoyl]oxy}propyl (2E)-3-(4-{difluoro[4-(4,4,4-trifluorobutoxy)phenyl]methoxy}phenyl)prop-2-enoate 4.08 g (11.8 mmol) of 2,2-bis(4-nitrobenzyl)-1,3-propandiol, 9.82 g (23.6 mmol) of (2E)-3-(4-{difluoro[4-(4,4,4-trifluorobutoxy)phenyl]methoxy}phenyl)prop-2-enoic acid, 288 mg (2.4 mmol) of 4-dimethylaminopyridine are dissolved in 30 mL of dichloromethane. 4.96 g (26.0 mmol) of N-(3-dimethylaminopropyl)-N'-ethylcarbodiimide hydrochloride (EDC hydrochloride) are added at 0° C. The solution is stirred for 1 h at 0° C. and allowed to stir at room temperature overnight. After 22 hours at room temperature, the reaction mixture is partitioned between dichloromethane and water. The organic phase is washed repeatedly with water, dried over sodium sulfate, filtrated and concentrated under reduced pressure. Chromatography of the residue on 400 g silica gel using toluene: ethyl acetate 95:5 as eluent and crystallization from ethyl acetate:hexane mixture yields 11.47 g of 2,2-bis(4-nitrobenzyl)-3-{[(2E)-3-(4-{di-fluoro[4-(4,4,4-trifluorobutoxy)phenyl]methoxy}phenyl)prop-2-enoyl]oxy}propyl (2E)-3-(4-{difluoro[4-(4,4,4-trifluorobutoxy)phenyl]methoxy}phenyl)prop-2-enoate as yellow crystals.

7.3 Preparation of 2,2-bis(4-aminobenzyl)-3-{[(2E)-3-(4-{difluoro[4-(4,4,4-trifluorobutoxy)phenyl]methoxy}phenyl)prop-2-enoyl]oxy}propyl (2E)-3-(4-{difluoro[4-(4,4,4-trifluorobutoxy)phenyl]methoxy}phenyl)prop-2-enoate 9.57 g (8.38 mmol) of 2,2-bis(4-nitrobenzyl)-3-{[(2E)-3-(4-{difluoro[4-(4,4,4-trifluorobutoxy)phenyl]methoxy}phenyl)prop-2-enoyl]oxy}propyl (2E)-3-(4-{difluoro[4-(4,4,4-trifluorobutoxy)phenyl]methoxy}phenyl)prop-2-enoate are dissolved in a mixture of 54 mL of N,N-dimethylformamide and 6 mL water. 13.9 g (51.4 mmol) ferric chloride hexahydrate are added. 5.60 g (85.7 mmol) zinc powder is added portion wise within 60 minutes. The mixture is allowed to react for 2 hours. The reaction mixture is partitioned between ethyl acetate and water and filtrated. The organic phase is washed repeatedly with water, dried over sodium sulfate, filtrated and concentrated under reduced pressure. Filtration of the residue on 400 g silica gel using toluene: ethyl acetate 1:3 as eluent and crystallization from ethyl acetate:hexane mixture yielded 7.93 g of 2,2-bis(4-aminobenzyl)-3-{[(2E)-3-(4-{difluoro[4-(4,4,4-trifluorobutoxy)phenyl]methoxy}phenyl)prop-2-enoyl]oxy}propyl (2E)-3-(4-{difluoro[4-(4,4,4-trifluorobutoxy)phenyl]methoxy}phenyl)prop-2-enoate as yellow crystals.

The following diamines are synthesized in an analogous manner to Example 7

2,2-bis(4-aminobenzyl)-3-{[(2E)-3-(4-{difluoro[4-(2,2,2-trifluoroethoxy)phenyl]methoxy}-phenyl)prop-2-enoyl]oxy}propyl (2E)-3-(4-{difluoro[4-(2,2,2-trifluoroethoxy)phenyl]methoxy}-phenyl)prop-2-enoate;

2,2-bis(4-aminobenzyl)-3-{[(2E)-3-(4-{difluoro[4-(3,3,3-trifluoropropoxy)phenyl]methoxy}-phenyl)-prop-2-enoyl]oxy}propyl (2E)-3-(4-{difluoro[4-(3,3,3-trifluoropropoxy)phenyl]-methoxy}-phenyl)prop-2-enoate;

2,2-bis(4-aminobenzyl)-3-{[(2E)-3-(4-{difluoro[4-(4,4,4-trifluorobutoxy)phenyl]methoxy}-phenyl)-prop-2-enoyl]oxy}propyl (2E)-3-(4-{difluoro[4-(4,4,4-trifluorobutoxy)phenyl]methoxy}-phenyl)-prop-2-enoate;

2,2-bis(4-aminobenzyl)-3-{[(2E)-3-(4-{difluoro[2-fluoro-4-(4,4,4-trifluorobutoxy)phenyl]-methoxy}-phenyl)-prop-2-enoyl]oxy}propyl (2E)-3-(4-{difluoro[2-fluoro-4-(4,4,4-trifluoro-butoxy)phenyl]methoxy}phenyl)prop-2-enoate;

2,2-bis(4-aminobenzyl)-3-{[(2E)-3-(4-{difluoro[4-((5,5,5-trifluoropentyl)oxy)phenyl]methoxy}-phenyl)prop-2-enoyl]oxy}propyl (2E)-3-(4-{difluoro[4-((5,5,5-trifluoropentyl)oxy)phenyl]-methoxy}-phenyl)prop-2-enoate;

2,2-bis(4-aminobenzyl)-3-{[(2E)-3-(4-{difluoro[4-((6,6,6-trifluorohexyl)oxy)-phenyl]methoxy}-phenyl)prop-2-enoyl]oxy}propyl (2E)-3-(4-{difluoro[4-((6,6,6-trifluorohexyl)oxy)phenyl]-methoxy}phenyl)-methoxy}phenyl)prop-2-enoate;

2,2-bis(4-aminobenzyl)-3-{[(2E)-3-(4-{difluoro[4-(2,2,2-trifluoroethyl)phenyl]methoxy}phenyl)-prop-2-enoyl]oxy}propyl (2E)-3-(4-{difluoro[4-(2,2,2-trifluoroethyl)phenyl]-methoxy}phenyl)-prop-2-enoate;

2,2-bis(4-aminobenzyl)-3-{[(2E)-3-(4-{difluoro[4-(3,3,3-trifluoropropyl)phenyl]methoxy}-phenyl)-prop-2-enoyl]oxy}propyl (2E)-3-(4-{difluoro[4-(3,3,3-trifluoropropyl)phenyl]-methoxy}phenyl)prop-2-enoate;

2,2-bis(4-aminobenzyl)-3-{[(2E)-3-(4-{difluoro[4-(4,4,4-trifluorobutyl)phenyl]methoxy}-phenyl)-prop-2-enoyl]oxy}propyl (2E)-3-(4-{difluoro[4-(4,4,4-trifluorobutyl)phenyl]-methoxy}phenyl)prop-2-enoate;

2,2-bis(4-aminobenzyl)-3-{[(2E)-3-(4-{difluoro[4-(5,5,5-trifluoropentyl)phenyl]-methoxy}phenyl)prop-2-enoyl]oxy}propyl (2E)-3-(4-{difluoro[4-(5,5,5-trifluoropentyl)-phenyl]methoxy}phenyl)prop-2-enoate;

2,2-bis(4-aminobenzyl)-3-{[(2E)-3-(4-{difluoro[4-(6,6,6-trifluorohexyl)phenyl]-methoxy}phenyl)prop-2-enoyl]oxy}propyl (2E)-3-(4-{difluoro[4-(6,6,6-trifluorohexyl)-phenyl]methoxy}phenyl)prop-2-enoate;

2,2-bis(4-aminobenzyl)-3-{[(2E)-3-(4-{difluoro[4-((4,4,5,5,5-pentafluoropentyl)oxy)-phenyl]-methoxy}phenyl)prop-2-enoyl]oxy}propyl (2E)-3-(4-{difluoro[4-((4,4,5,5,5-pentafluoropentyl)-oxy)-phenyl]methoxy}phenyl)prop-2-enoate;

2,2-bis(4-aminobenzyl)-3-{[(2E)-3-(4-{difluoro[4-(2-cyanoethoxy)phenyl]-methoxy}phenyl)-prop-2-enoyl]oxy}propyl (2E)-3-(4-{difluoro[4-(2-cyanoethoxy)phenyl]methoxy}phenyl)-prop-2-enoate;

2,2-bis(4-aminobenzyl)-3-{[(2E)-3-(4-{difluoro[4-(3-cyanopropoxy)phenyl]methoxy}-phenyl)prop-2-enoyl]oxy}propyl (2E)-3-(4-{difluoro[4-(3-cyanopropoxy)phenyl]methoxy}-phenyl)-prop-2-enoate;

2,2-bis(4-aminobenzyl)-3-{[(2E)-3-(4-{difluoro[4-(4-cyanobutoxy)phenyl]methoxy}phenyl)-prop-2-enoyl]oxy}propyl (2E)-3-(4-{difluoro[4-(cyanobutoxy)phenyl]-methoxy}-phenyl)prop-2-enoate;

2,2-bis(4-aminobenzyl)-3-{[(2E)-3-{4-[(4-butylcyclohexyl)(difluoro)methoxy]phenyl}prop-2-enoyl]oxy}propyl (2E)-3-{4-[(4-butylcyclohexyl)(difluoro)methoxy]phenyl}prop-2-enoate;

2,2-bis(4-aminobenzyl)-3-{[(2E)-3-{4-[(3-propylcyclohexyl)(difluoro)methoxy]phenyl}prop-2-enoyl]oxy}propyl (2E)-3-{4-[(3-propylcyclohexyl)-(difluoro)methoxy]-phenyl}prop-2-enoate;

2,2-bis(4-aminobenzyl)-3-{[(2E)-3-{4-[(5-pentylcyclohexyl)(difluoro)methoxy]phenyl}prop-2-enoyl]oxy}propyl (2E)-3-{4-[(5-pentylcyclohexyl)(difluoro)-methoxy]phenyl}-prop-2-enoate;

2,2-bis(4-aminobenzyl)-3-{[(2E)-3-{4-[(6-hexylcyclohexyl)(difluoro)methoxy]phenyl}prop-2-enoyl]oxy}propyl (2E)-3-{4-[(6-hexylcyclohexyl)(difluoro)methoxy]phenyl}prop-2-enoate;

2,2-bis(4-aminobenzyl)-3-{[(2E)-3-{4-[(2-ethylcyclohexyl)(difluoro)methoxy]phenyl}prop-2-enoyl]oxy}propyl (2E)-3-{4-[(2-ethylcyclohexyl)(difluoro)methoxy]phenyl}prop-2-enoate;

Example 8

8.1 Preparation of 1-(benzyloxy)-4-(4,4,4-trifluorobutoxy)benzene 464.5 g (1.95 mol) of 4-iodo-1,1,1-trifluorobutane, 390.4 g (1.95 mol) of 4-(benzyloxy)phenol and 539.5 g (3.90 mol) of potassium carbonate are dissolved in 3 L of NMP. The mixture is heated to 80° C. overnight. The solution is cooled to room temperature and the reaction mixture is extracted with ethyl acetate and water. The organic phase is washed repeatedly with water, dried over sodium sulfate, filtrated and concentrated under reduced pressure to give 580 g of

8.2 Preparation of 4-(4,4,4-trifluorobutoxy)phenol 60 g (193 mmol) of 1-(benzyloxy)-4-(4,4,4-trifluorobutoxy)benzene, and 7.61 g of Pd/C are dissolved in 900 mL of THF. 5 mL of triethylamine are added to the suspension. The reaction is hydrogenated under atmospheric pressure for 2 hours. The suspension is filtrated of 400 g of hyflo. The organic phase is concentrated under reduced pressure. Filtration of the residue on 900 g silica gel using toluene:ethyl acetate 4:1 as eluent and concentration under reduced pressure yields 41 g of 4-(4,4,4-trifluorobutoxy)phenol as a reddish oil.

8.3 Preparation of 2-(4-bromophenyl)-5,6-dihydro-4H-1,3-dithiin-1-ium trifluoromethanesulfonate 48.64 g (242 mmol) of 4-bromobenzoic acid, 31.8 ml (314 mmol) of propane-1,3-dithiol and 27.9 ml (314 mmol) of trifluoromethanesulfonic acid are refluxed in 1.6 l of a mixture 1/1 isooctane/toluene for 18 hours. The mixture is cooled down and the product is precipitated by addition of 1.5 l of TBME to yield 75 g of 2-(4-bromophenyl)-5,6-dihydro-4H-1,3-dithiin-1-ium trifluoromethanesulfonate as yellow crystals.

8.4 Preparation of 1-bromo-4-{difluoro[4-(4,4,4-trifluorobutoxy)phenoxy]methyl}benzene 69.3 g (164 mmol) of 2-(4-bromophenyl)-5,6-dihydro-4H-1,3-dithiin-1-ium trifluoromethanesulfonate, are solubilised in 750 mL of dichloromethane. The solution is cooled down to −55° C. 53.94 g (245 mmol) of 4-(4,4,4-trifluorobutoxy) phenol and 36.5 ml (262 mmol) of triethylamine dissolved in 300 ml of dichloromethane is added to the previous solution. The solution was cooled down to −70° C. and stirred for 45 minutes. 120 ml (736 mmol) of triethylamine trihydrofluoride are added to the mixture. A solution of 8.43 ml (164 mmol) of bromine in 60 ml of dichloromethane is added at this temperature. The reaction is stirred for one hour. The reaction is quenched by addition of NaHCO$_3$. The organic phase is washed repeatedly with water, dried over sodium sulfate, filtrated and concentrated under reduced pressure. Chromatography of the residue on 400 g silica gel using toluene: ethyl acetate 95:5 as eluent yields 42 g of 1-bromo-4-{difluoro[4-(4,4,4-trifluorobutoxy)phenoxy] methyl}benzene.

8.5 Preparation of methyl (2E)-3-(4-{difluoro[4-(4,4,4-trifluorobutoxy)phenoxy]-methyl}phenyl)prop-2-enoate 554 mg (2.469 mmol) of Pd(OAc)$_2$, 2.70 g (7.41 mmol) of dicyclohexyl(2'-methylbuphenyl-2-yl)phosphine, 35 g (82 mmol) of 1-bromo-4-{difluoro[4-(4,4,4-trifluorobutoxy) phenoxy]-methyl}benzene, 17.2 ml (123 mmol) of triethylamine and 14.84 ml (165 mmol) of methyl acrylate are solubilised in 500 ml of DMF and heated to 130° C. After 2 hours, the solution is diluted to room temperature and diluted with 500 ml of TBME. The solution is filtrated over a plug of Hyflo. The organic phase is washed repeatedly with water, dried over sodium sulfate, filtrated and concentrated under reduced pressure. Crystallisation from toluene/heptane mixture yields 23 g of methyl (2E)-3-(4-{difluoro[4-(4,4,4-trifluorobutoxy)phenoxy]-methyl}-phenyl)prop-2-enoate.

8.6 Preparation of (2E)-3-(4-{difluoro[4-(4,4,4-trifluorobutoxy)phenoxy]methyl}phenyl)prop-2-enoic acid 23 g (53.4 mmol) of methyl (2E)-3-(4-{difluoro[4-(4,4,4-trifluorobutoxy)phenoxy]methyl}-phenyl)prop-2-enoate is dissolved in 400 ml of dioxane. 30 ml of NaOH (30%) diluted in 250 ml of water is added to the solution. The mixture is heated to 55° C. for 2 hours. The mixture is cooled to room temperature and is carefully acidified to pH=2 with a HCl solution (25%) and is stirred for 15 min. The product is filtrated off and dried at room temperature under vacuum for 10 h to give 18 g of (2E)-3-(4-{difluoro[4-(4,4,4-trifluorobutoxy)phenoxy]-methyl}phenyl)-prop-2-enoic acid as a colourless powder.

The following acrylic acid are synthesized in an analogous manner to Example 8.

(2E)-3-(4-{difluoro[4-(2,2,2-trifluoroethoxy)phenoxy] methyl}phenyl)prop-2-enoic acid,
(2E)-3-(4-{difluoro[4-(3,3,3-trifluoropropoxy)phenoxy] methyl}phenyl)prop-2-enoic acid,
(2E)-3-(4-{difluoro[4-(4,4,4-trifluorobutoxy)phenoxy] methyl}phenyl)prop-2-enoic acid,
(2E)-3-[4-(difluoro{4-[(5,5,5-trifluoropentyl)oxy] phenoxy}methyl)phenyl]prop-2-enoic acid,
(2E)-3-[4-(difluoro{4-[(6,6,6-trifluorohexyl)oxy] phenoxy}methyl)phenyl]prop-2-enoic acid,
(2E)-3-(4-{difluoro[4-(4,4,4-trifluorobutyl)phenoxy] methyl}phenyl)prop-2-enoic acid,
(2E)-3-(4-{difluoro[4-(5,5,5-trifluoropentyl)phenoxy] methyl}phenyl)prop-2-enoic acid,
(2E)-3-(4-{difluoro[4-(6,6,6-trifluorohexyl)phenoxy] methyl}phenyl)prop-2-enoic acid,
(2E)-3-(4-{difluoro[4-(4-fluorobutyl)phenoxy] methyl}phenyl)prop-2-enoic acid,
(2E)-3-(4-{difluoro[4-(5-fluoropentyl)phenoxy] methyl}phenyl)prop-2-enoic acid,
(2E)-3-(4-{difluoro[4-(6-fluorohexyl)phenoxy] methyl}phenyl)prop-2-enoic acid,
(2E)-3-(4-{difluoro[4-(3-fluoropropoxy)phenoxy] methyl}phenyl)prop-2-enoic acid,
(2E)-3-(4-{difluoro[4-(4-fluorobutoxy)phenoxy] methyl}phenyl)prop-2-enoic acid,
(2E)-3-[4-(difluoro{4-[(5-fluoropentyl)oxy] phenoxy}methyl)phenyl]prop-2-enoic acid,
(2E)-3-[4-(difluoro{4-[(6-fluorohexyl)oxy] phenoxy}methyl)phenyl]prop-2-enoic acid,
(2E)-3-[4-(difluoro{4-[(4,4,5,5,5-pentafluoropentyl)oxy] phenoxy}methyl)phenyl]prop-2-enoic acid,
(2E)-3-[4-(difluoro{4-[2-(2,2,2-trifluoroethoxy)ethoxy] phenoxy}methyl)phenyl]prop-2-enoic acid,
(2E)-3-{4-[[4-(3-cyanopropoxy)phenoxy](difluoro)methyl] phenyl}prop-2-enoic acid,
(2E)-3-{4-[[4-(4-cyanobutoxy)phenoxy](difluoro)methyl] phenyl}prop-2-enoic acid,
(2E)-3-{4-[[4-(5-cyanopentoxy)phenoxy](difluoro)methyl] phenyl}prop-2-enoic acid,
(2E)-3-(4-{difluoro[2-fluoro-4-(4,4,4-trifluorobutoxy)phenoxy]methyl}phenyl)prop-2-enoic acid,
(2E)-3-(4-{difluoro[3-fluoro-4-(4,4,4-trifluorobutoxy)phenoxy]methyl}phenyl)prop-2-enoic acid, (2E)-3-(4-{difluoro[3-methoxy-4-(4,4,4-trifluorobutoxy)phenoxy]methyl}phenyl)prop-2-enoic acid,
(2E)-3-{4-[[4-(3-cyanopropoxy)-2-fluorophenoxy](difluoro)methyl]phenyl}prop-2-enoic acid.

Example 9

9.1 Preparation of 2-(2,4-dinitrophenyl)ethyl (2E)-3-(4-{difluoro[4-(4,4,4-trifluorobutoxy)phenoxy]-ethyl}phenyl)prop-2-enoate 2.50 g (11.8 mmol) of 2-(2,4-dinitrophenyl)ethanol, 4.91 g (11.8 mmol) of (2E)-3-(4-{difluoro[4-(4,4,4-trifluorobutoxy)phenoxy]methyl}phenyl)prop-2-enoic acid, 144 mg (1.2 mmol) of 4-di-methylaminopyridine are dissolved in 30 mL of dichloromethane. 2.48 g (13.0 mmol) of N-(3-dimethylaminopropyl)-N'-ethylcarbodiimide hydrochloride (EDC hydrochloride) are added at 0° C. The solution is stirred for 1 h at 0° C. and allowed to stir at room temperature overnight. After 22 hours at room temperature, the reaction mixture is partitioned between dichloro-methane and water. The organic phase is washed repeatedly with water, dried over sodium sulfate, filtrated and concentrated under reduced pressure. Chromatography of the residue on 200 g silica gel using toluene: ethyl acetate 95:5 as eluent and crystallization from ethyl acetate:hexane mixture yields 5.11 g (71%) of 2-(2,4-dinitrophenyl)ethyl (2E)-3-(4-{difluoro[4-(4,4,4-trifluorobutoxy)phenoxy]methyl}phenyl)prop-2-enoate as yellow crystals.

9.2 Preparation of 2-(2,4-diaminophenyl)ethyl (2E)-3-(4-{difluoro[4-(4,4,4-trifluorobutoxy)phenoxy]methyl}phenyl)prop-2-enoate 5.11 g (8.38 mmol) of 2-(2,4-dinitrophenyl)ethyl (2E)-3-(4-{difluoro[4-(4,4,4-trifluorobutoxy)-phenoxy]methyl}phenyl)prop-2-enoate are dissolved in a mixture of 54 mL of N,N-di-methyl-formamide and 6 mL water. 13.9 g (51.4 mmol) ferric chloride hexahydrate are added. 5.60 g (85.7 mmol) zinc powder is added portion wise within 60 minutes. The mixture is allowed to react for 2 hours. The reaction mixture is partitioned between ethyl acetate and water and filtrated. The organic phase is washed repeatedly with water, dried over sodium sulfate, filtrated and concentrated under reduced pressure. Filtration of the residue on 200 g silica gel using toluene:ethyl acetate 1:3 as eluent and crystallization from ethyl acetate:hexane mixture yields 3.30 g of 2-(2,4-diaminophenyl)ethyl (2E)-3-(4-{difluoro[4-(4,4,4-trifluorobutoxy)phenoxy]methyl}phenyl)prop-2-enoate as yellow crystals.

The following diamines are synthesized in an analogous manner to Example 9
2-(2,4-diaminophenyl)ethyl (2E)-3-(4-{difluoro[4-(2,2,2-trifluoroethoxy)phenoxy]methyl}-phenyl)prop-2-enoate,
2-(2,4-diaminophenyl)ethyl (2E)-3-(4-{difluoro[4-(3,3,3-trifluoropropoxy)phenoxy]methyl}-phenyl)-prop-2-enoate,
2-(2,4-diaminophenyl)ethyl (2E)-3-(4-{difluoro[4-(4,4,4-trifluorobutoxy)phenoxy]-methyl},phenyl)prop-2-enoate,
2-(2,4-diaminophenyl)ethyl (2E)-3-(4-{difluoro[4-((4,4,5,5,5-pentafluoropentyl)oxy)phenoxy]-methyl}phenyl)prop-2-enoate,
2-(2,4-diaminophenyl)ethyl (2E)-3-(4-{difluoro[4-((5,5,5-trifluoropentyl)oxy)phenoxy]-methyl}phenyl)prop-2-enoate,
2-(2,4-diaminophenyl)ethyl (2E)-3-(4-{difluoro[4-((6,6,6-trifluorohexyl)oxy)phenoxy]-methyl}phenyl)prop-2-enoate,
2-(2,4-dinitrophenyl)ethyl (2E)-3-(4-{difluoro[4-(2,2,2-trifluoroethyl)phenoxy]-methyl}phenyl)prop-2-enoate,
2-(2,4-dinitrophenyl)ethyl (2E)-3-(4-{difluoro[4-(3,3,3-trifluoropropyl)phenoxy]-methyl}phenyl)prop-2-enoate,
2-(2,4-diaminophenyl)ethyl (2E)-3-(4-{difluoro[4-(4,4,4-trifluorobutyl)phenoxy]-methyl}phenyl)prop-2-enoate,
2-(2,4-diaminophenyl)ethyl (2E)-3-(4-{difluoro[4-(5,5,5-trifluoropentyl)phenoxy]-methyl}phenyl)prop-2-enoate,
2-(2,4-diaminophenyl)ethyl (2E)-3-(4-{difluoro[4-(6,6,6-trifluorohexyl)phenoxy]-methyl}phenyl)prop-2-enoate,
2-(2,4-diaminophenyl)ethyl (2E)-3-(4-{difluoro[2-fluoro-4-(4,4,4-trifluorobutoxy)phenoxy]-methyl}phenyl)prop-2-enoate,
2-(2,4-diaminophenyl)ethyl (2E)-3-(4-{difluoro[2-fluoro-4-(2,2,2-trifluoroethoxy)phenoxy]-methyl}phenyl)prop-2-enoate,
2-(2,4-diaminophenyl)ethyl (2E)-3-(4-{difluoro[2-fluoro-4-(3,3,3-trifluoropropoxy)phenoxy]-methyl}phenyl)prop-2-enoate,
2-(2,4-diaminophenyl)ethyl (2E)-3-{4-[[4-(3-cyanopropoxy)-2-fluorophenoxy](difluoro)-methyl]phenyl}prop-2-enoate,
2-(2,4-diaminophenyl)ethyl (2E)-3-{4-[[4-(3-cyanopropoxy)phenoxy]-(difluoro)-methyl]phenyl}prop-2-enoate,
2-(2,4-diaminophenyl)ethyl (2E)-3-{4-[(4-butoxy-3-methoxyphenoxy)(difluoro)methyl]-phenyl}prop-2-enoate.

Example 10

10.1 Preparation of 3,5-dinitrobenzyl (2E)-3-(4-{difluoro[4-(4,4,4-trifluorobutoxy)phenoxy]-methyl}phenyl)prop-2-enoate 2.33 g (11.8 mmol) of 3,5-dinitrobenzylalcohol, 4.91 g (11.8 mmol) of (2E)-3-(4-{difluoro[4-(4,4,4-trifluorobutoxy)phenoxy]methyl}phenyl)prop-2-enoic acid, 144 mg (1.2 mmol) of 4-dimethylaminopyridine are dissolved in 30 mL of dichloromethane. 2.48 g (13.0 mmol) of N-(3-dimethylaminopropyl)-N'-ethylcarbodiimide hydrochloride (EDC hydrochloride) are added at 0° C. The solution is stirred for 1 h at 0° C. and allowed to stir at room temperature overnight. After 22 hours at room temperature, the reaction mixture is partitioned between dichloro-methane and water. The organic phase is washed repeatedly with water, dried over sodium sulfate, filtrated and concentrated under reduced pressure. Chromatography of the residue on 200 g silica gel using toluene: ethyl acetate 95:5 as eluent and crystallization from ethyl acetate:hexane mixture yields 6.9 g of 3,5-dinitrobenzyl (2E)-3-(4-{difluoro[4-(4,4,4-trifluorobutoxy)phenoxy]methyl}phenyl)prop-2-enoate as yellow crystals.

10.2 Preparation of 3,5-diaminobenzyl (2E)-3-(4-{difluoro[4-(4,4,4-trifluorobutoxy)phenoxy]methyl}phenyl)prop-2-enoate 4.99 g (8.38 mmol) of 3,5-dinitrobenzyl (2E)-3-(4-{difluoro[4-(4,4,4-trifluorobutoxy)phenoxy]-methyl}-phenyl)prop-2-enoate are dissolved in a mixture of 54 mL of N,N-dimethylformamide and 6 mL water. 13.9 g (51.4 mmol) ferric chloride hexahydrate are added. 5.60 g (85.7 mmol) zinc powder is added portion wise within 60 minutes. The mixture is allowed to react for 2 hours. The reaction mixture is partitioned between ethyl acetate and water and filtrated. The organic phase is washed repeatedly with water, dried over sodium sulfate, filtrated and concentrated under reduced pressure. Filtration of the residue on 200 g silica gel using toluene:ethyl acetate 1:3 as eluent and crystallization from ethyl acetate:hexane mixture yields 3.15 g of 3,5-diaminobenzyl (2E)-3-(4-{difluoro[4-(4,4,4-trifluorobutoxy)phenoxy]-methyl}-phenyl)prop-2-enoate as yellow crystals.

The following diamines are synthesized in an analogous manner to Example 10

3,5-diaminobenzyl (2E)-3-(4-{difluoro[4-(2,2,2-trifluoroethoxy)phenoxy]methyl}phenyl)prop-2-enoate,
3,5-diaminobenzyl (2E)-3-(4-{difluoro[4-(3,3,3-trifluoropropoxy)phenoxy]methyl}phenyl)prop-2-enoate,
3,5-diaminobenzyl (2E)-3-(4-{difluoro[4-(4,4,4-trifluorobutoxy)phenoxy]methyl}phenyl)prop-2-enoate,
3,5-diaminobenzyl (2E)-3-(4-{difluoro[4-((4,4,5,5,5-pentafluoropentyl)oxy)phenoxy]-methyl}phenyl)prop-2-enoate,
3,5-diaminobenzyl (2E)-3-(4-{difluoro[4-((5,5,5-trifluoropentyl)oxy)phenoxy]methyl}phenyl)-prop-2-enoate,
3,5-diaminobenzyl (2E)-3-(4-{difluoro[4-((6,6,6-trifluorohexyl)oxy)phenoxy]methyl}phenyl)-prop-2-enoate,
3,5-diaminobenzyl (2E)-3-(4-{difluoro[4-(2,2,2-trifluoroethyl)phenoxy]methyl}phenyl)prop-2-enoate
3,5-diaminobenzyl (2E)-3-(4-{difluoro[4-(3,3,3-trifluoropropyl)phenoxy]methyl}phenyl)prop-2-enoate,
3,5-diaminobenzyl (2E)-3-(4-{difluoro[4-(4,4,4-trifluorobutyl)phenoxy]methyl}phenyl)prop-2-enoate,
3,5-diaminobenzyl (2E)-3-(4-{difluoro[4-(5,5,5-trifluoropentyl)phenoxy]methyl}phenyl)prop-2-enoate,
3,5-diaminobenzyl (2E)-3-(4-{difluoro[4-(6,6,6-trifluorohexyl)phenoxy]methyl}phenyl)prop-2-enoate,
3,5-diaminobenzyl (2E)-3-(4-{difluoro[2-fluoro-4-(4,4,4-trifluorobutoxy)phenoxy]methyl}-phenyl)-prop-2-enoate,
3,5-diaminobenzyl (2E)-3-(4-{difluoro[2-fluoro-4-(2,2,2-trifluoroethoxy)phenoxy]methyl}-phenyl)prop-2-enoate,
3,5-diaminobenzyl (2E)-3-(4-{difluoro[2-fluoro-4-(3,3,3-trifluoropropoxy)phenoxy]methyl}-phenyl)-prop-2-enoate,
3,5-diaminobenzyl (2E)-3-{4-[[4-(3-cyanopropoxy)-2-fluorophenoxy](difluoro)methyl]-phenyl}prop-2-enoate,
3,5-diaminobenzyl (2E)-3-{4-[[4-(3-cyanopropoxy)phenoxy](difluoro)methyl]phenyl}prop-2-enoate,
3,5-diaminobenzyl (2E)-3-{4-[(4-butoxy-3-methoxyphenoxy)(difluoro)methyl]phenyl}prop-2-enoate.

Example 11

11.1 Preparation of 6-{[(2E)-3-(4-{difluoro[4-(4,4,4-trifluorobutoxy)phenoxy]methyl}phenyl)prop-2-enoyl]oxy}hexyl 3,5-dinitrobenzoate 3.68 g (11.8 mmol) of 6-hydroxyhexyl 3,5-dinitrobenzoate, 4.91 g (11.8 mmol) of (2E)-3-(4-{difluoro[4-(4,4,4-trifluorobutoxy)phenoxy]methyl}phenyl)prop-2-enoic acid, 144 mg (1.2 mmol) of 4-dimethylaminopyridine are dissolved in 30 mL of dichloromethane. 2.48 g (13.0 mmol) of N-(3-dimethylaminopropyl)-N'-ethylcarbodiimide hydrochloride (EDC hydrochloride) are added at 0° C. The solution is stirred for 1 h at 0° C. and allowed to stir at room temperature overnight. After 22 hours at room temperature, the reaction mixture is partitioned between dichloromethane and water. The organic phase is washed repeatedly with water, dried over sodium sulfate, filtrated and concentrated under reduced pressure. Chromatography of the residue on 200 g silica gel using toluene: ethyl acetate 95:5 as eluent and crystallization from ethyl acetate:hexane mixture yields 6.85 g of 6-{[(2E)-3-(4-{difluoro[4-(4,4,4-trifluorobutoxy)-phenoxy]methyl}phenyl)prop-2-enoyl]oxy}hexyl 3,5-dinitrobenzoate as yellow crystals.

11.2 Preparation of 6-{[(2E)-3-(4-{difluoro[4-(4,4,4-trifluorobutoxy)-phenoxy]methyl}-phenyl)prop-2-enoyl]oxy}hexyl 3,5-diaminobenzoate 5.95 g (8.38 mmol) of 6-{[(2E)-3-(4-{difluoro[4-(4,4,4-trifluorobutoxy)phenoxy]methyl}phenyl)-prop-2-enoyl]oxy}hexyl 3,5-dinitrobenzoate are dissolved in a mixture of 54 mL of N,N-di-methylformamide and 6 mL water. 13.9 g (51.4 mmol) ferric chloride hexahydrate are added. 5.60 g (85.7 mmol) zinc powder is added portion wise within 60 minutes. The mixture is allowed to react for 2 hours. The reaction mixture is partitioned between ethyl acetate and water and filtrated. The organic phase is washed repeatedly with water, dried over sodium sulfate, filtrated and concentrated under reduced pressure. Filtration of the residue on 200 g silica gel using toluene:ethyl acetate 1:3 as eluent and crystallization from ethyl acetate:hexane mixture yields 4.53 g of 6-{[(2E)-3-(4-{difluoro[4-(4,4,4-trifluorobutoxy)-phenoxy]-methyl}phenyl)prop-2-enoyl]oxy}hexyl 3,5-diaminobenzoate as yellow crystals.

The following diamines are synthesized in an analogous manner to Example 11

6-{[(2E)-3-(4-{difluoro[4-(2,2,2-trifluoroethoxy)phenoxy]methyl}phenyl)prop-2-enoyl]oxy}hexyl 3,5-dinitrobenzoate,
6-{[(2E)-3-(4-{difluoro[4-(3,3,3-trifluoropropoxy)phenoxy]methyl}phenyl)prop-2-enoyl]oxy}-hexyl 3,5-dinitrobenzoate,
6-{[(2E)-3-(4-{difluoro[4-(4,4,4-trifluorobutoxy)phenoxy]methyl}phenyl)prop-2-enoyl]oxy}hexyl 3,5-dinitrobenzoate,
6-{[(2E)-3-(4-{difluoro[4-((4,4,5,5,5-pentafluoropentyl)oxy)phenoxy]methyl}phenyl)prop-2-enoyl]oxy}hexyl 3,5-dinitrobenzoate,
6-{[(2E)-3-(4-{difluoro[4-((5,5,5-trifluoropentyl)oxy)phenoxy]methyl}phenyl)prop-2-enoate
6-{[(2E)-3-(4-{difluoro[4-((6,6,6-trifluorohexyl)oxy)phenoxy]methyl}phenyl)prop-2-enoyl]-oxy}hexyl-3,5-dinitrobenzoate,
6-{[(2E)-3-(4-{difluoro[4-(2,2,2-trifluoroethyl)phenoxy]methyl}phenyl)prop-2-enoyl]oxy}hexyl 3,5-dinitrobenzoate,
6-{[(2E)-3-(4-{difluoro[4-(3,3,3-trifluoropropyl)phenoxy]methyl}phenyl)prop-2-enoyl]oxy}hexyl 3,5-dinitrobenzoate,
6-{[(2E)-3-(4-{difluoro[4-(4,4,4-trifluorobutyl)phenoxy]methyl}phenyl)prop-2-enoyl]oxy}hexyl 3,5-dinitrobenzoate,
6-{[(2E)-3-(4-{difluoro[4-(5,5,5-trifluoropentyl)phenoxy]methyl}phenyl)prop-2-enoyl]oxy}hexyl 3,5-dinitrobenzoate,
6-{[(2E)-3-(4-{difluoro[4-(6,6,6-trifluorohexyl)phenoxy]methyl}phenyl)prop-2-enoyl]oxy}hexyl 3,5-dinitrobenzoate,
6-{[(2E)-3-(4-{difluoro[2-fluoro-4-(4,4,4-trifluorobutoxy)phenoxy]methyl}phenyl)prop-2-enoyl]oxy}hexyl 3,5-dinitrobenzoate,
6-{[(2E)-3-(4-{difluoro[2-fluoro-4-(2,2,2-trifluoroethoxy)phenoxy]methyl}phenyl)prop-2-enoyl]oxy}hexyl 3,5-dinitrobenzoate
6-{[(2E)-3-(4-{difluoro[2-fluoro-4-(3,3,3-trifluoropropoxy)phenoxy]methyl}phenyl)prop-2-enoyl]oxy}hexyl 3,5-dinitrobenzoate, 6-{[(2E)-3-{4-[[4-(3-cyanopropoxy)-2-fluorophenoxy](difluoro)methyl]phenyl}prop-2-enoyl]oxy}hexyl 3,5-dinitrobenzoate, 6-{[(2E)-3-{4-[[4-(3-cyanopropoxy)phenoxy](difluoro)methyl]phenyl}prop-2-enoyl]oxy}hexyl 3,5-dinitrobenzoate, 6-{[(2E)-3-{4-[(4-butoxy-3-methoxyphenoxy)(difluoro)methyl]phenyl}prop-2-enoyl]oxy}hexyl 3,5-dinitrobenzoate.

Example 12

12.1 Preparation of 2-(2,4-dinitrophenyl)-3-{[(2E)-3-(4-{difluoro[4-(4,4,4-trifluorobutoxy)-phenoxy]methyl}phenyl)prop-2-enoyl]oxy}propyl (2E)-3-(4-{difluoro[4-(4,4,4-trifluoro-butoxy)phenoxy]methyl}phenyl)prop-2-enoate 2.85 g (11.8 mmol) of 2-(2,4-dinitrophenyl)propane-1,3-diol, 9.82 g (23.6 mmol) of (2E)-3-(4-{difluoro[4-(4,4,4-trifluorobutoxy)phenoxy]methyl}phenyl)prop-2-enoic acid, 288 mg (2.4 mmol) of 4-dimethylaminopyridine are dissolved in 30 mL of dichloromethane. 4.96 g (26.0 mmol) of N-(3-dimethylaminopropyl)-N'-ethylcarbodiimide hydrochloride (EDC hydrochloride) are added at 0° C. The solution is stirred for 1 h at 0° C. and allowed to stir at room temperature overnight. After 22 hours at room temperature, the reaction mixture is partitioned between dichloromethane and water. The organic phase is washed repeatedly with water, dried over sodium sulfate, filtrated and concentrated under reduced pressure. Chromatography of the residue on 400 g silica gel using toluene: ethyl acetate 95:5 as eluent and crystallization from ethyl acetate:hexane mixture yields 9.85 g of 2-(2,4-dinitrophenyl)-3-{[(2E)-3-(4-{difluoro[4-(4,4,4-trifluorobutoxy)phenoxy]methyl}phenyl)prop-2-enoyl]oxy}propyl (2E)-3-(4-{difluoro[4-(4,4,4-trifluorobutoxy)phenoxy]methyl}phenyl)prop-2-enoate as yellow crystals.

12.2 Preparation of 2-(2,4-diaminophenyl)-3-{[(2E)-3-(4-{difluoro[4-(4,4,4-trifluorobutoxy)-phenoxy]methyl}Phenyl)prop-2-enoyl]oxy}propyl (2E)-3-(4-{difluoro[4-(4,4,4-trifluoro-butoxy)phenoxy]methyl}phenyl)prop-2-enoate 8.70 g (8.38 mmol) of 2-(2,4-dinitrophenyl)-3-{[(2E)-3-(4-{difluoro[4-(4,4,4-trifluoro-butoxy)phenoxy]methyl}phenyl)prop-2-enoyl]oxy}propyl (2E)-3-(4-{difluoro[4-(4,4,4-tri-fluorobutoxy)phenoxy]methyl}phenyl)prop-2-enoate are dissolved in a mixture of 54 mL of N,N-dimethylformamide and 6 mL water. 13.9 g (51.4 mmol) ferric chloride hexahydrate are added. 5.60 g (85.7 mmol) zinc powder is added portion wise within 60 minutes. The mixture is allowed to react for 2 hours. The reaction mixture is partitioned between ethyl acetate and water and filtrated. The organic phase is washed repeatedly with water, dried over sodium sulfate, filtrated and concentrated under reduced pressure. Filtration of the residue on 400 g silica gel using toluene: ethyl acetate 1:3 as eluent and crystallization from ethyl acetate:hexane mixture yielded 7.32 g of 2-(2,4-diaminophenyl)-3-{[(2E)-3-(4-{difluoro[4-(4,4,4-trifluorobutoxy)phenoxy]methyl}phenyl)prop-2-enoyl]oxy}propyl (2E)-3-(4-{difluoro[4-(4,4,4-trifluorobutoxy)phenoxy]methyl}phenyl)prop-2-enoate as yellow crystals.

The following diamines are synthesized in an analogous manner to Example 12

2-(2,4-diaminophenyl)-3-{[(2E)-3-(4-{difluoro[4-(2,2,2-trifluoroethoxy)phenoxy]-methyl}phenyl)prop-2-enoyl]oxy}propyl (2E)-3-(4-{difluoro[4-(2,2,2-trifluoroethoxy)-phenoxy]methyl}phenyl)prop-2-enoate, 2-(2,4-diaminophenyl)-3-{[(2E)-3-(4-{difluoro[4-(3,3,3-trifluoropropoxy)phenoxy]-methyl}phenyl)prop-2-enoyl]oxy}propyl (2E)-3-(4-{difluoro[4-(3,3,3-trifluoropropoxy)-phenoxy]methyl}phenyl)prop-2-enoate, 2-(2,4-diaminophenyl)-3-{[(2E)-3-(4-{difluoro[4-(4,4,4-trifluorobutoxy)phenoxy]-methyl}phenyl)prop-2-enoyl]oxy}propyl (2E)-3-(4-{difluoro[4-(4,4,4-trifluorobutoxy)-phenoxy]methyl}phenyl)prop-2-enoate, 2-(2,4-diaminophenyl)-3-{[(2E)-3-(4-{difluoro[4-((5,5,5-trifluoropentyl)oxy)phenoxy]-methyl}phenyl)prop-2-enoyl]oxy}propyl (2E)-3-(4-{difluoro[4-((5,5,5-trifluoropentyl)-oxy)phenoxy]methyl}phenyl)prop-2-enoate, 2-(2,4-diaminophenyl)-3-{[(2E)-3-(4-{difluoro[4-((6,6,6-trifluorohexyl)oxy)phenoxy]-methyl}phenyl)prop-2-enoyl]oxy}propyl (2E)-3-(4-{difluoro[4-((6,6,6-trifluorohexyl)-oxy)phenoxy]methyl}phenyl)prop-2-enoate, 2-(2,4-diaminophenyl)-3-{[(2E)-3-(4-{difluoro[4-((4,4,5,5,5-pentafluoropentyl)oxy)-phenoxy]methyl}phenyl)prop-2-enoyl]oxy}propyl (2E)-3-(4-{difluoro[4-((4,4,5,5,5-pentafluoropentyl)oxy)phenoxy]methyl}phenyl)prop-2-enoate, 2-(2,4-diaminophenyl)-3-{[(2E)-3-(4-{difluoro[4-(2,2,2-trifluoroethyl)phenoxy]-methyl}phenyl)prop-2-enoyl]oxy}propyl (2E)-3-(4-{difluoro[4-(2,2,2-trifluoro-ethyl)phenoxy]methyl}phenyl)prop-2-enoate, 2-(2,4-diaminophenyl)-3-{[(2E)-3-(4-{difluoro[4-(3,3,3-trifluoropropyl)-phenoxy]-methyl}phenyl)prop-2-enoyl]oxy}propyl (2E)-3-(4-{difluoro[4-(3,3,3-trifluoro-propyl)phenoxy]methyl}phenyl)prop-2-enoate, 2-(2,4-diaminophenyl)-3-{[(2E)-3-(4-{difluoro[4-(4,4,4-trifluorobutyl)phenoxy]-methyl}phenyl)prop-2-enoyl]oxy}propyl (2E)-3-(4-{difluoro[4-(4,4,4-tri-fluorobutyl)-phenoxy]methyl}phenyl)prop-2-enoate, 2-(2,4-diaminophenyl)-3-{[(2E)-3-(4-{difluoro[4-(5,5,5-trifluoropentyl)phenoxy]methyl}phenyl)-prop-2-enoyl]oxy}propyl (2E)-3-(4-{difluoro[4-(5,5,5-trifluoropentyl)phenoxy]methyl}-phenyl)prop-2-enoate, 2-(2,4-diaminophenyl)-3-{[(2E)-3-(4-{difluoro[4-(6,6,6-trifluorohexyl)phenoxy]methyl}phenyl)-prop-2-enoyl]oxy}propyl (2E)-3-(4-{difluoro[4-(6,6,6-trifluorohexyl)phenoxy]methyl}phenyl)-prop-2-enoate, 2-(2,4-diaminophenyl)-3-{[(2E)-3-(4-{difluoro[2-fluoro-4-(2,2,2-trifluoroethoxy)phenoxy]-methyl}-phenyl)-prop-2-enoyl]oxy}propyl (2E)-3-(4-{difluoro[2-fluoro-4-(2,2,2-trifluoroethoxy)-phenoxy]-methyl}phenyl)prop-2-enoate, 2-(2,4-diaminophenyl)-3-{[(2E)-3-(4-{difluoro[2-fluoro-4-(3,3,3-trifluoropropoxy)phenoxy]-methyl}phenyl)prop-2-enoyl]oxy}propyl (2E)-3-(4-{difluoro[2-fluoro-4-(3,3,3-trifluoropropoxy)-phenoxy]methyl}phenyl)prop-2-enoate, 2-(2,4-diaminophenyl)-3-{[(2E)-3-(4-{difluoro[2-fluoro-4-(4,4,4-trifluorobutoxy)phenoxy]-methyl}phenyl)prop-2-enoyl]oxy}propyl (2E)-3-(4-{difluoro[2-fluoro-4-(4,4,4-trifluorobutoxy)-phenoxy]methyl}phenyl)prop-2-enoate, 2-(2,4-diaminophenyl)-3-{[(2E)-3-(4-{difluoro[2-fluoro-4-((5,5,5-trifluoropentyl)oxy)-phenoxy]methyl}phenyl)prop-2-enoyl]oxy}propyl (2E)-3-(4-{difluoro[2-fluoro-4-((5,5,5-trifluoropentyl)oxy)phenoxy]methyl}phenyl)prop-2-enoate, 2-(2,4-diaminophenyl)-3-{[(2E)-3-(4-{difluoro[2-fluoro-4-((6,6,6-trifluorohexyl)oxy)phenoxy]-methyl}phenyl)prop-2-enoyl]oxy}propyl (2E)-3-(4-{difluoro[2-fluoro-4-((6,6,6-trifluorohexyl)-oxy)phenoxy]methyl}phenyl)prop-2-enoate, 2-(2,4-diaminophenyl)-3-{[[(2E)-3-(4-{difluoro[2-fluoro-4-((4,4,5,5,5-pentafluoropentyl)oxy)-phenoxy]methyl}phenyl)prop-2-enoyl]oxy}propyl (2E)-3-(4-{difluoro[2-fluoro-4-((4,4,5,5,5-pentafluoropentyl)oxy)phenoxy]methyl}phenyl)prop-2-enoate, 3-[((2E)-3-{4-[[4-(3-cyanopropoxy)phenoxy](difluoro)methyl]phenyl}prop-2-enoyl)oxy]-2-(2,4-diaminophenyl)propyl (2E)-3-{4-[[4-(3-cyanopropoxy)phenoxy](difluoro)methyl]phenyl}prop-2-enoate, 3-[((2E)-3-{4-[[2-fluoro-4-(3-cyanopropoxy)phenoxy](difluoro)methyl]phenyl}prop-2-enoyl)oxy]-2-(2,4-diaminophenyl)propyl (2E)-3-{4-[[2-fluoro-4-(3-cyanopropoxy)-phenoxy](difluoro)methyl]phenyl}prop-2-enoate, Example 13

13.1 Preparation of [4,4'-dinitro-2'-({[(2E)-3-(4-{difluoro[4-(4,4,4-trifluorobutoxy)-phenoxy]methyl}phenyl)prop-2-enoyl]oxy}methyl)-1,1'-biphenyl-2-yl]methyl (2E)-3-(4-{difluoro[4-(4,4,4-trifluorobutoxy)phenoxy]methyl}phenyl)prop-2-enoate 3.59 g (11.8 mmol) of 4,4'-Dinitro-1,1'-biphenyl-2,2'-dimethanol, 9.82 g (23.6 mmol) of (2E)-3-(4-{difluoro[4-(4,4,4-trifluorobutoxy)phenoxy]methyl}phenyl)prop-2-enoic acid, 288 mg (2.4 mmol) of 4-dimethylaminopyridine are dissolved in 30 mL of dichloromethane. 4.96 g (26.0 mmol) of N-(3-dimethylaminopropyl)-N'-ethylcarbodiimide hydrochloride (EDC hydrochloride) are added at 0° C. The solution is stirred for 1 h at 0° C. and allowed to stir at room temperature overnight. After 22 hours at room temperature, the reaction mixture is partitioned between dichloromethane and water. The organic phase is washed repeatedly with water, dried over sodium sulfate, filtrated and concentrated under reduced pressure. Chromatography of the residue on 400 g silica gel using toluene: ethyl acetate 95:5 as eluent and crystallization from ethyl acetate:hexane mixture yields 10.21 g of [4,4'-dinitro-2'-({[(2E)-3-(4-{difluoro[4-(4,4,4-trifluorobutoxy)phenoxy]methyl}phenyl)prop-2-enoyl]oxy}methyl)-1,1'-biphenyl-2-yl]methyl (2E)-3-(4-{difluoro[4-(4,4,4-trifluorobutoxy)phenoxy]methyl}phenyl)prop-2-enoate as yellow crystals.

13.2 Preparation of [4,4'-diamino-2'-({[(2E)-3-(4-{difluoro[4-(4,4,4-trifluorobutoxy)phenoxy]methyl}phenyl)prop-2-enoyl]oxy}methyl)-1,1'-biphenyl-2-yl]methyl (2E)-3-(4-{difluoro[4-(4,4,4-trifluorobutoxy)phenoxy]methyl}phenyl)prop-2-enoate 9.22 g (8.38 mmol) of [4,4'-dinitro-2'-({[(2E)-3-(4-{difluoro[4-(4,4,4-trifluorobutoxy)-phenoxy]-methyl}phenyl)prop-2-enoyl]oxy}methyl)-1,1'-biphenyl-2-yl]methyl (2E)-3-(4-{difluoro[4-(4,4,4-trifluorobutoxy)phenoxy]methyl}phenyl)prop-2-enoate are dissolved in a mixture of 54 mL of N,N-dimethylformamide and 6 mL water. 13.9 g (51.4 mmol) ferric chloride hexahydrate are added. 5.60 g (85.7 mmol) zinc powder is added portion wise within 60 minutes. The mixture is allowed to react for 2 hours. The reaction mixture is partitioned between ethyl acetate and water and filtrated. The organic phase is washed repeatedly with water, dried over sodium sulfate, filtrated and concentrated under reduced pressure. Filtration of the residue on 400 g silica gel using toluene:ethyl acetate 1:3 as eluent and crystallization from ethyl acetate:hexane mixture yielded 7.59 g of [4,4'-diamino-2'-({[(2E)-3-(4-{difluoro[4-(4,4,4-trifluorobutoxy)phenoxy]methyl}phenyl)prop-2-enoyl]oxy}methyl)-1,1'-biphenyl-2-yl]methyl (2E)-3-(4-{difluoro[4-(4,4,4-trifluorobutoxy)phenoxy]methyl}phenyl)prop-2-enoate as yellow crystals.

The following diamines are synthesized in an analogous manner to Example 13

[4,4'-diamino-2'-({[(2E)-3-(4-{difluoro[4-(2,2,2-trifluoroethoxy)phenoxy]methyl}phenyl)prop-2-enoyl]oxy}methyl)-1,1'-biphenyl-2-yl]methyl (2E)-3-(4-{difluoro[4-(2,2,2-trifluoroethoxy)-phenoxy]methyl}phenyl)prop-2-enoate,

[4,4'-diamino-2'-({[(2E)-3-(4-{difluoro[4-(3,3,3-trifluoropropoxy)phenoxy]methyl}phenyl)prop-2-enoyl]oxy}methyl)-1,1'-biphenyl-2-yl]methyl (2E)-3-(4-{difluoro[4-(3,3,3-trifluoropropoxy)-phenoxy]methyl}phenyl)prop-2-enoate,

[4,4'-diamino-2'-({[(2E)-3-(4-{difluoro[4-(4,4,4-trifluorobutoxy)phenoxy]methyl}phenyl)prop-2-enoyl]oxy}methyl)-1,1'-biphenyl-2-yl]methyl (2E)-3-(4-{difluoro[4-(4,4,4-trifluorobutoxy)-phenoxy]-methyl}phenyl)prop-2-enoate,

[4,4'-diamino-2'-({[(2E)-3-(4-{difluoro[4-((5,5,5-trifluoropentyl)oxy)phenoxy]methyl}phenyl)-prop-2-enoyl]oxy}methyl)-1,1'-biphenyl-2-yl]methyl (2E)-3-(4-{difluoro[4-((5,5,5-trifluoro-pentyl)-oxy)phenoxy]methyl}phenyl)prop-2-enoate,

[4,4'-diamino-2'-({[(2E)-3-(4-{difluoro[4-((6,6,6-trifluorohexyl)oxy)phenoxy]methyl}phenyl)prop-2-enoyl]oxy}methyl)-1,1'-biphenyl-2-yl]methyl (2E)-3-(4-{difluoro[4-((6,6,6-trifluorohexyl)-oxy)phenoxy]methyl}phenyl)prop-2-enoate,

[4,4'-diamino-2'-({[(2E)-3-(4-{difluoro[4-(2,2,2-trifluoroethyl)phenoxy]methyl}phenyl)prop-2-enoyl]oxy}methyl)-1,1'-biphenyl-2-yl]methyl (2E)-3-(4-{difluoro[4-(2,2,2-trifluoroethyl)-phenoxy]methyl}phenyl)prop-2-enoate,

[4,4'-diamino-2'-({[(2E)-3-(4-{difluoro[4-(3,3,3-trifluoropropyl)phenoxy]methyl}phenyl)prop-2-enoyl]oxy}methyl)-1,1'-biphenyl-2-yl]methyl (2E)-3-(4-{difluoro[4-(3,3,3-trifluoropropyl)-phenoxy]methyl}phenyl)prop-2-enoate,

[4,4'-diamino-2'-({[(2E)-3-(4-{difluoro[4-(4,4,4-trifluorobutyl)phenoxy]methyl}phenyl)prop-2-enoyl]oxy}methyl)-1,1'-biphenyl-2-yl]methyl (2E)-3-(4-{difluoro[4-(4,4,4-trifluorobutyl)-phenoxy]methyl}phenyl)prop-2-enoate,

[4,4'-diamino-2'-({[(2E)-3-(4-{difluoro[4-(5,5,5-trifluoropentyl)phenoxy]methyl}phenyl)prop-2-enoyl]oxy}methyl)-1,1'-biphenyl-2-yl]methyl (2E)-3-(4-{difluoro[4-(5,5,5-trifluoropentyl)-phenoxy]methyl}phenyl)prop-2-enoate,

[4,4'-diamino-2'-({[(2E)-3-(4-{difluoro[4-(6,6,6-trifluorohexyl)phenoxy]methyl}phenyl)prop-2-enoyl]oxy}methyl)-1,1'-biphenyl-2-yl]methyl (2E)-3-(4-{difluoro[4-(6,6,6-trifluorohexyl)-phenoxy]methyl}phenyl)prop-2-enoate,

[4,4'-diamino-2'-({[(2E)-3-(4-{difluoro[4-((4,4,5,5,5-pentafluoropentyl)oxy)phenoxy]-methyl}phenyl)-prop-2-enoyl]oxy}methyl)-1,1'-biphenyl-2-yl]methyl (2E)-3-(4-{difluoro[4-((4,4,5,5,5-pentafluoropentyl)oxy)phenoxy]methyl}phenyl)prop-2-enoate,

[4,4'-diamino-2'-({[(2E)-3-(4-{difluoro[2-fluoro-4-(2,2,2-trifluoroethoxy)phenoxy]methyl}-phenyl)-prop-2-enoyl]oxy}methyl)-1,1'-biphenyl-2-yl]methyl (2E)-3-(4-{difluoro[2-fluoro-4-(2,2,2-trifluoroethoxy)phenoxy]methyl}phenyl)prop-2-enoate,

[4,4'-diamino-2'-({[(2E)-3-(4-{difluoro[2-fluoro-4-(3,3,3-trifluoropropoxy)phenoxy]methyl}-phenyl)-prop-2-enoyl]

oxy}methyl)-1,1'-biphenyl-2-yl]methyl (2E)-3-(4-{difluoro[2-fluoro-4-(3,3,3-trifluoropropoxy)phenoxy]methyl}phenyl)prop-2-enoate,

[4,4'-diamino-2'-({[(2E)-3-(4-{difluoro[2-fluoro-4-(4,4,4-trifluorobutoxy)phenoxy]methyl}-phenyl)-prop-2-enoyl]oxy}methyl)-1,1'-biphenyl-2-yl]methyl (2E)-3-(4-{difluoro[2-fluoro-4-(4,4,4-trifluorobutoxy)phenoxy]methyl}phenyl)prop-2-enoate,

[4,4'-diamino-2'-({[(2E)-3-(4-{difluoro[2-fluoro-4-((5,5,5-trifluoropentyl)oxy)phenoxy]methyl}-phenyl)prop-2-enoyl]oxy}methyl)-1,1'-biphenyl-2-yl]methyl (2E)-3-(4-{difluoro[2-fluoro-4-((5,5,5-trifluoropentyl)oxy)phenoxy]methyl}phenyl)prop-2-enoate,

[4,4'-diamino-2'-({[(2E)-3-(4-{difluoro[2-fluoro-4-((6,6,6-trifluorohexyl)oxy)phenoxy]methyl}-phenyl)-prop-2-enoyl]oxy}methyl)-1,1'-biphenyl-2-yl]methyl (2E)-3-(4-{difluoro[2-fluoro-4-((6,6,6-trifluorohexyl)oxy)phenoxy]methyl}phenyl)prop-2-enoate,

[4,4'-diamino-2'-({[(2E)-3-(4-{difluoro[4-(3-cyanopropoxy)phenoxy]methyl}phenyl)prop-2-enoyl]oxy}methyl)-1,1'-biphenyl-2-yl]methyl (2E)-3-(4-{difluoro[4-(3-cyanopropoxy)-phenoxy]methyl}phenyl)prop-2-enoate, Example 14

14.1 Preparation of 2,2-bis(4-nitrobenzyl)-3-{[(2E)-3-(4-{difluoro[4-(4,4,4-trifluorobutoxy)phenoxy]methyl}phenyl)prop-2-enoyl]oxy}propyl (2E)-3-(4-{difluoro[4-(4,4,4-trifluorobutoxy)phenoxy]methyl}phenyl)prop-2-enoate 4.08 g (11.8 mmol) of 2,2-bis(4-nitrobenzyl)-1,3-propandiol, 9.82 g (23.6 mmol) of (2E)-3-(4-{difluoro[4-(4,4,4-trifluorobutoxy)phenoxy]methyl}phenyl)prop-2-enoic acid, 288 mg (2.4 mmol) of 4-dimethylaminopyridine are dissolved in 30 mL of dichloromethane. 4.96 g (26.0 mmol) of N-(3-dimethylaminopropyl)-N'-ethylcarbodiimide hydrochloride (EDC hydrochloride) are added at 0° C. The solution is stirred for 1 h at 0° C. and allowed to stir at room temperature overnight. After 22 hours at room temperature, the reaction mixture is partitioned between dichloromethane and water. The organic phase is washed repeatedly with water, dried over sodium sulfate, filtrated and concentrated under reduced pressure. Chromatography of the residue on 400 g silica gel using toluene: ethyl acetate 95:5 as eluent and crystallization from ethyl acetate:hexane mixture yields 11.47 g of 2,2-bis(4-nitrobenzyl)-3-{[(2E)-3-(4-{difluoro[4-(4,4,4-trifluorobutoxy)phenoxy]methyl}phenyl)prop-2-enoyl]oxy}propyl (2E)-3-(4-{difluoro[4-(4,4,4-trifluorobutoxy)phenoxy]methyl}phenyl)prop-2-enoate as yellow crystals.

14.2 Preparation of 2,2-bis(4-aminobenzyl)-3-{[(2E)-3-(4-{difluoro[4-(4,4,4-trifluorobutoxy)phenoxy]methyl}phenyl)prop-2-enoyl]oxy}propyl (2E)-3-(4-{difluoro[4-(4,4,4-trifluorobutoxy)phenoxy]methyl}phenyl)prop-2-enoate 9.57 g (8.38 mmol) of 2,2-bis(4-nitrobenzyl)-3-{[(2E)-3-(4-{difluoro[4-(4,4,4-trifluorobutoxy)phenoxy]methyl}phenyl)prop-2-enoyl]oxy}propyl (2E)-3-(4-{difluoro[4-(4,4,4-trifluorobutoxy)phenoxy]methyl}phenyl)prop-2-enoate are dissolved in a mixture of 54 mL of N,N-dimethylformamide and 6 mL water. 13.9 g (51.4 mmol) ferric chloride hexahydrate are added. 5.60 g (85.7 mmol) zinc powder is added portion wise within 60 minutes. The mixture is allowed to react for 2 hours. The reaction mixture is partitioned between ethyl acetate and water and filtrated. The organic phase is washed repeatedly with water, dried over sodium sulfate, filtrated and concentrated under reduced pressure. Filtration of the residue on 400 g silica gel using toluene: ethyl acetate 1:3 as eluent and crystallization from ethyl acetate:hexane mixture yields 7.93 g of 2,2-bis(4-aminobenzyl)-3-{[(2E)-3-(4-{difluoro[4-(4,4,4-trifluorobutoxy)phenoxy]methyl}phenyl)prop-2-enoyl]oxy}propyl (2E)-3-(4-{difluoro[4-(4,4,4-trifluorobutoxy)phenoxy]methyl}phenyl)prop-2-enoate as yellow crystals.

The following diamines are synthesized in an analogous manner to Example 14

2,2-bis(4-aminobenzyl)-3-{[(2E)-3-(4-{difluoro[4-(2,2,2-trifluoroethoxy)phenoxy]-methyl}-phenyl)-prop-2-enoyl]oxy}propyl (2E)-3-(4-{difluoro[4-(2,2,2-trifluoroethoxy)-phenoxy]methyl}-phenyl)prop-2-enoate, 2,2-bis(4-aminobenzyl)-3-{[(2E)-3-(4-{difluoro[4-(3,3,3-trifluoropropoxy)phenoxy]methyl}-phenyl)-prop-2-enoyl]oxy}propyl (2E)-3-(4-{difluoro[4-(3,3,3-trifluoropropoxy)phenoxy]-methyl}phenyl)prop-2-enoate, 2,2-bis(4-aminobenzyl)-3-{[(2E)-3-(4-{difluoro[4-(4,4,4-trifluorobutoxy)phenoxy]methyl}-phenyl)prop-2-enoyl]oxy}propyl (2E)-3-(4-{difluoro[4-(4,4,4-trifluorobutoxy)phenoxy]-methyl}phenyl)prop-2-enoate, 2,2-bis(4-aminobenzyl)-3-{[(2E)-3-(4-{difluoro[4-((5,5,5-trifluoropentyl)oxy)phenoxy]methyl}-phenyl)prop-2-enoyl]oxy}propyl (2E)-3-(4-{difluoro[4-((5,5,5-trifluoropentyl)oxy)phenoxy]-methyl}phenyl)prop-2-enoate, 2,2-bis(4-aminobenzyl)-3-{[(2E)-3-(4-{difluoro[4-((6,6,6-trifluorohexyl)oxy)phenoxy]methyl}phenyl)prop-2-enoyl]oxy}propyl (2E)-3-(4-{difluoro[4-((6,6,6-trifluorohexyl)oxy)phenoxy]methyl}phenyl)prop-2-enoate 2,2-bis(4-aminobenzyl)-3-{[(2E)-3-(4-{difluoro[4-((4,4,5,5,5-pentafluoropentyl)oxy)phenoxy]-methyl}-phenyl)prop-2-enoyl]oxy}propyl (2E)-3-(4-{difluoro[4-((4,4,5,5,5-pentafluoropentyl)-oxy)-phenoxy]methyl}phenyl)prop-2-enoate, 2,2-bis(4-aminobenzyl)-3-{[(2E)-3-(4-{difluoro[4-(2,2,2-trifluoroethyl)phenoxy]methyl}phenyl)-prop-2-enoyl]oxy}propyl (2E)-3-(4-{difluoro[4-(2,2,2-trifluoroethyl)phenoxy]-methyl}phenyl)prop-2-enoate, 2,2-bis(4-aminobenzyl)-3-{[(2E)-3-(4-{difluoro[4-(3,3,3-trifluoropropyl)phenoxy]-methyl}phenyl)prop-2-enoyl]oxy}propyl (2E)-3-(4-{difluoro[4-(3,3,3-trifluoropropyl)-phenoxy]methyl}phenyl)prop-2-enoate, 2,2-bis(4-aminobenzyl)-3-{[(2E)-3-(4-{difluoro[4-(4,4,4-trifluorobutyl)phenoxy]methyl}-phenyl)-prop-2-enoyl]oxy}propyl (2E)-3-(4-{difluoro[4-(4,4,4-trifluorobutyl)phenoxy]methyl}-phenyl)prop-2-enoate, 2,2-bis(4-aminobenzyl)-3-{[(2E)-3-(4-{difluoro[4-(5,5,5-trifluoropentyl)phenoxy]-methyl}phenyl)-prop-2-enoyl]oxy}propyl (2E)-3-(4-{difluoro[4-(5,5,5-trifluoropentyl)-phenoxy]methyl}phenyl)prop-2-enoate, 2,2-bis(4-aminobenzyl)-3-{[(2E)-3-(4-{difluoro[4-(6,6,6-trifluorohexyl)phenoxy]-methyl}phenyl)prop-2-enoyl]oxy}propyl (2E)-3-(4-{difluoro[4-(6,6,6-trifluorohexyl)-phenoxy]methyl}phenyl)prop-2-enoate, 2,2-bis(4-aminobenzyl)-3-{[(2E)-3-(4-{difluoro[2-fluoro-4-(2,2,2-trifluoroethoxy)phenoxy]-methyl}phenyl)prop-2-enoyl]oxy}propyl (2E)-3-(4-{difluoro[2-fluoro-4-(2,2,2-trifluoroethoxy)-phenoxy]methyl}phenyl)prop-2-enoate, 2,2-bis(4-aminobenzyl)-3-{[(2E)-3-(4-{difluoro[2-fluoro-4-(3,3,3-trifluoropropoxy)phenoxy]-methyl}phenyl)prop-2-enoyl]oxy}propyl (2E)-3-(4-{difluoro[2-fluoro-4-(3,3,3-trifluoropropoxy)-phenoxy]methyl}phenyl)prop-2-enoate, 2,2-bis(4-aminobenzyl)-3-{[(2E)-3-(4-{difluoro[2-fluoro-4-(4,4,4-trifluorobutoxy)phenoxy]-methyl}phenyl)prop-2-enoyl]oxy}propyl (2E)-3-(4-{difluoro[2-fluoro-4-(4,4,4-trifluorobutoxy)-phenoxy]methyl}phenyl)prop-2-enoate, 2,2-bis(4-aminobenzyl)-3-{[(2E)-3-(4-{difluoro[4-(2,2,2-trifluoroethoxy)phenoxy]methyl}-phenyl)prop-2-enoyl]oxy}propyl (2E)-3-(4-{difluoro[4-(2,2,2-trifluoroethoxy)-phenoxy]methyl}phenyl)prop-2-enoate, 2,2-bis(4-aminobenzyl)-3-{[(2E)-3-(4-{difluoro[4-(3-cyanopropoxy)phenoxy]methyl}-phenyl)prop-2-enoyl]oxy}propyl (2E)-3-(4-{difluoro[4-(3-cyanopropoxy)phenoxy]-methyl}phenyl)prop-2-enoate,

Example 15

Polymerisation Step A (Formation of Polyamic Acid)

0.820 g (3.66 mmol) of 2,3,5-tricarboxycyclopentylacetic-1,2:3,4-dianhydride is added to a solution of 2.014 g (3.66 mmol) of 2-(2,4-diaminophenyl)ethyl (2E)-3-(4-{difluoro[4-(4,4,4-trifluorobutoxy)phenyl]methoxy}phenyl)prop-2-enoate in 6.56 mL of NMP. Stirring is then carried out at 0° C. for 2 hours. The mixture is subsequently allowed to react for 21 hours at room temperature. The polymer mixture is diluted with 18 mL of THF, precipitated into 800 mL of water to yield, after drying at room temperature under vacuum, 2.76 g of polyamic acid 1 in the form of a white powder: [η]=0.21 dL/g $^1$H NMR DMSO d$_6$ 300 MHz:

12.38 (br, 2H), 10.06 (m, 1H), 9.46 (m, 1H), 7.75-7.05 (m, 12H), 6.60 (d, 1H), 4.25 (br, 2H), 4.08 (t, 2H), 3.43-2.49 (m, 10H), 2.42 (m, 2H), 1.92 (m, 2H).

Example 15'

Further polyamic acids are synthesized in Example 15', which synthesis are identical to them of Example 15 with the exception that 2,3,5-tricarboxycyclopentylacetic-1,2:3,4-dianhydride is replaced by an anhydride of the below given list:

1,1,4,4-butanetetracarboxylic acid dianhydride,
ethylenemaleic acid dianhydride,
1,2,3,4-cyclobutanetetracarboxylic acid dianhydride,
1,2,3,4-cyclopentanetetracarboxylic acid dianhydride;
tetrahydro-4,8-methanofuro[3,4-d]oxepine-1,3,5,7-tetrone, 3-(carboxymethyl)-1,2,4-cyclopentanetricarboxylic acid 1,4:2,3-dianhydride,
hexahydrofuro[3',4':4,5]cyclopenta[1,2-c]pyran-1,3,4,6-tetrone, 3,5,6-tricarboxy-norbornylacetic acid dianhydride, 2,3,4,5-tetrahydrofurantetracarboxylic acid dianhydride,
rel-[1S,5R,6R]-3-oxabicyclo[3.2.1]octane-2,4-dione-6-spiro-3'-(tetrahydrofuran2',5'-dione),
4-(2,5-dioxotetrahydrofuran-3-yl)tetrahydronaphthalene-1,2-dicarboxylicacid dianhydride,
5-(2,5-dioxotetrahydro-furan-3-yl)-3-methyl-3-cyclohexene-1,2-dicarboxylic-acid dianhydride,
bicyclo[2.2.2]oct-7-ene-2,3,5,6-tetracarboxylic acid dianhydride,
bicyclo[2.2.2]octane-2,3,5,6-tetracarboxylic acid dianhydride,
1,8-dimethylbicyclo[2.2.2]oct-7-ene-2,3,5,6-tetracarboxylic acid dianhydride,
pyromellitic acid dianhydride, 3,3',4,4'-benzophenonetetracarboxylic acid dianhydride,
4,4'-oxydiphthalic acid dianhydride, 3,3',4,4'-diphenylsulfonetetracarboxylic acid dianhydride,
1,4,5,8-naphthalenetetracarboxylic acid dianhydride, 2,3,6,7-naphthalenetetracarboxylic acid dianhydride,
3,3',4,4'-dimethyldiphenylsilanetetracarboxylic acid dianhydride,
3,3',4,4'-tetraphenylsilanetetracarboxylic acid dianhydride,
1,2,3,4-furantetracarboxylic acid dianhydride,
4,4'-bis(3,4-dicarboxyphenoxy)diphenyl sulfide dianhydride,
4,4'-bis(3,4-dicarboxyphenoxy)-diphenyl sulfone dianhydride,
4,4'-bis(3,4-dicarboxyphenoxy)diphenylpropane dianhydride,
3,3',4,4'-biphenyltetracarboxylic acid dianhydride,
ethylene glycol bis(trimellitic acid) dianhydride,
4,4'-(1,4-phenylene)bis(phthalic acid) dianhydride,
4,4'-(1,3-phenylene)bis(phthalic acid) dianhydride,
4,4'-(hexafluoroisopropylidene)diphthalic acid dianhydride,
4-tert-butyl-6-(2,5-dioxotetrahydro-3-furanyl)-2-benzofuran-1,3-dione,
(2,5-dioxotetrahydro-3-furanyl)-3a,4,5,9b-tetrahydronaphtho[1,2-c]furan-1,3-dione, -5-(2,5-dioxotetrahydro-3-furanyl)-5-methyl-3a,4,5,9b-tetrahydronaphtho[1,2-c]furan-1,3-dione,
5-(2,5-dioxotetrahydro-3-furanyl)-6-methylhexahydro-2-benzofuran-1,3-dione,
5-(2,5-dioxotetrahydro-3-furanyl)-7-methyl-3a,4,5,7a-tetrahydro-2-benzofuran-1,3-dione,
6-(2,5-dioxotetrahydro-3-furanyl)-4-methylhexahydro-2-benzofuran-1,3-dione,
9-isopropyloctahydro-4,8-ethenofuro[3',4':3,4]cyclobuta[1,2-f][2]benzofuran-1,3,5,7-tetrone,
1,2,5,6-cyclooctanetetracarboxylic acid dianhydride,
octahydro-4,8-ethenofuro[3',4':3,4]cyclobuta[1,2-f][2]benzofuran-1,3,5,7-tetrone,
octahydrofuro[3',4':3,4]cyclobuta[1,2-f][2]benzofuran-1,3,5,7-tetrone,
tetrahydro-3,3'-bifuran-2,2',5,5'-tetrone,
4,4'-oxydi(1,4-phenylene)bis(phthalic acid) dianhydride, and
4,4'-methylenedi(1,4-phenylene)bis(phthalic acid) dianhydride-

Example 16

6.000 g (30.26 mmol) of 4-(4-aminobenzyl)phenylamine, 4-[2-(4-aminophenyl)ethyl]phenyl-amine is solubilised in 71 mL of NMP. The mixture is cooled to 0° C. for 10 minutes. 6.648 g (29.66 mmol) of 2,3,5-tricarboxycyclopentylacetic-1,2:3,4-dianhydride is added to the solution. The mixture is stirred at 0° C. for two hours and then at RT for 3 hours. The reaction gives the polyamic acid 2.

Example 16'

6.000 g 4-[2-(4-aminophenyl)ethyl]phenyl-amine is solubilised in 71 mL of NMP. The mixture is cooled to 0° C. for 10 minutes. 6.648 g (29.66 mmol) of 2,3,5-tricarboxycyclopentylacetic-1,2:3,4-dianhydride is added to the solution. The mixture is stirred at 0° C. for two hours and then at RT for 3 hours. The reaction gives the polyamic acid 2'.

Example 16"

6.000 g 4-[2-(4-aminophenyl)ethyl]phenyl-amine is solubilised in 71 mL of NMP. The mixture is cooled to 0° C. for 10 minutes. 6.54bicyclo[2.2.2]octane-2,3,5,6-tetracarboxylic acid-dianhydride of is added to the solution. The mixture is stirred at 0° C. for two hours and then at RT for 3 hours. The reaction gives the polyamic acid 2".
bicyclo[2.2.2]octane-2,3,5,6-tetracarboxylic acid dianhydride,

Example 16a

Analogous to Example 16, 4-(4-aminobenzyl)phenylamine is used for the preparation of polyamic acid with 1,2,3,4-cyclobutantetracarboxylic acid dianhydride: The reaction gives the polyamic acid 2a having a viscosity of 0.52 dL/g.

Example 17

Analogous to Example 15 the following diamines are used for the preparation of polyamic Acid with 2,3,5-tricarboxy-cyclopentylacetic-1,2:3,4-dianhydride:
3,5-diaminobenzyl (2E)-3-(4-{difluoro[4-(4,4,4-trifluorobutoxy)phenyl]methoxy}phenyl)prop-2-enoate yield polyamic acid 3 as white powder; [η]=0.29 dL/g;
6-[((2E)-3-(4-{difluoro[4-(4,4,4-trifluorobutoxy)phenyl]methoxy}phenyl)prop-2-enoyl)oxy]hexyl 3,5-diaminobenzoate yield polyamic acid 4 as white powder; [η]=0.35 dL/g;
2-(2,4-diaminophenyl)-3-{[(2E)-3-(4-{difluoro[4-(4,4,4-trifluorobutoxy)-phenyl]methoxy}phenyl)prop-2-enoyl]oxy}propyl (2E)-3-(4-{difluoro[4-(4,4,4-trifluorobutoxy)phenyl]methoxy}phenyl)prop-2-enoate yield polyamic acid 5 as white powder; [η]=0.19 dL/g;
[4,4'-diamino-2'-({[(2E)-3-(4-{difluoro[4-(4,4,4-trifluorobutoxy)phenyl]methoxy}phenyl)prop-2-enoyl]oxy}methyl)-1,1'-biphenyl-2-yl]methyl (2E)-3-(4-{difluoro[4-(4,4,4-trifluorobutoxy)-phenyl]methoxy}phenyl)prop-2-enoate yield polyamic acid 6 as white powder; [η]=0.40 dL/g; $^1$H NMR DMSO d$_6$ 300 MHz: 12.38 (br, 2H), 10.20 (br, 2H), 7.97-7.57 (m, 14H), 7.32-7.03 (m, 10H) 6.55 (d, 2H), 4.90 (s, 4H), 4.06 (t, 2H), 3.43-2.49 (m, 8H), 2.42 (m, 4H), 1.92 (m, 4H);
2,2-bis(4-aminobenzyl)-3-{[(2E)-3-(4-{difluoro[4-(4,4,4-trifluorobutoxy)-phenyl]methoxy}-phenyl)-prop-2-enoyl]oxy}propyl (2E)-3-(4-{difluoro[4-(4,4,4-trifluorobutoxy-)phenyl]methoxy}-phenyl)prop-2-enoate yield polyamic acid 7 as white powder; [η]=0.52 dL/g;
2-(2,4-diaminophenyl)ethyl (2E)-3-(4-{difluoro[4-(4,4,4-trifluorobutoxy)-phenoxy]methyl}-phenyl)-prop-2-enoate yield polyamic acid 8 as white powder; [η]=0.23 dL/g; 3,5-diaminobenzyl (2E)-3-(4-{difluoro[4-(4,4,4-trifluorobutoxy)phenoxy]methyl}phenyl)-prop-2enoate yield polyamic acid 9 as white powder; [η]=0.28 dL/g;
6-{[(2E)-3-(4-{difluoro[4-(4,4,4-trifluorobutoxy)phenoxy]methyl}phenyl)prop-2-enoyl]oxy}hexyl 3,5-diaminobenzoate yield polyamic acid 10 as white powder; [η]=0.32 dL/g;
2-(2,4-diaminophenyl)-3-{[(2E)-3-(4-{difluoro[4-(4,4,4-trifluorobutoxy)phenoxy]methyl}-phenyl)prop-2-enoyl]oxy}propyl (2E)-3-(4-{difluoro[4-(4,4,4-trifluorobutoxy)-phenoxy]-methyl}phenyl)prop-2-enoate yield polyamic acid 11 as white powder; [η]=0.17 dL/g;
[4,4'-diamino-2'-({[(2E)-3-(4-{difluoro[4-(4,4,4-trifluorobutoxy)phenoxy]methyl}phenyl)prop-2-enoyl]oxy}methyl)-1,1'-biphenyl-2-yl]methyl (2E)-3-(4-{difluoro[4-(4,4,4-trifluorobutoxy)-phenoxy]methyl}phenyl)prop-2-enoate yield "polyamic acid 12 as white powder; [η]=0.42 dL/g;
2,2-bis(4-aminobenzyl)-3-{[(2E)-3-(4-{difluoro[4-(4,4,4-trifluorobutoxy)phenoxy]-methyl}phenyl)prop-2-enoyl]oxy}propyl (2E)-3-(4-{difluoro[4-(4,4,4-trifluorobutoxy)-phenoxy]methyl}phenyl)prop-2-enoate yield polyamic acid 13 as white powder; [η]=0.49 dL/g;

Example 18

Analogous to Example 15 the following diamines are used for the preparation of polyamic acid with 1,2,3,4-cyclobutantetracarboxylic acid dianhydride:
2-(2,4-diaminophenyl)ethyl (2E)-3-(4-{difluoro[4-(4,4,4-trifluorobutoxy)phenyl]methoxy}-phenyl)prop-2-enoate yield polyamic acid 14 as white powder; [η]=0.35 dL/g;
3,5-diaminobenzyl (2E)-3-(4-{difluoro[4-(4,4,4-trifluorobutoxy)phenyl]methoxy}phenyl)prop-2-enoate yield polyamic acid 15 as white powder, [η]=0.38 dL/g, $^1$H NMR DMSO d$_6$ 300 MHz: 12.52 (s, 2H), 10.25 (s, 2H), 8.03 (m, 1H), 7.82-7.64 (m, 5H), 7.32 (m, 4H), 7.08 (d, 2H) 6.71 (d, 1H), 5.16 (s, 2H), 4.10 (t, 2H), 3.85 (br, 1H), 3.68 (m, 3H) 2.42 (m, 2H), 1.92 (m, 2H);
6-[((2E)-3-(4-{difluoro[4-(4,4,4-trifluorobutoxy)phenyl]methoxy}phenyl)prop-2-enoyl)oxy]hexyl 3,5-diaminobenzoate yield polyamic acid 16 as white powder; [η]=0.39 dL/g,
2-(2,4-diaminophenyl)-3-{[(2E)-3-(4-{difluoro[4-(4,4,4-trifluorobutoxy)phenyl]methoxy}-phenyl)prop-2-enoyl]oxy}propyl (2E)-3-(4-{difluoro[4-(4,4,4-trifluorobutoxy)-phenyl]methoxy}-phenyl)prop-2-enoate yield polyamic acid 17 as white powder; [η]=0.25 dL/g,
[4,4'-diamino-2'-({[(2E)-3-(4-{difluoro[4-(4,4,4-trifluorobutoxy)phenyl]methoxy}phenyl)prop-2-enoyl]oxy}methyl)-1,1'-biphenyl-2-yl]methyl (2E)-3-(4-{difluoro[4-(4,4,4-trifluorobutoxy)-phenyl]methoxy}phenyl)prop-2-enoate yield polyamic acid 18 as white powder; [η]=0.46 dL/g, $^1$H NMR DMSO d$_6$ 300 MHz: 12.49 (br, 2H), 10.34 (br, 2H), 7.99-7.57 (m, 14H), 7.26-7.04 (m, 10H) 6.56 (d, 2H), 4.92 (s, 4H), 4.07 (t, 4H), 3.89-3.53 (m, 4H), 2.41 (m, 4H), 1.92 (m, 4H);
2,2-bis(4-aminobenzyl)-3-{[(2E)-3-(4-{difluoro[4-(4,4,4-trifluorobutoxy)phenyl]-methoxy}-phenyl)-prop-2-enoyl]oxy}propyl (2E)-3-(4-{difluoro[4-(4,4,4-trifluorobutoxy)phenyl]-methoxy}phenyl)prop-2-enoate yield polyamic acid 19 as white powder; [η]=0.55 dL/g,
2-(2,4-diaminophenyl)ethyl (2E)-3-(4-{difluoro[4-(4,4,4-trifluorobutoxy)phenoxy]-methyl}phenyl)prop-2-enoate yield polyamic acid 20 as white powder; [η]=0.27 dL/g.
3,5-diaminobenzyl (2E)-3-(4-{difluoro[4-(4,4,4-trifluorobutoxy)phenoxy]methyl}phenyl)prop-2-enoate yield polyamic acid 21 as white powder; [η]=0.33 dL/g,
6-{[(2E)-3-(4-{difluoro[4-(4,4,4-trifluorobutoxy)phenoxy]methyl}phenyl)prop-2-enoyl]oxy}hexyl 3,5-diaminobenzoate yield polyamic acid 22 as white powder; [η]=0.37 dL/g,
2-(2,4-diaminophenyl)-3-{[(2E)-3-(4-{difluoro[4-(4,4,4-trifluorobutoxy)phenoxy]methyl}-phenyl)prop-2-enoyl]oxy}propyl (2E)-3-(4-{difluoro[4-(4,4,4-trifluorobutoxy)phenoxy]methyl}-phenyl)prop-2-enoate yield polyamic acid 23 as white powder; [η]=0.20 dL/g,
[4,4'-diamino-2'-({[(2E)-3-(4-{difluoro[4-(4,4,4-trifluorobutoxy)phenoxy]methyl}phenyl)prop-2-enoyl]oxy}methyl)-1,1'-biphenyl-2-yl]methyl (2E)-3-(4-{difluoro[4-(4,4,4-trifluorobutoxy)-phenoxy]methyl}phenyl)prop-2-enoate yield polyamic acid 24 as white powder; [η]=0.48 dL/g,
2,2-bis(4-aminobenzyl)-3-{[(2E)-3-(4-{difluoro[4-(4,4,4-trifluorobutoxy)phenoxy]methyl}-phenyl)-prop-2-enoyl]oxy}propyl (2E)-3-(4-{difluoro[4-(4,4,4-trifluorobutoxy)

phenoxy]-methyl}phenyl)prop-2-enoate yield polyamic acid 25 as white powder; [η]=0.59 dL/g.

Example 19

Analogous to Example 15 the following tetracarboxylic acid dianhydride mixture are used for the preparation of polyamic acid with of 2-(2,4-diaminophenyl)ethyl (2E)-3-(4-{difluoro[4-(4,4,4-trifluorobutoxy)phenyl]methoxy}phenyl)prop-2-enoate:

A mixture of 1,2,3,4-cyclobutantetracarboxylic acid dianhydride and 2,3,5-tricarboxycyclopentylacetic-1,2:3,4-dianhydride 25:75 (mole ratio) yield polyamic acid 26 as white powder; [η]=0.30 dL/g;

A mixture of 1,2,3,4-cyclobutantetracarboxylic acid dianhydride and 2,3,5-tricarboxycyclopentylacetic-1,2:3,4-dianhydride 1:1 (mole ratio) yield polyamic acid 27 as white powder; [η]=0.36 dL/g;

A mixture of 1,2,3,4-cyclobutantetracarboxylic acid dianhydride and 2,3,5-tricarboxycyclopentylacetic-1,2:3,4-dianhydride 5:95 (mole ratio) yield polyamic acid 28 as white powder; [η]=0.22 dL/g;

A mixture of 1,2,3,4-cyclobutantetracarboxylic acid dianhydride and 2,3,5-tricarboxycyclopentylacetic-1,2:3,4-dianhydride 70:30 (mole ratio) yield polyamic acid 26 as white powder; [η]=0.30 dL/g.

Example 20

Analogous to Example 15 the following diamine mixture are used for the preparation of polyamic acid with 2,3,5-tricarboxycyclopentylacetic-1,2:3,4-dianhydride.

A mixture of 2-(2,4-diaminophenyl)-3-{[(2E)-3-(4-{difluoro[4-(4,4,4-trifluorobutoxy)-phenyl]-methoxy}phenyl)prop-2-enoyl]oxy}propyl (2E)-3-(4-{difluoro[4-(4,4,4-trifluorobutoxy)-phenyl]-methoxy}phenyl)prop-2-enoate and 2-(2,4-diaminophenyl)ethyl (2E)-3-(4-{difluoro[4-(4,4,4-tri-fluorobutoxy)phenyl]methoxy}phenyl)prop-2-enoate 25:75 (mole ratio) yield polyamic acid 29 as white powder; [η]=0.20 dL/g:

A mixture of 2-(2,4-diaminophenyl)-3-{[(2E)-3-(4-{difluoro[4-(4,4,4-trifluorobutoxy)phenyl]-methoxy}phenyl)prop-2-enoyl]oxy}propyl (2E)-3-(4-{difluoro[4-(4,4,4-trifluorobutoxy)-phenyl]methoxy}-phenyl)prop-2-enoate and 2-(2,4-diaminophenyl)ethyl (2E)-3-(4-{difluoro[4-(4,4,4-trifluorobutoxy)phenyl]methoxy}phenyl)prop-2-enoate 1:1 (mole ratio) yield polyamic acid 30 as white powder; [η]=0.18 dL/g;

A mixture of [4,4'-diamino-2'-({[(2E)-3-(4-{difluoro[4-(4,4,4-trifluorobutoxy)phenyl]methoxy}-phenyl)prop-2-enoyl]oxy}methyl)-1,1'-biphenyl-2-yl]methyl (2E)-3-(4-{difluoro[4-(4,4,4-tri-fluorobutoxy)phenyl]methoxy}phenyl)prop-2-enoate and 2-(2,4-diaminophenyl)ethyl (2E)-3-(4-{difluoro[4-(4,4,4-trifluorobutoxy)phenyl]methoxy}phenyl)prop-2-enoate 1:1 (mole ratio) yield polyamic acid 31 as white powder; [η]=0.36 dL/g;

A mixture of [4,4'-diamino-2'-({[(2E)-3-(4-{difluoro[4-(4,4,4-trifluorobutoxy)phenyl]methoxy}-phenyl)prop-2-enoyl]oxy}methyl)-1,1'-biphenyl-2-yl]methyl (2E)-3-(4-{difluoro[4-(4,4,4-tri-fluorobutoxy)phenyl]methoxy}phenyl)prop-2-enoate and 2-(2,4-diaminophenyl)ethyl (2E)-3-(4-{difluoro[4-(4,4,4-trifluorobutoxy)phenyl]methoxy}phenyl)prop-2-enoate 90:10 (mole ratio) yield polyamic acid 32 as white powder; [η]=0.42 dL/g.

Example 21

Polymerisation Step B (Formation of the Polyimide)

0.50 g of polyamic acid 1 obtained in above Example 15 is dissolved in 3 ml of NMP. Thereto are added 0.28 g (3.57 mmol, 4 equivalent) of pyridine and 364 mg (3.57 mmol, 4 equivalent) acetic acid anhydride, and the dehydration and ring closure is carried out at 80° C. for 2 h. The polymer mixture is diluted with 1.5 ml NMP, precipitated into 100 ml diethyl ether and collected by filtration. The polymer is reprecipitated from THF (10 ml) into 200 ml water to yield, after drying at room temperature under vacuum, 0.45 g polyimide 1; [η]=0.21 dL/g, Imidization degree ID=100%

Analogous to the polymerization step of Example 21 the following polyamic acids are used for the preparation of partially imidizated polyimide. The imidization degree is adjusted with the ratio of acetic acid anhydride and pyridine:

polyamic acid 1 with 1.2 equivalent acetic acid anhydride and pyridine yield polyimide 1 as white powder; [η]=0.21 dL/g, ID=40%;

polyamic acid 1 with 0.8 equivalent acetic acid anhydride and pyridine yield polyimide 1 as white powder; [η]=0.20 dL/g, ID=30%;

polyamic acid 1 with 0.4 equivalent acetic acid anhydride and pyridine yield polyimide 1 as white powder; [η]=0.22 dL/g, ID=14%;

polyamic acid 3 yield polyimide 3 as white powder; [η]=0.29 dL/g, ID=100%;

polyamic acid 4 yield polyimide 4 as white powder; [η]=0.34 dL/g, ID=100%;

polyamic acid 5 yield polyimide 5 as white powder; [η]=0.17 dL/g, I D=100%;

polyamic acid 6 yield polyimide 6 as white powder; [η]=0.39 dL/g, ID=100%;

polyamic acid 7 with 1.0 equivalent acetic acid anhydride and pyridine yield polyimide 7 as white powder; [η]=0.50 dL/g, ID=25%.

Example 22

Analogous to Example 15 the following tetracarboxylic acid dianhydride mixture are used for the preparation of polyamic acid with of 3,5-diaminobenzyl (2E)-3-(4-{difluoro[4-(4,4,4-trifluorobutoxy)phenyl]methoxy}phenyl)prop-2-enoate:

A mixture of 1,2,3,4-cyclobutantetracarboxylic acid dianhydride and 2,3,5-tricarboxycyclopentylacetic-1,2:3,4-dianhydride 50:50 (mole ratio) yield polyamic acid 33 as white powder; [η]=0.77 dL/g, $^1$H NMR DMSO $d_6$ 300 MHz: 12.41 (br, 2H), 10.23-10.06 (m, 2H), 7.98 (m, 1H), 7.79-7.64 (m, 5H), 7.40-7.29 (m, 4H), 7.07 (d, 2H), 6.71 (d, 1H), 5.15 (s, 2H), 4.08 (t, 2H), 3.85 (br, 0.5H), 3.68 (m, 1.5H), 3.43-2.49 (m, 5H), 2.45 (m, 2H), 1.93 (m, 2H).

Example 23

Analogous to Example 15 the following diamines mixture are used for the preparation of polyamic acid with 2,3,5-tricarboxycyclopentylacetic-1,2:3,4-dianhydride A mixture of (3-β)-cholest-5-en-3-yl 3,5-diaminobenzoate and 2-(2,4-diaminophenyl)ethyl (2E)-3-(4-{difluoro[4-(4,4,4-trifluorobutoxy)phenyl]methoxy}phenyl)prop-2-enoate 10:90 (mole ratio) yield Polyamic acid 34 as white powder; [η]=0.36 dL/g.

Preparation of (3-β)-cholest-5-en-3-yl 3,5-dinitrobenzoate 20.00 g (51.7 mmol) of cholesterol, 2.88 g (25.75 mmol) of 4-dimethylaminopyridine, 6.27 g (62.04 mmol) of triethylamine are dissolved in 100 mL of dichloromethane. 11.92 g (51.7 mmol) of commercial 3,5-dinitrobenzoylchloride dissolved in 50 mL of dichloromethane are added at 0° C. The solution is stirred for 2 h at 0° C. and allowed to stir at room temperature overnight. After 22 hours at room temperature, the reaction mixture is partitioned between dichloromethane and water. The organic phase is washed repeatedly with water, dried over sodium sulfate, filtrated and concentrated under reduced pressure. Crystallization from ethyl acetate: hexane mixture yielded 16.94 g (56%) of (3-β)-cholest-5-en-3-yl 3,5-dinitrobenzoate as yellowish crystals.

Preparation of (3-β)-cholest-5-en-3-yl 3,5-diaminobenzoate 11.42 g (19.66 mmol) of (3-β)-cholest-5-en-3-yl 3,5-dinitrobenzoate are dissolved in a mixture of 54 mL of N,N-dimethylformamide and 6 mL water. 32.6 g (120 mmol) ferric chloride hexahydrate are added. 13.1 g (201 mmol) zinc powder is added portion wise within 60 minutes. The mixture is allowed to react for 2 hours. The reaction mixture is partitioned between ethyl acetate and water and filtrated. The organic phase is washed repeatedly with water, dried over sodium sulfate, filtrated and concentrated under reduced pressure. Filtration of the residue on 400 g silica gel using toluene: ethyl acetate 1:3 as eluent and crystallization from ethyl acetate:hexane mixture yielded 8.20 g of (3-β)-cholest-5-en-3-yl 3,5-diaminobenzoate as yellowish crystals.

$^1$H NMR DMSO $d_6$ 300 MHz:
6.41 (d, 2H), 6.01 (t, 1H), 5.39 (m, 1H), 4.97 (s, 4H), 4.62 (m, 1H), 2.36 (m, 2H), 2.00-0.83 (m, 40H), 0.66 (s, 3H).

Example 24

A liquid crystal cell was prepared wherein the liquid crystal is aligned by photo reactive polyamic acid 1.
A 4.5% solution of polyamic acid 1 was prepared by mixing the solid polyamic acid 1 in NMP and stirred thoroughly till the solid polyamic acid 1 is dissolved and a second solvent butyl cellulose(BC) is added and the whole composition is stirred thoroughly to obtain final solution. The solvent ratio between NMP and butyl cellulose is 1:1. The above polymer solution was spin-coated onto the two ITO coated glass substrates at a spin speed of 2700 rpm for 30 seconds. After spin coating the substrates were subjected to baking procedure consisting of pre-baking for 5 minutes at 130° C. and post-baking for 40 minutes at a temperature of 200° C. The resulting layer thickness was around 70 nm. The substrates with the coated polymer layer on top were exposed to linearly polarized UV light (LPUV) at an incidence angle of 40° relative to the normal of the substrate surface. The plane of polarization was within the plane spanned by the substrate normal and the propagation direction of the light. The applied exposure dose was 22.6 mJ/cm². After LPUV exposure a cell was assembled with the 2 substrates, the exposed polymer layers facing to the inside of the cell. The substrates were adjusted relative to each other such that the induced alignment directions were parallel to each other(corresponds to the anti-parallel rubbed configuration in case of alignment by rubbing procedure). The cell was capillary filled with liquid crystal MLC6610 (Merck KGA), which had a negative dielectric anisotropy. The liquid crystal in the cell showed well defined homeotropic orientation. A tilt angle of 87.56° was measured using the crystal rotation method.

Example 25

A cell is prepared as described in Example 24, with the single difference that an incidence angle of 30° is used. The liquid crystal in the cell shows well defined homeotropic orientation. A tilt angle of 88.21° is measured using the crystal rotation method.

Example 26

A cell is prepared as described in Example 24. Upon applying a voltage of 5V to the electrodes of the cell, the liquid crystal molecules switch from the vertical orientation to a planar orientation, which is observed by arranging the cell between crossed polarizers. The azimuthal orientation direction of the switched liquid crystals is determined to lie in the polarization plane of the LPUV light used for photo-exposure. This confirms the good azimuthal orientation of liquid crystals by the alignment layer.

Example 27

A cell is prepared as described in Example 25 and is subjected to the test method as described in Example 26, which confirmed good azimuthal orientation of liquid crystals by the alignment layer.

Example 28

A cell is prepared as in Example 24, except that the exposure dose is 33 mJ and incidence angle of 40° is used, and the solution to be coated comprised of polyamic acid 1 and polyamic acid 2 mixed in ratio of 30:70 per weight % to form a blend composition. A 4.5% solution is prepared as per the procedure explained in Example 24 except that the two polymers were mixed in the solvent at the same time. The spin speed used is 2700 rpm for 30 seconds. The liquid crystal in the cell shows well defined homeotropic orientation. A tilt angle of 87.56° is measured using the crystal rotation method.

Example 29

A cell is prepared as described in Example 28, except that polyamic acid 2a is used instead of polyamic acid 2. The spin speed used is 2900 rpm for 30 seconds. The liquid crystal in the cell shows well defined homeotropic orientation. A tilt angle of 87.40° is measured using the crystal rotation method.

Example 30

A cell is prepared as in Example 28 and is subjected to the test method as described in Example 26, which confirmed good azimuthal orientation of liquid crystals by the alignment layer.

Example 31

A cell is prepared as described in Example 28, except that the exposure dose is 22.6 mJ/cm2 and incidence angle of 30° is used. The liquid crystal in the cell shows well defined homeotropic orientation. A tilt angle of 88.26° is measured using the crystal rotation method.

Example 32

A cell is prepared as described in Example 31 and is subjected to the test method as described in Example 26, which confirms good azimuthal orientation of liquid crystals by the alignment layer.

Example 33

A cell is prepared as described in Example 24. Voltage holding ratio of this cell was measured at room temperature. The voltage decay V (at T=20 ms) of a voltage surge of 64 μs with $V_0$ (V at t=0)=5V is then measured over a period of T=20 ms. The voltage holding ratio is then determined, given by $VHR=V_{rms}(t=T)/V_o$ is 99.6% at room temperature.

Example 34

A cell is prepared as described in Example 31. Voltage holding ratio of this cell measured as in Example 33 is 99.6% at room temperature.

Example 35

A cell is prepared as described in Example 24 with a 4.0% solution of polyamic acid 15, with spin speed of 1200 rpm-30 seconds and exposure dose of 22.6 mJ with an incidence angle of 40°. The liquid crystal in the cell shows well defined homeotropic orientation. A tilt angle of 87.69° is measured using the crystal rotation method.

Example 36

A cell is prepared as described in Example 35 and is subjected to the test method as described in Example 26, which confirms good azimuthal orientation of liquid crystals by the alignment layer.

Example 37

A cell is prepared as described in Example 35, except that the exposure dose is 33 mJ and incidence angle of 30° was used. The liquid crystal in the cell shows well defined homeotropic orientation. A tilt angle of 88.11° is measured using the crystal rotation method.

Example 38

A cell is prepared as described in Example 37 and is subjected to the test method as described in Example 26, which confirms good azimuthal orientation of liquid crystals by the alignment layer.

Example 39

A cell is prepared in similar manner as in Example 24 with a 2.0% solution of polyamic acid 33, with spin speed of 1100 rpm-30 seconds and exposure dose of 22.6 mJ with an incidence angle of 40°. The liquid crystal in the cell shows well defined homeotropic orientation. A tilt angle of 87.80° is measured using the crystal rotation method.

Example 40

A cell is prepared as described in Example 39 and is subjected to the test method as described in Example 26, which confirms good azimuthal orientation of liquid crystals by the alignment layer.

Example 41

A cell is prepared as described in Example 39, except that the exposure dose is 33 mJ and incidence angle of 30° is used. The liquid crystal in the cell shows well defined homeotropic orientation. A tilt angle of 88.13° is measured using the crystal rotation method.

Example 42

A cell is prepared as described in Example 41 and is subjected to the test method as described in Example 26, which confirms good azimuthal orientation of liquid crystals by the alignment layer.

Example 43

A cell is prepared as described in Example 24 with a 4.0% solution of polyamic acid 18, with spin speed of 1200 rpm-30 seconds and exposure dose of 22.6 mJ with an incidence angle of 40°. The liquid crystal in the cell shows well defined homeotropic orientation. A tilt angle of 88.06° is measured using the crystal rotation method.

Example 44

A cell is prepared as described in Example 43 and is subjected to similar test method as in Example 26, which confirms good azimuthal orientation of liquid crystals by the alignment layer.

Example 45

A cell is prepared as described in Example 43, except that the exposure dose is 33 mJ and incidence angle of 30° was used. The liquid crystal in the cell shows well defined homeotropic orientation. A tilt angle of 88.42° is measured using the crystal rotation method.

Example 46

A cell is prepared as described in Example 45 and is subjected to similar test method as in Example 26, which confirms good azimuthal orientation of liquid crystals by the alignment layer.

Example 47

A cell is prepared as described in Example 24 with a 4.5% solution of polyamic acid 6, with spin speed of 2100 rpm-30 seconds and exposure dose of 22.6 mJ/cm2 with an incidence angle of 40°. The liquid crystal in the cell shows well defined homeotropic orientation. A tilt angle of 88.44° is measured using the crystal rotation method.

Example 48

A cell is prepared as described in Example 47 and was subjected to the test method as described in Example 26, which confirms good azimuthal orientation of liquid crystals by the alignment layer.

Example 49

A cell is prepared as described in Example 47, except that the exposure dose is 33 mJ and incidence angle of 30° is used.

The liquid crystal in the cell shows well defined homeotropic orientation. A tilt angle of 88.58° is measured using the crystal rotation method.

Example 50

A cell is prepared as described in Example 49 and is subjected to the test method as described in Example 26, which confirms good azimuthal orientation of liquid crystals by the alignment layer.

Example 51

A cell is prepared as described in Example 24 with a 4.0% solution of polyamic acid 34, with spin speed of 1600 rpm-30 seconds. The liquid crystal in the cell shows well defined homeotropic orientation. A tilt angle of 88.41° is measured using the crystal rotation method.

Example 52

A cell is prepared as described in Example 28, except that polyamic acid 34 is used instead of polyamic acid 1. The spin speed used is 2300 rpm for 30 seconds. The liquid crystal in the cell shows well defined homeotropic orientation. A tilt angle of 88.36° is measured using the crystal rotation method.

Example 53

A cell is prepared as described in Example 52, except that polyamic acid 2a is used instead of polyamic acid 2. The spin speed used is 2500 rpm for 30 seconds. The liquid crystal in the cell shows well defined homeotropic orientation. A tilt angle of 88.25° is measured using the crystal rotation method.

The invention claimed is:

1. A polymer, homo- or copolymer, or oligomer comprising a main chain and a side chain, wherein the side chain comprises a group of formula (I)

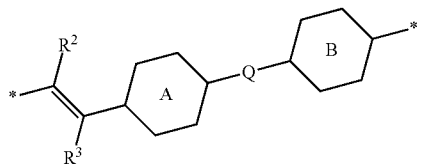

wherein
Q represents —OCF$_2$—, —CF$_2$—O—, —CF$_2$S—, —SCF$_2$—, —CF$_2$NH— or —NH—CF$_2$—,
A represents an unsubstituted or substituted carbocyclic or heterocyclic aromatic or alicyclic group selected from a monocyclic ring of five or six atoms, two adjacent monocyclic rings of five or six atoms, a bicyclic ring system of eight, nine or ten atoms, or a tricyclic ring system of thirteen or fourteen atoms;
B represents an unsubstituted carbocyclic or heterocyclic aromatic or alicyclic group selected from a monocyclic ring of five or six atoms, two adjacent monocyclic rings of five or six atoms, a bicyclic ring system of eight, nine or ten atoms, or a tricyclic ring system of thirteen or fourteen atoms;
R$^2$ and R$^3$ are independently from each other hydrogen, halogen or nitrile; unsubstituted or with halogen substituted C$_1$-C$_{12}$alkyl, in which one or more C-atom, CH— or CH$_2$— group may be replaced by a linking group.

2. The polymer, homo- or copolymer, or oligomer according to claim 1, wherein the main chain is polyamic acid, polyimide, polyamic acid ester, polyester, polyamide, polysiloxane, cellulose, polyacetal, polyurea, polyurethane, polystyrene, poly(styrene-phenyl-maleimide), polyacrylate, poly(meth)acrylate, polymaleimide, polyhydroxyalkylenether, polyhydroxyether, polyhydroxyetheramine, polyaminoalkylenether and derivatives or a mixture thereof.

3. A method for the preparation of a polymer, homo- or copolymer, or oligomer comprising a main chain and a side chain, wherein the side chain comprises a group of formula (I)

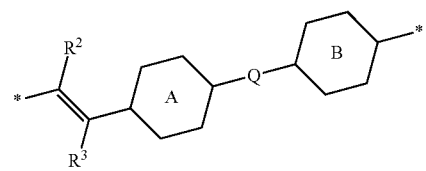

wherein
Q represents —OCF$_2$—, —CF$_2$—O—, —CF$_2$S—, —SCF$_2$—, —CF$_2$NH— or —NH—CF$_2$—,
A represents an unsubstituted or substituted carbocyclic or heterocyclic aromatic or alicyclic group selected from a monocyclic ring of five or six atoms, two adjacent monocyclic rings of five or six atoms, a bicyclic ring system of eight, nine or ten atoms, or a tricyclic ring system of thirteen or fourteen atoms;
B represents an unsubstituted carbocyclic or heterocyclic aromatic or alicyclic group selected from a monocyclic ring of five or six atoms, two adjacent monocyclic rings of five or six atoms, a bicyclic ring system of eight, nine or ten atoms, or a tricyclic ring system of thirteen or fourteen atoms;
R$^2$ and R$^3$ are independently from each other hydrogen, halogen or nitrile; unsubstituted or with halogen substituted C$_1$-C$_{12}$alkyl, in which one or more C-atom, CH— or CH$_2$— group may be replaced by a linking group;
which comprises polymerising monomer(s) which comprises a group of formula (I) as described above
and which monomer comprises in addition a polymerisable group.

4. The polymer, homo- or copolymer, or oligomer as described in claim 1, comprising monomers, which comprises a group of formula (I)

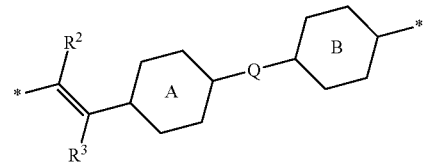

wherein
Q represents —OCF$_2$—, —CF$_2$—O—, —CF$_2$S—, —SCF$_2$—, —CF$_2$NH— or —NH—CF$_2$—,
A represents an unsubstituted or substituted carbocyclic or heterocyclic aromatic or alicyclic group selected from a monocyclic ring of five or six atoms, two adjacent monocyclic rings of five or six atoms, a bicyclic ring system of eight, nine or ten atoms, or a tricyclic ring system of thirteen or fourteen atoms;
B represents an unsubstituted carbocyclic or heterocyclic aromatic or alicyclic group selected from a monocyclic ring of five or six atoms, two adjacent monocyclic rings of five or six atoms, a bicyclic ring system of eight, nine or ten atoms, or a tricyclic ring system of thirteen or fourteen atoms;

$R^2$ and $R^3$ are independently from each other hydrogen, halogen or nitrile; unsubstituted or with halogen substituted $C_1$-$C_{12}$alkyl, in which one or more C-atom, CH— or $CH_2$— group may be replaced by a linking group; and which monomer comprises in addition a polymerisable group; or a composition comprising a polymer, homo- or copolymer, or oligomer comprising a main chain and a side chain, wherein the side chain comprises a group of formula (I)

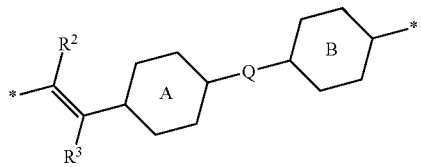

wherein

Q represents —$OCF_2$—, —$CF_2$—O—, —$CF_2S$—, —$SCF_2$—, —$CF_2NH$— or —NH—$CF_2$—, A represents an unsubstituted or substituted carbocyclic or heterocyclic aromatic or alicyclic group selected from a monocyclic ring of five or six atoms, two adjacent monocyclic rings of five or six atoms, a bicyclic ring system of eight, nine or ten atoms, or a tricyclic ring system of thirteen or fourteen atoms;

B represents an unsubstituted carbocyclic or heterocyclic aromatic or alicyclic group selected from a monocyclic ring of five or six atoms, two adjacent monocyclic rings of five or six atoms, a bicyclic ring system of eight, nine or ten atoms, or a tricyclic ring system of thirteen or fourteen atoms;

$R^2$ and $R^3$ are independently from each other hydrogen, halogen or nitrile; unsubstituted or with halogen substituted $C_1$-$C_{12}$alkyl, in which one or more C-atom, CH— or $CH_2$— group may be replaced by a linking group; or wherein the polymer, homo- or copolymer, or oligomer is prepared by a method for the preparation of a polymer, homo- or copolymer, or oligomer comprising a main chain and a side chain, wherein the side chain comprises a group of formula (I) as described above, which comprises polymerising monomer(s), wherein the monomers comprise a group of formula (I) and in addition a polymerisable group;

or wherein the polymer, homo- or copolymer, or oligomer is obtainable by the above described method for the preparation of a polymer, homo- or copolymer, or oligomer; or at least one monomer, which comprises a group of formula (I) and in addition a polymerisable group.

\* \* \* \* \*